US008896575B2

(12) United States Patent
Goertz et al.

(10) Patent No.: US 8,896,575 B2
(45) Date of Patent: Nov. 25, 2014

(54) PRESSURE-SENSITIVE TOUCH SCREEN

(75) Inventors: Magnus Goertz, Lidingo (SE); Thomas Eriksson, Stocksund (SE); Joseph Shain, Rehovot (IL); Anders Jansson, Älta (SE); Niklas Kvist, Varmdo (SE); Robert Pettersson, Hägersten (SE); Lars Sparf, Vällingby (SE); John Karlsson, Märsta (SE)

(73) Assignee: Neonode Inc., Santa Clara, CA (US)

( * ) Notice: Subject to any disclaimer, the term of this patent is extended or adjusted under 35 U.S.C. 154(b) by 287 days.

(21) Appl. No.: 13/053,254

(22) Filed: Mar. 22, 2011

(65) Prior Publication Data
US 2011/0181552 A1 Jul. 28, 2011

Related U.S. Application Data

(63) Continuation-in-part of application No. 12/371,609, filed on Feb. 15, 2009, now Pat. No. 8,339,379, which is a continuation-in-part of application No. 10/494,055, filed as application No. PCT/SE02/02000 on Nov. 4, 2002, now Pat. No. 7,880,732, application No. 13/053,254, which is a continuation-in-part of application No. 12/486,033, filed on Jun. 17, 2009, which is a continuation-in-part of application No. 10/315,250, filed on Dec. 10, 2002, now Pat. No. 8,095,879, application No. 13/053,254, which is a continuation-in-part of application No. 12/667,692, filed as application No. PCT/SE2007/050508 on Jul. 6, 2007, now Pat. No. 8,471,830, and a continuation-in-part of application No. 12/760,567, filed on Apr. 15, 2010, application No. 13/053,254, which is a continuation-in-part of application No. 12/760,568, filed on Apr. 15, 2010, said application No. 13/053,254 is a continuation of application No. 13/052,511, filed on Mar. 21, 2011.

(60) Provisional application No. 61/317,255, filed on Mar. 24, 2010, provisional application No. 61/317,257, filed on Mar. 24, 2010, provisional application No. 61/379,012, filed on Sep. 1, 2010, provisional application No. 61/380,600, filed on Sep. 7, 2010, provisional application No. 61/410,930, filed on Nov. 7, 2010, provisional application No. 61/132,469, filed on Jun. 19, 2008, provisional application No. 61/169,779, filed on Apr. 16, 2009, provisional application No. 61/171,464, filed on Apr. 22, 2009, provisional application No. 61/317,255, filed on Mar. 24, 2010.

(51) Int. Cl.
G06F 3/042 (2006.01)

(52) U.S. Cl.
CPC .............. G06F 3/0421 (2013.01); G06F 3/042 (2013.01); G06F 3/0425 (2013.01); G06F 3/0428 (2013.01)
USPC ......... 345/175; 345/173; 345/179; 178/18.09

(58) Field of Classification Search
CPC ....................................... G06F 3/042
USPC ........................ 345/173, 175, 179; 178/18.09
See application file for complete search history.

(56) References Cited

U.S. PATENT DOCUMENTS

| 4,243,879 A | 1/1981 | Carroll et al. |
| 4,301,447 A | 11/1981 | Funk et al. |

(Continued)

FOREIGN PATENT DOCUMENTS

| WO | 8600446 A1 | 1/1986 |
| WO | 8600447 A1 | 1/1986 |

OTHER PUBLICATIONS

Moeller, J. and Kerne, A., Scanning FTIR: Unobtrusive Optoelectronic Multi-Touch Sensing through Waveguide Transmissivity Imaging,TEI '10 Proceedings of the Fourth International Conference on Tangible, Embedded, and Embodied Interaction, Jan. 25-27, 2010, pp. 73-76. ACM, New York, NY.

(Continued)

*Primary Examiner* — Gregory J Tryder
*Assistant Examiner* — Afroza Chowdhury
(74) *Attorney, Agent, or Firm* — Soquel Group LLC

(57) ABSTRACT

A pressure-sensitive touch screen including a housing, at least one light receiver rigidly mounted in the housing, a display flexibly mounted in the housing substantially above the at least one receiver, which depresses in response to pressure of a touch, and a calculating unit connected to the at least one light receiver for receiving outputs indicating amounts of received light by the at least one receiver, and for determining that the display is being depressed based on an increase in an output of the at least one receiver.

4 Claims, 103 Drawing Sheets

(56) References Cited

U.S. PATENT DOCUMENTS

| | | | |
|---|---|---|---|
| 4,703,316 A | 10/1987 | Sherbeck | |
| 4,710,760 A | 12/1987 | Kasday | |
| 4,928,094 A | 5/1990 | Smith | |
| 5,036,187 A | 7/1991 | Yoshida et al. | |
| 5,162,783 A | 11/1992 | Moreno | |
| 5,194,863 A | 3/1993 | Barker et al. | |
| 5,414,413 A | 5/1995 | Tamaru et al. | |
| 5,559,727 A | 9/1996 | Deley et al. | |
| 5,577,733 A | 11/1996 | Downing | |
| 5,603,053 A | 2/1997 | Gough et al. | |
| 5,729,250 A | 3/1998 | Bishop et al. | |
| 5,748,185 A | 5/1998 | Stephan et al. | |
| 5,825,352 A | 10/1998 | Bisset et al. | |
| 5,889,236 A | 3/1999 | Gillespie et al. | |
| 5,914,709 A | 6/1999 | Graham et al. | |
| 5,936,615 A | 8/1999 | Waters | |
| 5,943,044 A | 8/1999 | Martinelli et al. | |
| 5,949,557 A * | 9/1999 | Powell | 359/8 |
| 5,988,645 A | 11/1999 | Downing | |
| 6,010,061 A | 1/2000 | Howell | |
| 6,333,735 B1 * | 12/2001 | Anvekar | 345/175 |
| 6,340,979 B1 | 1/2002 | Beaton et al. | |
| 6,362,468 B1 | 3/2002 | Murakami et al. | |
| 6,421,042 B1 | 7/2002 | Omura et al. | |
| 6,429,857 B1 | 8/2002 | Masters et al. | |
| 6,512,838 B1 * | 1/2003 | Rafii et al. | 382/106 |
| 6,614,422 B1 * | 9/2003 | Rafii et al. | 345/168 |
| 6,667,695 B2 * | 12/2003 | Pettersson et al. | 341/5 |
| 6,674,895 B2 * | 1/2004 | Rafii et al. | 382/154 |
| 6,690,365 B2 | 2/2004 | Hinckley et al. | |
| 6,690,387 B2 | 2/2004 | Zimmerman et al. | |
| 6,707,449 B2 | 3/2004 | Hinckley et al. | |
| 6,757,002 B1 | 6/2004 | Oross et al. | |
| 6,788,292 B1 | 9/2004 | Nako et al. | |
| 6,803,906 B1 | 10/2004 | Morrison et al. | |
| 6,864,882 B2 | 3/2005 | Newton | |
| 6,947,032 B2 | 9/2005 | Morrison et al. | |
| 6,954,197 B2 | 10/2005 | Morrison et al. | |
| 6,972,401 B2 | 12/2005 | Akitt et al. | |
| 7,030,861 B1 | 4/2006 | Westerman et al. | |
| 7,133,032 B2 | 11/2006 | Cok | |
| 7,176,905 B2 | 2/2007 | Baharav et al. | |
| 7,184,030 B2 | 2/2007 | McCharles et al. | |
| 7,339,580 B2 | 3/2008 | Westerman et al. | |
| 7,352,940 B2 | 4/2008 | Charters et al. | |
| 7,369,724 B2 | 5/2008 | Deane | |
| 7,372,456 B2 | 5/2008 | McLintock | |
| 7,489,303 B1 * | 2/2009 | Pryor | 345/173 |
| 7,557,935 B2 * | 7/2009 | Baruch | 356/614 |
| 7,855,716 B2 | 12/2010 | McCreary et al. | |
| 8,022,941 B2 | 9/2011 | Smoot | |
| 8,120,625 B2 | 2/2012 | Hinckley | |
| 8,184,108 B2 * | 5/2012 | Smits | 345/175 |
| 8,339,379 B2 * | 12/2012 | Goertz et al. | 345/175 |
| 8,416,217 B1 * | 4/2013 | Eriksson et al. | 345/175 |
| 2001/0002694 A1 | 6/2001 | Nakazawa et al. | |
| 2001/0022579 A1 * | 9/2001 | Hirabayashi | 345/175 |
| 2001/0026268 A1 | 10/2001 | Ito | |
| 2001/0028344 A1 | 10/2001 | Iwamoto et al. | |
| 2001/0055006 A1 | 12/2001 | Sano et al. | |
| 2002/0075240 A1 * | 6/2002 | Lieberman et al. | 345/170 |
| 2002/0109843 A1 | 8/2002 | Ehsani et al. | |
| 2002/0175900 A1 | 11/2002 | Armstrong | |
| 2003/0063775 A1 * | 4/2003 | Rafii et al. | 382/106 |
| 2003/0234346 A1 | 12/2003 | Kao | |
| 2004/0046744 A1 * | 3/2004 | Rafii et al. | 345/168 |
| 2004/0046960 A1 | 3/2004 | Wagner et al. | |
| 2004/0140961 A1 * | 7/2004 | Cok | 345/175 |
| 2004/0212603 A1 * | 10/2004 | Cok | 345/175 |
| 2004/0252091 A1 | 12/2004 | Ma et al. | |
| 2005/0104860 A1 | 5/2005 | McCreary et al. | |
| 2005/0122308 A1 | 6/2005 | Bell et al. | |
| 2005/0174473 A1 | 8/2005 | Morgan et al. | |
| 2005/0271319 A1 | 12/2005 | Graham | |
| 2005/0275636 A1 * | 12/2005 | Dehlin et al. | 345/173 |
| 2006/0001654 A1 | 1/2006 | Smits | |
| 2006/0161870 A1 | 7/2006 | Hotelling et al. | |
| 2006/0161871 A1 | 7/2006 | Hotelling et al. | |
| 2006/0181517 A1 * | 8/2006 | Zadesky et al. | 345/173 |
| 2006/0229509 A1 | 10/2006 | Al-Ali et al. | |
| 2007/0024598 A1 | 2/2007 | Miller et al. | |
| 2007/0084989 A1 | 4/2007 | Lange et al. | |
| 2007/0146318 A1 | 6/2007 | Juh et al. | |
| 2007/0152984 A1 | 7/2007 | Ording et al. | |
| 2008/0008472 A1 | 1/2008 | Dress et al. | |
| 2008/0012850 A1 | 1/2008 | Keating, III | |
| 2008/0013913 A1 | 1/2008 | Lieberman et al. | |
| 2008/0068353 A1 | 3/2008 | Lieberman et al. | |
| 2008/0093542 A1 | 4/2008 | Lieberman et al. | |
| 2008/0100593 A1 | 5/2008 | Skillman et al. | |
| 2008/0117183 A1 | 5/2008 | Yu et al. | |
| 2008/0122792 A1 | 5/2008 | Izadi et al. | |
| 2008/0122803 A1 | 5/2008 | Izadi et al. | |
| 2008/0158174 A1 | 7/2008 | Land et al. | |
| 2008/0211779 A1 * | 9/2008 | Pryor | 345/173 |
| 2008/0259053 A1 | 10/2008 | Newton | |
| 2009/0027357 A1 | 1/2009 | Morrison | |
| 2009/0046140 A1 * | 2/2009 | Lashmet al. | 348/51 |
| 2009/0058833 A1 | 3/2009 | Newton | |
| 2009/0066673 A1 | 3/2009 | Molne et al. | |
| 2009/0096994 A1 | 4/2009 | Smits | |
| 2009/0244013 A1 * | 10/2009 | Eldershaw | 345/173 |
| 2010/0058282 A1 * | 3/2010 | Fujimura et al. | 716/21 |
| 2010/0073330 A1 * | 3/2010 | Ericson et al. | 345/179 |
| 2010/0093399 A1 * | 4/2010 | Kim et al. | 455/566 |
| 2010/0208029 A1 * | 8/2010 | Marti et al. | 348/14.02 |
| 2011/0050639 A1 * | 3/2011 | Challener et al. | 345/175 |
| 2011/0157097 A1 * | 6/2011 | Hamada et al. | 345/175 |
| 2012/0068971 A1 * | 3/2012 | Pemberton-Pigott | 345/175 |
| 2012/0098754 A1 * | 4/2012 | Kim | 345/173 |
| 2012/0098794 A1 * | 4/2012 | Kleinert et al. | 345/175 |
| 2012/0138234 A1 * | 6/2012 | Yu Chen | 156/510 |
| 2012/0139904 A1 * | 6/2012 | Lee et al. | 345/419 |
| 2013/0127765 A1 * | 5/2013 | Behdasht et al. | 345/173 |

OTHER PUBLICATIONS

Hodges, S., Izadi, S., Butler, A., Rrustemi A., Buxton, B., "ThinSight: Versatile Multitouch Sensing for Thin Form-Factor Displays." UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.

* cited by examiner

PRESSURE-SENSITIVE TOUCH SCREEN

CROSS REFERENCES TO RELATED APPLICATIONS

This application claims priority benefit of the following five U.S. provisional patent applications, the disclosures of which are hereby incorporated herein by reference.

- U.S. Provisional Application No. 61/317,255, entitled OPTICAL TOUCH SCREEN WITH WIDE BEAM TRANSMITTERS AND RECEIVERS, filed on Mar. 24, 2010 by inventor Magnus Goertz;
- U.S. Provisional Application No. 61/317,257, entitled OPTICAL TOUCH SCREEN USING A MIRROR IMAGE FOR DETERMINING THREE-DIMENSIONAL POSITION INFORMATION, filed on Mar. 24, 2010 by inventor Magnus Goertz;
- U.S. Provisional Application No. 61/379,012, entitled OPTICAL TOUCH SCREEN SYSTEMS USING REFLECTED LIGHT, filed on Sep. 1, 2010 by inventors Magnus Goertz, Thomas Eriksson, Joseph Shain, Anders Jansson, Niklas Kvist and Robert Pettersson;
- U.S. Provisional Application No. 61/380,600, entitled OPTICAL TOUCH SCREEN SYSTEMS USING REFLECT LIGHT, filed on Sep. 7, 2010 by inventors Magnus Goertz, Thomas Eriksson, Joseph Shain, Anders Jansson, Niklas Kvist and Robert Pettersson; and
- U.S. Provisional Application No. 61/410,930, entitled OPTICAL TOUCH SCREEN SYSTEMS USING REFLECT LIGHT, filed on Nov. 7, 2010 by inventors Magnus Goertz, Thomas Eriksson, Joseph Shain, Anders Jansson, Niklas Kvist, Robert Pettersson and Lars Sparf.

This application is a continuation of U.S. application Ser. No. 13/052,511, entitled LIGHT-BASED TOUCH SCREEN WITH SHIFT-ALIGNED EMITTER AND RECEIVER LENSES, filed on Mar. 21, 2011 by inventors Magnus Goertz, Thomas Eriksson, Joseph Shain, Anders Jansson, Niklas Kvist, Robert Pettersson, Lars Sparf and John Karlsson.

This application is a continuation-in-part of the following five U.S. patent applications, the disclosures of which are also hereby incorporated herein by reference.

- U.S. application Ser. No. 12/371,609, entitled LIGHT-BASED TOUCH SCREEN, filed on Feb. 15, 2009 by inventors Magnus Goertz, Thomas Eriksson and Joseph Shain, which is a continuation-in-part of U.S. application Ser. No. 10/494,055, entitled ON A SUBSTRATE FORMED OR RESTING DISPLAY ARRANGEMENT, filed on Apr. 29, 2004 by inventor Magnus Goertz, which is a national phase of PCT Application No. PCT/SE02/02000, entitled ON A SUBSTRATE FORMED OR RESTING DISPLAY ARRANGEMENT, filed on Nov. 4, 2002 by inventor Magnus Goertz, which claims priority from Swedish Application No. 0103835-5, entitled PEKSKÄRM FÖR MOBILETELEFON REALISERAD AV DISPLAYENHET MED LJUSSÄNDANDE, filed on Nov. 2, 2001 by inventor Magnus Goertz;
- U.S. application Ser. No. 12/486,033, entitled USER INTERFACE FOR MOBILE COMPUTER UNIT, filed on Jun. 17, 2009 by inventors Magnus Goertz and Joseph Shain, which is a continuation-in-part of U.S. application Ser. No. 10/315,250, filed on Dec. 10, 2002 by inventor Magnus Goertz, and which claims priority from U.S. Provisional Application No. 61/132,469, entitled IMPROVED KAYPAD FOR CHINESE CHARACTERS, filed on Jun. 19, 2008 by inventors Magnus Goertz, Robert Pettersson, Staffan Gustafsson and Johann Gerell;
- U.S. application Ser. No. 12/667,692, entitled SCANNING OF A TOUCH SCREEN, filed on Jan. 5, 2010 by inventor Magnus Goertz, which is a national phase application of PCT Application No. PCT/SE2007/050508, entitled SCANNING OF A TOUCH SCREEN, filed on Jul. 6, 2007 by inventor Magnus Goertz;
- U.S. application Ser. No. 12/760,567, entitled OPTICAL TOUCH SCREEN SYSTEMS USING REFLECTED LIGHT, filed on Apr. 15, 2010 by inventors Magnus Goertz, Thomas Eriksson and Joseph Shain, which claims priority from U.S. Provisional Application No. 61/169,779, entitled OPTICAL TOUCH SCREEN, filed on Apr. 16, 2009 by inventors Magnus Goertz, Thomas Eriksson and Joseph Shain, and from U.S. Provisional Application No. 61/171,464, entitled TOUCH SCREEN USER INTERFACE, filed on Apr. 22, 2009 by inventor Magnus Goertz, and from U.S. Provisional Application No. 61/317,255 entitled OPTICAL TOUCH SCREEN WITH WIDE BEAM TRANSMITTERS AND RECEIVERS, filed on Mar. 24, 2010 by inventor Magnus Goertz; and
- U.S. application Ser. No. 12/760,568, entitled OPTICAL TOUCH SCREEN SYSTEMS USING WIDE LIGHT BEAMS, filed on Apr. 15, 2010 by inventors Magnus Goertz, Thomas Eriksson and Joseph Shain, which claims priority from U.S. Provisional Application No. 61/169,779, entitled OPTICAL TOUCH SCREEN, filed on Apr. 16, 2009 by inventors Magnus Goertz, Thomas Eriksson and Joseph Shain, and from U.S. Provisional Application No. 61/171,464, entitled TOUCH SCREEN USER INTERFACE, filed on Apr. 22, 2009 by inventor Magnus Goertz, and from U.S. Provisional Application No. 61/317,255 entitled OPTICAL TOUCH SCREEN WITH WIDE BEAM TRANSMITTERS AND RECEIVERS, filed on Mar. 24, 2010 by inventor Magnus Goertz.

FIELD OF THE INVENTION

The field of the present invention is light-based touch screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports.

Most conventional touch screen systems are based on resistive or capacitive layers. Such systems are not versatile enough to offer an all-encompassing solution, as they are not easily scalable.

Reference is made to FIG. 1, which is a prior art illustration of a conventional touch screen system. Such systems include an LCD display surface 606, a resistive or capacitive overlay 801 that is placed over the LCD surface, and a controller integrated circuit (IC) 701 that connects to the overlay and converts inputs from the overlay to meaningful signals. A host device (not shown), such as a computer, receives the signals from controller IC 701, and a device driver or such other program interprets the signals to detect a touch-based input such as a key press or scroll movement.

Reference is made to FIG. 2, which is a prior art illustration of a conventional resistive touch screen. Shown in FIG. 2 are conductive and resistive layers 802 separated by thin spaces. A PET film 803 overlays a top circuit layer 804, which overlays a conductive coating 806. Similarly, a conductive coating 807 with spacer dots 808 overlays a bottom circuit layer 805, which overlays a glass layer 607. When a pointer 900, such as a finger or a stylus, touches the screen, a contact is created between resistive layers, closing a switch. A controller 701 determines the current between layers to derive the position of the touch point.

Advantages of resistive touch screens are their low cost, low power consumption and stylus support.

A disadvantage of resistive touch screens is that as a result of the overlay, the screens are not fully transparent. Another disadvantage is that pressure is required for touch detection; i.e., a pointer that touches the screen without sufficient pressure goes undetected. As a consequence, resistive touch screens do not detect finger touches well. Another disadvantage is that resistive touch screens are generally unreadable in direct sunlight. Another disadvantage is that resistive touch screens are sensitive to scratches. Yet another disadvantage is that resistive touch screens are unable to discern that two or more pointers are touching the screen simultaneously, referred to as "multi-touch".

Reference is made to FIG. 3, which is a prior art illustration of a conventional surface capacitive touch screen. Shown in FIG. 3 is a touch surface 809 overlaying a coated glass substrate 810. Two sides of a glass 811 are coated with a uniform conductive indium in oxide (ITO) coating 812. In addition, a silicon dioxide hard coating 813 is coated on the front side of one of the ITO coating layers 812. Electrodes 814 are attached at the four corners of the glass, for generating an electric current. A pointer 900, such as a finger or a stylus, touches the screen, and draws a small amount of current to the point of contact. A controller 701 then determines the location of the touch point based on the proportions of current passing through the four electrodes.

Advantages of surface capacitive touch screens are finger touch support and a durable surface.

A disadvantage of surface capacitive touch screens is that as a result of the overlay, the screens are not fully transparent. Another disadvantage is a limited temperature range for operation. Another disadvantage is a limited capture speed of pointer movements, due to the capacitive nature of the touch screens. Another disadvantage is that surface capacitive touch screens are susceptible to radio frequency (RF) interference and electromagnetic (EM) interference. Another disadvantage is that the accuracy of touch location determination depends on the capacitance. Another disadvantage is that surface capacitive touch screens cannot be used with gloves. Another disadvantage is that surface capacitive touch screens require a large screen border. As a consequence, surface capacitive touch screens cannot be used with small screen devices. Yet another disadvantage is that surface capacitive touch screens are unable to discern a mufti-touch.

Reference is made to FIG. 4, which is a prior art illustration of a conventional projected capacitive touch screen. Shown in FIG. 4 are etched ITO layers 815 that form multiple horizontal (x-axis) and vertical (y-axis) electrodes. Etched layers 815 include outer hard coat layers 816 and 817, an x-axis electrode pattern 818, a y-axis electrode pattern 819, and an ITO glass 820 in the middle. AC signals 702 drive the electrodes on one axis, and the response through the screen loops back via the electrodes on the other axis. Location of a pointer 900 touching the screen is determined based on the signal level changes 703 between the horizontal and vertical electrodes.

Advantages of projective capacitive touch screens are finger mufti-touch detection and a durable surface.

A disadvantage of projected capacitive touch screens is that as a result of the overlay, the screens are not fully transparent. Another disadvantage is their high cost. Another disadvantage is a limited temperature range for operation. Another disadvantage is a limited capture speed, due to the capacitive nature of the touch screens. Another disadvantage is a limited screen size, typically less than 5". Another disadvantage is that surface capacitive touch screens are susceptible to RF interference and EM interference. Yet another disadvantage is that the accuracy of touch location determination depends on the capacitance.

It will thus be appreciated that conventional touch screens are not ideal for general use with small mobile devices and devices with large screens. It would thus be beneficial to provide touch screens that overcome the disadvantages of conventional resistive and capacitive touch screens described above.

SUMMARY OF THE DESCRIPTION

The present invention provides touch screens that overcome the drawbacks of conventional resistive and capacitive touch screens.

Aspects of the present invention relate to various embodiments of touch screens, including inter alia, (i) touch screens with wide light beams, (ii) touch screens with shift-aligned emitters and receivers, (iii) touch screens with highly refractive lenses, (iv) touch screens with a low bezel, (v) light-based touch screens using long thin light guides, (vi) pressure-sensitive light-based touch screens, and (vii) touch screens that use a reflected image to calculate a pointer location in three dimensions. Further aspects of the present invention relate to methods for touch screens, including inter alia (viii) methods for touch detection, and (ix) methods for calibrating touch screen components. Still further aspects of the present invention relate to precise placement and alignment of elements as required in certain embodiments of the present invention, as well as in other applications. Such aspects include (x) forming inter-fitting blocks that combine an emitter or receiver element and a lens, and (xi) methods for guiding an element during device assembly using a capillary effect.

Touch Screens with Wide Light Beams

In these embodiments of the present invention light from a narrow source, such as a near infrared LED, is widened, using lenses or reflective elements, to project over a wide swath of screen area. In order to widen a narrow cone of light, the light source is placed at a relatively long distance away from the screen edge. In one embodiment, the light source is placed underneath the screen, at an appropriate distance from the screen edge to allow for a gradual widening of the beam. The widened beam is reflected above the screen surface by reflectors placed near the screen edge.

In another embodiment of the present invention the light source is placed along a screen edge. Reflectors that reflect light over the screen surface are also placed along the same screen edge, at a suitable distance away from the light source, to allow for a gradual widening of the light beam before it is reflected over the screen surface. The light source emits a narrow cone of light substantially along the screen edge, and the light is reflected as a wide beam over the screen surface. A pointer, such as a finger or stylus, touching the screen blocks some of the emitted light. By measuring the blocked light, the location of the pointer on the screen is determined.

In an embodiment of the present invention the wide beam converges onto a narrow light detector after traversing the screen, via reflectors placed a suitable distance away from respective light detectors. The light detectors are placed either underneath the screen, or along a screen edge.

Touch Screens with Shift-Aligned Emitters and Receivers

In these embodiments of the present invention an arrangement of light emitters send light over the screen surface to an arrangement of light receivers, where the emitters are shift-aligned with the opposing receivers. As such, instead of light from each emitter being detected by one opposite receiver, light from each emitter arrives at two opposite receivers. Similarly, instead of each receiver detecting light from one opposite emitter, each receiver detects light from two opposite emitters. Such overlapping detection ensures that a touch on the screen is detected by at least two emitter-receiver pairs. In some embodiments an arrangement of shift-aligned lenses is used to ensure that light from each emitter arrives at two opposite receivers, and that each receiver detects light from two opposite emitters.

There is thus provided in accordance with an embodiment of the present invention a touch screen including a housing, a display mounted in the housing, a row of light pulse emitters, mounted in the housing, that transmit light pulses over the display, a row of light pulse receivers, mounted in the housing, that receive the light pulses, and a calculating unit, mounted in the housing and connected to the receivers, that determines a location of a pointer on the display that partially blocks the light pulses transmitted by the emitters, based on outputs of the receivers, wherein the emitters are shift-aligned with the receivers.

There is additionally provided in accordance with an embodiment of the present invention a touch screen including a housing, a display mounted in the housing, a frame of collimating lenses surrounding the display, wherein the collimating lenses along a first edge of the frame are shift-aligned with the collimating lenses along an opposite edge of the frame, a plurality of light pulse emitters mounted in the housing that transmit light pulses over the display through the collimating lenses of the first edge, a plurality of light pulse receivers mounted in the housing that receive the light pulses through the collimating lenses of the opposite edge, and a calculating unit, mounted in the housing and connected to the receivers, to determine a location of a pointer on the display that partially blocks the light pulses transmitted by the emitters, based on outputs of the receivers.

There is further provided in accordance with an embodiment of the present invention a touch screen including a housing, a display mounted in the housing, a plurality of collimating lenses mounted in the housing and surrounding the display, wherein the collimating lenses along a first edge of the display are shift-aligned with the collimating lenses along an opposite edge of the display, a plurality of light pulse emitters mounted in the housing that transmit light pulses over the display through the collimating lenses of the first edge, a plurality of light pulse receivers mounted in the housing that receive the light pulses through the collimating lenses of the opposite edge, and a calculating unit, mounted in the housing and connected to the receivers, to determine a location of a pointer on the display that partially blocks the light pulses transmitted by the emitters, based on outputs of the receivers.

Aspects of the present invention employ a novel collimating lens coupled with a surface of micro-lenses that refract light to form multiple wide divergent beams. When the surface of micro-lenses is on a surface not facing an emitter or receiver element, such a collimating lens transmits light in two stages. As light passes through the body of the lens, light beams are collimated, as with conventional collimating lenses. However, as the light passes through the surface of micro-lenses, the light is refracted into multiple wide divergent beams. When the surface of micro-lenses is on a surface facing an emitter or receiver element, such a collimating lens outputs beams substantially similar to those produced by a collimating lens having an outer surface of micro-lenses.

Touch Screens with Highly Refractive Lenses

In these embodiments of the present invention an arrangement of one or more light emitters send light over the screen surface to an arrangement of one or more light receivers. The light emitters and the light receivers use highly refractive lenses. Light passing through the lenses on the emitter side creates a pattern of highly divergent light beams that traverse the screen, thus ensuring that (a) a pointer touching the screen will block multiple light beams originating along a large section of the emitter edge, and (b) at any point along the receiver edge of the screen, multiple light beams originating along a large section of the emitter edge converge. As such, a touch on the screen is detected by each of multiple beams along a large section of the receiver edge. The lenses on the receiver side refract multiple incoming light beams to ensure that the beams converging at each point along the receiver edge are detected by the receivers.

There is thus provided in accordance with an embodiment of the present invention a touch screen including a housing, a display mounted in the housing, a light guide frame surrounding the display, the frame including patterns of micro-lenses along two opposing sides of the frame for refracting incoming light in multiple directions, a plurality of light pulse emitters mounted in the housing that transmit light pulses over the display through the patterns of micro-lenses along a first edge of the frame, a plurality of light pulse receivers mounted in the housing that receive the light pulses through the patterns of micro-lenses along the opposite edge of the frame, and a calculating unit, mounted in the housing and connected to the receivers, to determine a location of a pointer on the display that partially blocks the light pulses transmitted by the emitters, based on outputs of the receivers.

There is additionally provided in accordance with an embodiment of the present invention a touch screen including a housing, a display mounted in the housing, two light guides mounted in the housing and arranged along two opposite edges of the display, each light guide including a pattern of micro-lenses for refracting incoming light in multiple directions, a plurality of light pulse emitters mounted in the housing that transmit light pulses over the display through a first light guide, a plurality of light pulse receivers mounted in the housing that receive the light pulses through a second light guide, and a calculating unit, mounted in the housing and connected to the receivers, to determine a location of a pointer on the display that partially blocks the light pulses transmitted by the emitters, based on outputs of the receivers.

Further, in accordance with an embodiment of the present invention, the light emitters and light receivers are positioned below the screen surface, and light is directed above and across the screen surface by a first light guide positioned along a first screen edge, the light guide including a collimating lens for each light emitter, each collimating lens having a plurality of micro-lenses etched thereon. The collimating lenses are positioned below the screen surface.

Yet further, in accordance with an embodiment of the present invention, a second light guide is positioned along a second screen edge opposite the first screen edge, to direct light beams from the first light guide to the light receivers below the screen surface. Moreover, the second light guide may be substantially similar to the first light guide, including a lens with a plurality of micro-lenses etched thereon for each light receiver.

There is additionally provided in accordance with an embodiment of the present invention a touch screen system, including a plurality of light emitters and light receivers that are positioned along respective opposite edge of the screen, and not below the screen surface. Light is directed from the emitters across the screen surface by collimating lenses that have a plurality of micro-lenses etched thereon, and directed to the receivers by similar lenses.

Touch Screens with a Low Bezel

In these embodiments of the present invention an arrangement of one or more light emitters send light over the screen surface to an arrangement of one or more light receivers. Both the light emitters and the light receivers are placed below the screen surface. Light from the emitters is reflected over the screen by a reflective light guide that extends above the screen. Similarly, light that has passed over the screen surface is reflected onto the receivers by a reflective light guide. The height of these reflective light guides above the screen creates a bezel surrounding the screen. A conventional reflective light guide has a substantially flat reflective surface inclined at a 45° angle to the screen surface. Light beams vertical to the screen are re-directed by the light guide to a plane substantially parallel with the screen surface. However, substantially all of the reflective surface extends above the screen surface, forming a bezel around the screen. In order to reduce the bezel height, embodiments of the present invention use a light guide having a parabolic reflective surface and a corresponding refractive elliptical surface to re-direct the light beams. The parabolic reflective surface does not extend substantially above the screen surface, thus reducing the bezel height around the screen. Furthermore, the conventional light guide generally has a second surface substantially vertical to the screen surface through which light beams enter and exit. The abrupt vertical edge makes the bezel prominent and may be difficult to clean. The elliptical refractive surface used in embodiments of the present invention is less prominent, and is easier to clean. In some embodiments the elliptical refractive surface is part of the screen glass.

There is thus provided in accordance with an embodiment of the present invention a touch screen including a housing, a display mounted in the housing, a plurality of light pulse emitters mounted in the housing below the display, a plurality of light pulse receivers mounted in the housing below the display, a first light guide, mounted in the housing along a first edge of the display, having a substantially parabolic reflective surface and a substantially elliptical refractive surface for, respectively, reflecting and refracting light pulses transmitted by the emitters over the display, a second light guide, mounted in the housing along an opposite edge of the display, having a substantially elliptical refractive surface and a substantially parabolic reflective surface for, respectively, refracting and reflecting light pulses transmitted over the display to the receivers, and a calculating unit, mounted in the housing and connected to the receivers, to determine a location of a pointer on the display that partially blocks the light pulses transmitted by the emitters, based on outputs of the receivers.

There is additionally provided in accordance with an embodiment of the present invention a touch screen including a housing, a display mounted in the housing, a plurality of light pulse emitters mounted in the housing below the display, a plurality of light pulse receivers mounted in the housing below the display, a light guide frame mounted in the housing and surrounding the display, having a substantially parabolic reflective surface and a substantially elliptical refractive surface along each edge for, respectively, reflecting and refracting light pulses transmitted by the emitters over the display to the receivers, and a calculating unit, mounted in the housing and connected to the receivers, to determine a location of a pointer on the display that partially blocks the light pulses transmitted by the emitters, based on outputs of the receivers.

There is further provided in accordance with an embodiment of the present invention a touch system, including a plurality of light emitters and light receivers positioned below the screen surface, and light is directed above and across the screen surface by light guides that each have at least two units; namely, a first unit having a collimating lens at one end and a plurality of micro-lenses along a surface at the other end, and a second unit that re-directs light over the screen surface.

Yet further, the second unit includes at least two active surfaces; namely, a first surface that is a parabolic or a quasi-parabolic reflective surface that folds incoming light beams into a focal location, and a second surface that is a complementary elliptical or quasi-elliptical surface having the same focal location, wherein the second surface directs the folded light beams over the screen surface.

There is moreover provided in accordance with an embodiment of the present invention a touch screen system, including a plurality of light emitters and light receivers positioned below a display screen, and a first light guide along at least one edge of the screen that reflects light from the emitters above the screen. The light guide includes at least two active surfaces; namely, a first surface that is a parabolic or a quasi-parabolic reflective surface that folds incoming light beams into a focal location, and a second surface that is a complementary elliptical or quasi-elliptical surface having the same focal location. The second surface directs the folded light beams over the screen surface.

Additionally, a second light guide is positioned opposite the first light guide across the screen, to direct light beams from the first light guide to light receivers below the screen. The second light guide may be substantially similar to the first light guide.

Touch Screens using Long Thin Light Guides

There is provided in accordance with an embodiment of the present invention a touch screen including a housing, a display mounted in the housing, a plurality of collimating lenses mounted in the housing and arranged along a first edge of the display, a plurality of light pulse emitters mounted in the housing that are spaced apart from and serially transmit light pulses through the collimating lenses over the display, a light guide mounted in the housing along the edge of the display opposite the first edge, for receiving the light pulses, the light guide including a reflective strip that reflects light pulses received along the length of the light guide to one end of the light guide, a light pulse receiver mounted in the housing near the one end of the light guide, for receiving the reflected light pulses, and a calculating unit, mounted in the housing and connected to the receiver, for determining a location of a pointer on the display that partially blocks light pulses transmitted by the emitters, based on outputs of the receiver.

There is additionally provided in accordance with an embodiment of the present invention a touch screen including a housing, a display mounted in the housing, a light guide mounted in the housing along a first edge of the display, the light guide including a reflective strip that reflects light pulses received along the length of the light guide to both ends of the light guide, a plurality of light pulse receivers mounted in the housing near each end of the light guide, for receiving the reflected light pulses, a plurality of collimating lenses mounted in the housing along the edge of the display opposite the first edge, a plurality of light pulse emitters mounted in the housing that are spaced apart from and emit light pulses over the display though the collimating lenses, and a calculating unit, mounted in the housing and connected to the receivers, for determining a location of a pointer on the display that partially blocks the light pulses transmitted by the emitters, based on outputs of the receivers.

There is further provided in accordance with an embodiment of the present invention a touch screen including a housing, a display mounted in the housing, a light guide mounted in the housing along a first edge of the display, the light guide including a reflective strip that reflects light pulses received at one end of the light guide, a light pulse emitter mounted in the housing near the one end of the light guide, for transmitting light pulses through the light guide, wherein the reflective strip reflects the light pulses over the display, a plurality of collimating lenses mounted in the housing along the edge of the display opposite the first edge, a plurality of light pulse receivers mounted in the housing that are spaced apart from and receive light pulses through the collimating lenses, and a calculating unit, mounted in the housing and connected to the receivers, for determining a location of a pointer on the display that partially blocks the light pulses transmitted by the emitter, based on outputs of the receivers.

There is yet further provided in accordance with an embodiment of the present invention a touch screen including a housing, a display mounted in the housing, a light guide mounted in the housing along a first edge of the display, the light guide including a reflective strip that reflects light pulses received at either end of the light guide, a plurality of light pulse emitters mounted in the housing near each end of the light guide, for transmitting light pulses through the light guide, wherein the reflective strip reflects the light pulses over the display, a plurality of collimating lenses mounted in the housing along the edge of the display opposite the first edge, a plurality of light pulse receivers mounted in the housing that are spaced apart from and receive light pulses through the collimating lenses, and a calculating unit, mounted in the housing and connected to the receivers, for determining a location of a pointer on the display that partially blocks the light pulses transmitted by the emitters, based on outputs of the receivers.

Touch Screens Using a Reflected Image to Determine a Height of a Pointer Above a Touch Screen There is provided in accordance with an embodiment of the present invention a touch screen system including a reflective display surface, a camera mounted so as to capture an image of (i) the reflective display surface, (ii) a pointer approaching the reflective display surface, and (iii) a reflection of the pointer on the reflective display surface, and a processor coupled with the camera that determines a three-dimensional location of the pointer relative to the reflective display surface, based on the positions of the pointer and the reflection of the pointer in the image captured by the camera.

Pressure-Sensitive Light-Based Touch Screens

There is provided in accordance with an embodiment of the present invention a light-based touch screen that discriminates between hard touches and soft touches. In one embodiment, a rigidly mounted screen is surrounded by emitters and receivers. A hard touch is discriminated from a soft touch by an increase in detected light at a plurality of receivers, the increase resulting from a bending of the rigidly mounted screen caused by the hard touch. In another embodiment, a screen is flexibly mounted in a housing surrounded by rigidly mounted emitters and receivers. The pressure of the touch lowers the screen into the housing, resulting in an increase in detected light at a plurality of the receivers. Different amounts of pressure correspond to differences in the increased amounts of detected light.

Methods for Touch Detection

There is provided in accordance with an embodiment of the present invention a method of calculating a touch coordinate on a touch screen, including providing a display, a row of light pulse emitters that transmit light pulses over the display, and a row of light pulse receivers that receive the light pulses and that output signals representing the received light pulses, wherein the emitters are shift-aligned with corresponding receivers, detecting a touch on the display that partially blocks the light pulses, based on the receiver outputs, selecting a maximum touch detection receiver output, identifying the emitter-receiver pair corresponding to the maximum touch detection receiver output, selecting at least one emitter-receiver pair to the left, and at least one emitter-receiver pair to the right of the maximum touch detection emitter-receiver pair, for each of the at least three emitter-receiver pairs, identifying a respective corresponding touch screen coordinate, for each of the at least three emitter-receiver pairs, calculating a product of the emitter-receiver pair coordinate and its respective touch detection output signal, calculating a first sum of the products, calculating a second sum of the receiver outputs, calculating a spatially-filtered touch coordinate by dividing the first sum by the second sum, providing a reference touch coordinate based on previous touch detection signals, calculating a temporally-filtered touch coordinate based on the spatially-filtered touch coordinate and the reference touch coordinate, and assigning either (i) the temporally-filtered touch coordinate value, or (ii) a value that combines the temporally-filtered touch coordinate and the reference touch coordinate, to the reference touch coordinate.

There is additionally provided in accordance with an embodiment of the present invention a touch screen system, including a plurality of light emitters and light receivers, wherein light from each emitter is detected by more than one receiver, and each receiver detects light from more than one emitter. Further, a touch location is determined based on (a) signal difference at two receivers that detect light from the same emitter, and/or (b) signal difference at a receiver that detects light from two emitters. Alternatively, a touch location is determined based on (a) signal differences at three or more receivers that detect light from the same emitter, and (b) signal differences at a receiver that detects light from three or more emitters. Yet further, each emitter is situated opposite a midpoint between two receivers, and each receiver is situated opposite a midpoint between two emitters, with the exception of emitters and receivers at or near screen corners.

There is additionally provided in accordance with an embodiment of the present invention a touch screen system operable to disambiguate a mufti-touch operation. Certain mufti-touch operations generate two or more touch x-coordinates and two or more touch y-coordinates. In such situations it is essential to resolve which x-coordinate is associated with which y-coordinate. E.g., when two touches performed simultaneously are not aligned vertically or horizontally, the two touches generate two touch x-coordinates and two touch y-coordinates. Similarly, in response to a rotation gesture, where two fingers touch the screen and glide in a circular pattern around an axis, the screen display, or a screen element display, is rotated either clockwise or counter-clockwise, according to the sense of the rotation gesture. As such, it is essential to resolve whether the sense of the rotation gesture is clockwise or counter-clockwise. Aspects of the present invention provide a touch screen system that uses intensities of touch detections to resolve mufti-touch touch locations, and to resolve the sense of a rotation gesture as being clockwise or counter-clockwise.

Methods for Calibrating Touch Screen Components

There is provided in accordance with an embodiment of the present invention a method of calibrating optical components in a light-based touch screen, including providing a display, a row of light pulse emitters that transmit light pulses over the display according to pulse current and pulse duration controls, and a row of light pulse receivers that receive the light pulses and that output signals representing the received light pulses, determining whether a touch event occurred on the display that partially blocks the light pulses, based on the receiver outputs, if the determining determines that a touch event has not occurred, then further determining if the receiver outputs are stable, if the further determining determines that the receiver outputs are stable, then yet further determining if each receiver output is within a respective designated deviation from a respective reference value of the receiver, if the yet further determining determines that at least one receiver output is not within its designated deviation from its reference value, then modifying at least one emitter pulse current and pulse duration, and if the yet further determining determines that all receiver outputs are within their respective designated deviations from their respective reference values, then assigning the respective receiver outputs to their respective reference values.

There is additionally provided in accordance with an embodiment of the present invention a method of calibrating optical components in a light-based touch screen, including providing a display, a row of light pulse emitters that transmit light pulses over the display, and a row of light pulse receivers that receive the light pulses and that output signals representing the received light pulses, determining whether a touch event occurred on the display that partially blocks the light pulses, based on some of the receiver outputs, if the determining determines that a touch event has occurred, then further determining if the remaining receiver outputs are stable, if the further determining determines that the remaining receiver outputs are stable, then yet further determining whether the remaining receiver outputs are within respective designated deviations from respective reference values of the receivers, and if the yet further determining determines that the remaining receiver outputs are within their respective designated deviations from their respective reference values, then assigning the respective remaining receiver outputs to their respective reference values.

Inter-Fitting Lens Blocks

There is provided in accordance with an embodiment of the present invention a touch screen assembled from pre-fabricated lens blocks. Each block is comprised of infra-red transmissive plastic, and is formed as a collimating lens or as a multi-directional collimating lens. Each block includes an embedded emitter or receiver that is precisely positioned vis-à-vis the collimating lens. The blocks are formed with curved edges that fit into one another, and whereby light from each block enters a neighboring block.

Precision Placement of Elements Using a Capillary Effect

There is provided in accordance with an embodiment of the present invention a method of assembling components including inter alia emitters, receivers and lenses, in a device, wherein a component is placed into a cavity on the device substrate or guide mold, and a solder pad is placed near the cavity. When the device is inserted into an oven, the solder pad melts and the capillary effect of the molten solder near the cavity guides the element deep into the cavity.

BRIEF DESCRIPTION OF THE DRAWINGS

The present invention will be more fully understood and appreciated from the following detailed description, taken in conjunction with the drawings in which.

Figure 1:
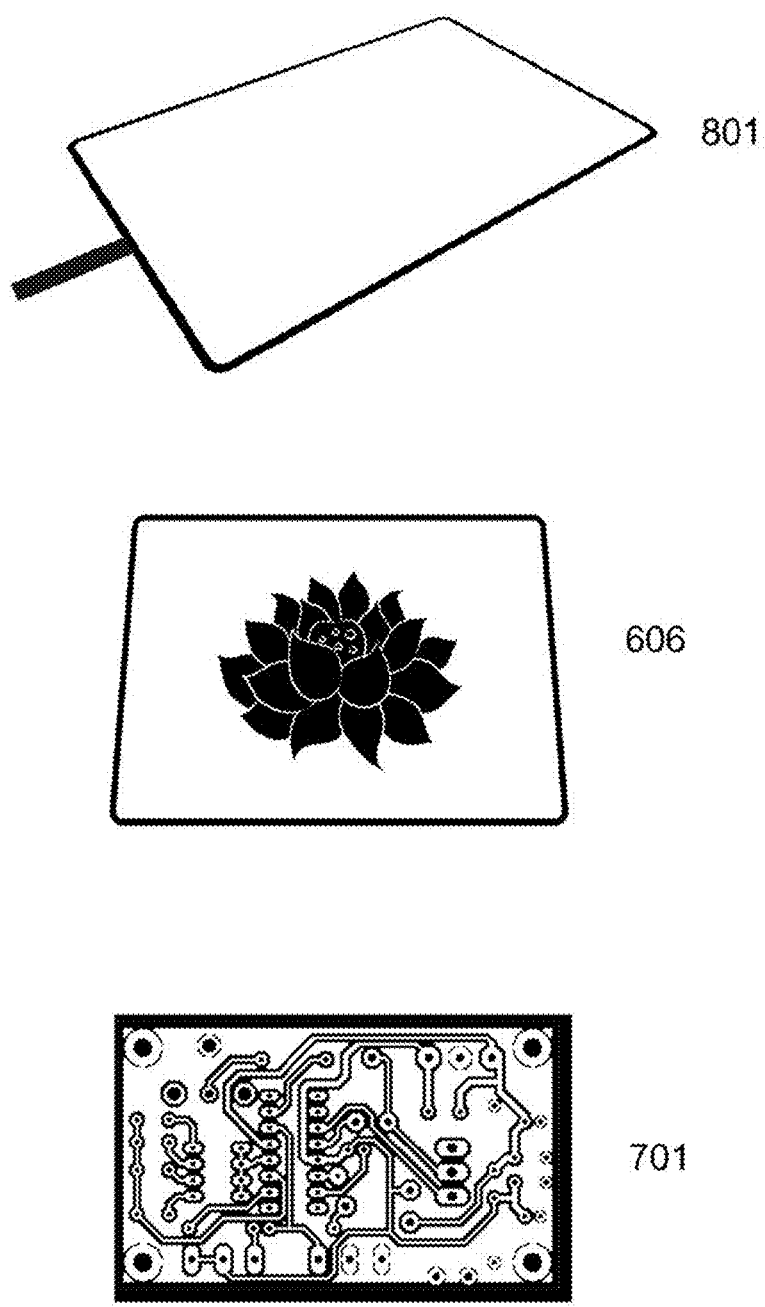
FIG. 1 is a prior art illustration of a conventional touch screen system.
Figure 2:
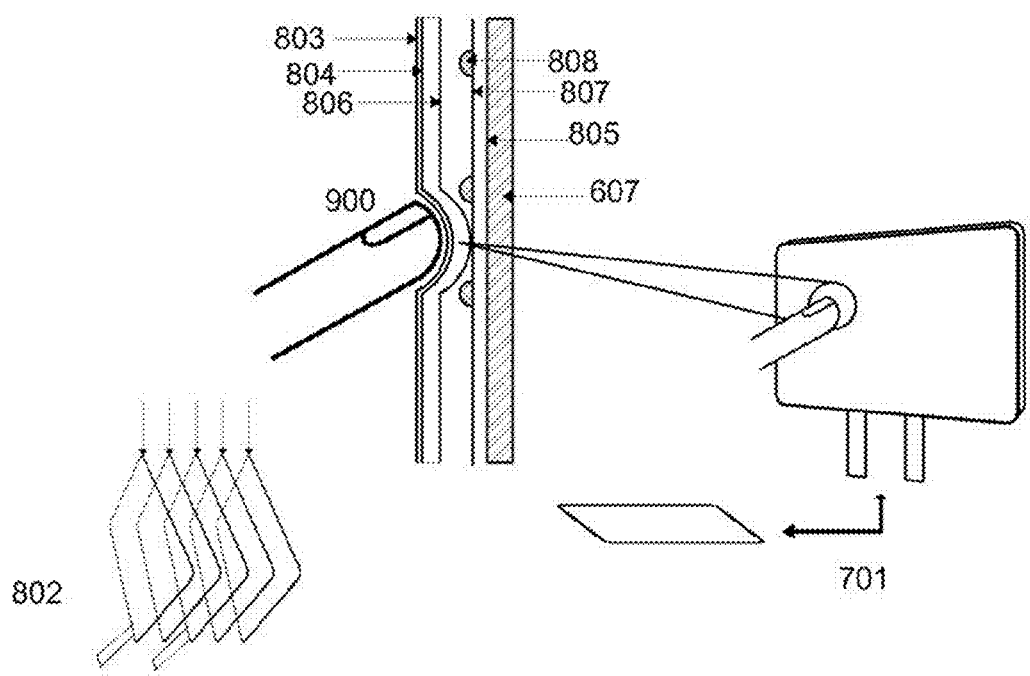
FIG. 2 is a prior art illustration of a conventional resistive touch screen.
Figure 3:
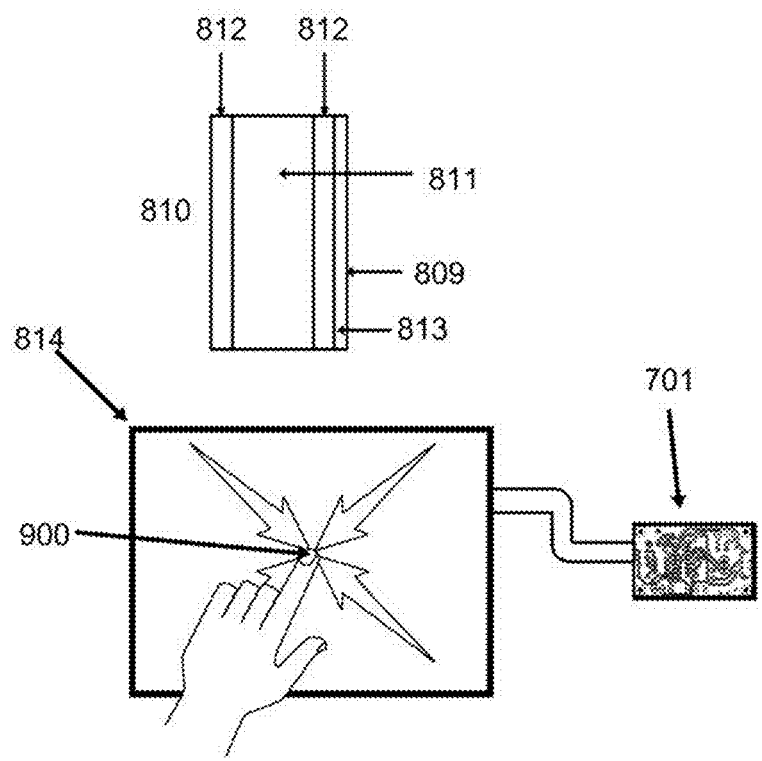
FIG. 3 is a prior art illustration of a conventional surface capacitive touch screen.
Figure 4:
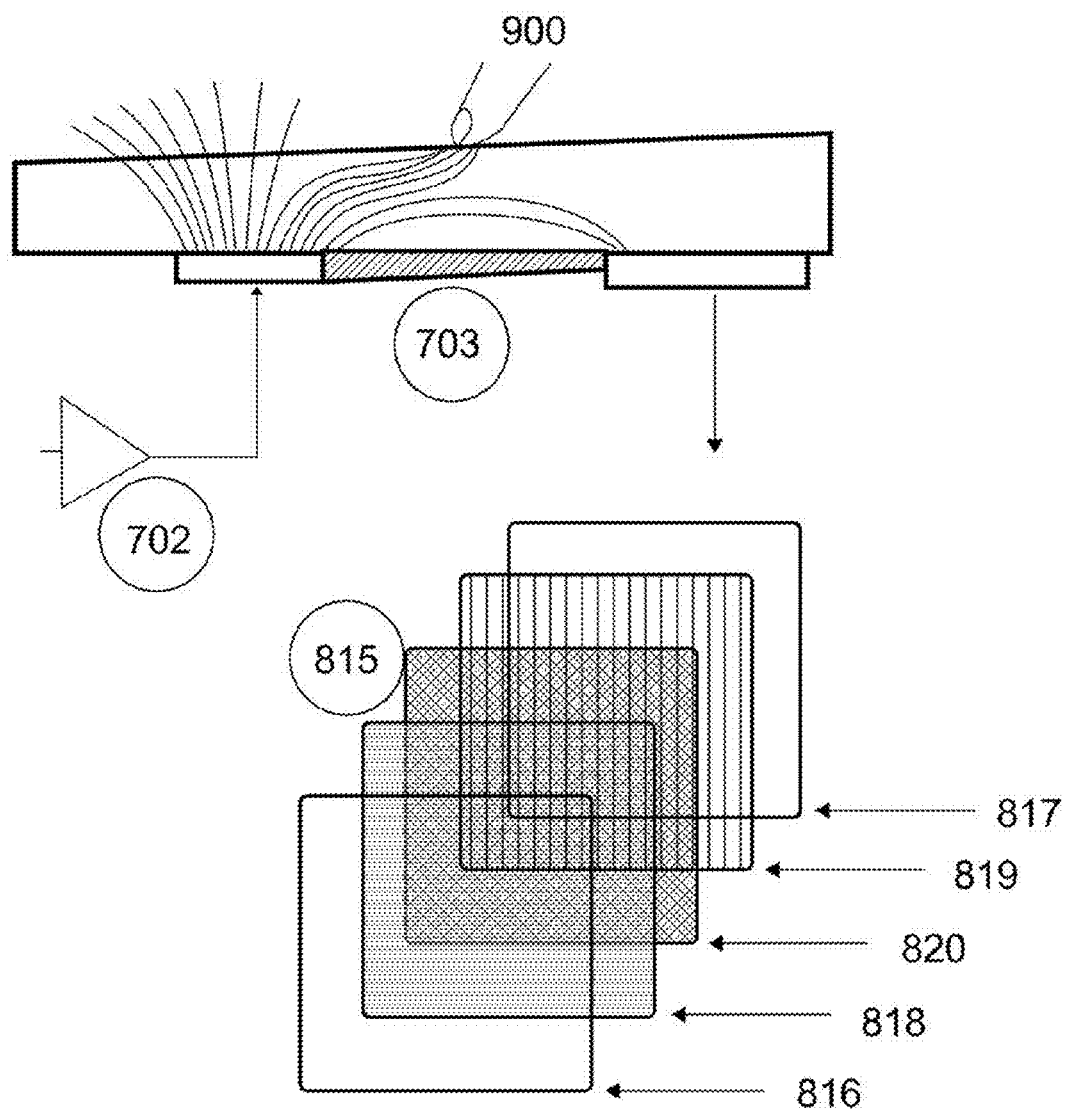
FIG. 4 is a prior art illustration of a conventional projected capacitive touch screen.

For reference to the figures, the following index of elements and their numerals is provided. Elements numbered in the 100's generally relate to light beams, elements numbered in the 200's generally relate to light sources, elements numbered in the 300's generally relate to light receivers, elements numbered in the 400's and 500's generally relate to light guides, elements numbered in the 600's generally relate to displays, elements numbered in the 700's generally relate to circuit elements, elements numbered in the 800's generally relate to electronic devices, and elements numbered in the 900's generally relate to user interfaces. Elements numbered in the 1000's are operations of flow charts.

Similarly numbered elements represent elements of the same type, but they need not be identical elements.

| Elements generally related to light beams | |
|---|---|
| Element | Description |
| 100-102 | Generic light beams |
| 105, 106 | Reflected light beam |
| 142 | Arc of light output from light source |
| 143 | Arc of light input to light receiver |
| 144 | Wide light beams |
| 145-148 | Edge of wide light beam |
| 151-154 | Light beams |
| 158 | Wide light beam |
| 167-169 | Wide light beam |
| 170-172 | Signals received by light receivers |
| 173 | Beam from 1 emitter to 2 receivers |

| Elements generally related to light beams | |
|---|---|
| Element | Description |
| 174 | Beam from 1 emitter to 1$^{st}$ receiver |
| 175 | Beam from 1 emitter to 2$^{nd}$ receiver |
| 176 | Beam from emitter to 1$^{st}$ receiver |
| 177 | Beam from emitter to 2$^{nd}$ receiver |
| 178 | Beam from 1 emitter to 1$^{st}$ receiver |
| 179 | Beam from 1 emitter to 2$^{nd}$ receiver |
| 182 | Beam from 1 emitter to 2 receivers |
| 183-188 | Middle of arc of light |
| 190 | Light beams output from light source |
| 191 | Light beams input to light receiver |
| 192 | Arcs of light |

| Elements generally related to light sources | |
|---|---|
| Element | Description |
| 200-203 | Generic light emitters |
| 235-241 | Light emitters |

| Elements generally related to light receivers | |
|---|---|
| Element | Description |
| 300-305 | Generic light receivers |
| 394 | Light receiver |
| 398 | Light receiver/light emitter |

| Elements generally related to light guides | |
|---|---|
| Element | Description |
| 400 | Generic lens |
| 401, 402 | Fiber optic light guides |
| 407 | Raised reflector bezel |
| 408 | Cutout |
| 437, 438 | Reflector & lens |
| 439-443 | Lens |
| 444 | Micro-lenses |
| 445 | Surface with fan of micro-lenses |
| 450 | Light guide |
| 451, 452 | Internally reflective surface |
| 453, 454 | Light guide surface |
| 455 | Light guide |
| 456 | Internally reflective surface |
| 457 | Collimating lens & reflective surface |
| 458 | Micro-lenses |
| 459 | Light guide surface |
| 460 | Surface with fan of micro-lenses |
| 461 | Lens |
| 462 | Micro-lenses |
| 463 | Upper portion of light guide |
| 464 | Lower portion of light guide |
| 465 | Light guide surface |
| 466 | Surface with parallel row micro-lenses |
| 467 | Parallel row pattern of micro-lenses |
| 468 | Light guide |
| 469, 470 | Internally reflective surface |
| 471 | Light guide surface |
| 472 | Light guide |
| 473 | Internally reflective surface |
| 474 | Light guide surface |
| 475 | Focal line of a lens |
| 476 | Light guide |
| 477 | Internally reflective surface |
| 478 | Light guide surface |
| 479 | Light guide |

| Elements generally related to light guides | |
|---|---|
| Element | Description |
| 480 | Internally reflective surface |
| 481 | Light guide surface |
| 482 | Black plastic transmissive element |
| 483 | Light guide |
| 484 | Surface with fan of micro-lenses |
| 485 | Upper portion of light guide |
| 486 | Lower portion of light guide |
| 487 | Surface with parallel row micro-lenses |
| 488, 489 | Optical component |
| 490-492 | Surface of optical component |
| 493 | Lens |
| 494-497 | Optical component |
| 498, 499 | Light guide |
| 500-501 | Emitter optical component block |
| 502-503 | Receiver optical component block |
| 504 | Emitter lenses |
| 505 | Receiver lenses |
| 506, 507 | Emitter optical component |
| 508-510 | Receiver optical component |
| 511 | Emitter optical component |
| 512 | Receiver optical components |
| 513 | Optical component/temporary guide |
| 514 | Long thin light guide |
| 515 | Light guide reflector |
| 516 | Micro-lenses |
| 517 | Light scatterer strip |
| 518, 519 | Light guides |
| 520, 521 | Protruding lips on light guides |
| 522, 523 | Relative position of light guide element |
| 524 | Clear, flat glass |
| 525 | Collimating lens |
| 526 | Clear flat glass with micro-lens surface |
| 527 | Collimating lens with micro-lens surface |

| Elements generally related to displays | |
|---|---|
| Element | Description |
| 600 | Generic screen glass |
| 606 | LCD display (prior art) |
| 607 | Screen glass (prior art) |
| 635-637 | Display |
| 638 | Protective glass |
| 639 | Daylight filter sheet |
| 640 | Protective glass |
| 641 | Daylight filter sheet |
| 642, 643 | Display |
| 645 | Reflection on display glass |

| Elements generally related to circuit elements | |
|---|---|
| Element | Description |
| 700 | Generic printed circuit board |
| 701 | Controller integrated circuit (pr. art) |
| 702 | AC input signal (prior art) |
| 703 | Output signal (prior art) |
| 720 | Shift register for column activation |
| 730 | Shift register for column activation |
| 760, 761 | Electrical pad |
| 762, 763 | Printed circuit board |
| 764 | Guide pin |
| 765 | Solder pad |
| 766 | Component solder pad |
| 767 | Solder pads after heat oven |
| 768, 769 | Notch in optical component/guide |
| 770 | Calculating unit |
| 771 | Clip-on fastener |

| Elements generally related to touch-based electronic devices | |
|---|---|
| Element | Description |
| 800 | Generic touch screen |
| 801 | Touch overlay (prior art) |
| 802 | Conductive & resistive layers (pr. art) |
| 803 | PET film (prior art) |
| 804 | Top circuit layer (prior art) |
| 805 | Bottom circuit layer (prior art) |
| 806, 807 | Conductive coating (prior art) |
| 808 | Spacer dot (prior art) |
| 809 | Touch surface (prior art) |
| 810 | Coated glass substrate (prior art) |
| 811 | Glass substrate (prior art) |
| 812 | Conductive ITO coating (prior art) |
| 813 | Silicon dioxide hard coating (prior art) |
| 814 | Electrode (prior art) |
| 815 | Etched ITO layers (prior art) |
| 816, 817 | Hard coat layer (prior art) |
| 818 | x-axis electrode pattern (prior art) |
| 819 | y-axis electrode pattern (prior art) |
| 820 | ITO glass (prior art) |
| 826 | Electronic device |
| 827-834 | Device casing |
| 841, 842 | Resilient members |
| 843 | Flex air gap |
| 844-847 | Image sensors |
| 848 | Laptop computer |

| Elements generally related to user interfaces | |
|---|---|
| Element | Description |
| 900-903 | Pointer/finger/thumb/stylus |
| 905-908 | Detected touch area |
| 965-970 | Touch icons |
| 971, 972 | Touch points |
| 973-976 | Light signal attenuation area |
| 977 | Point on lens |
| 980 | Touch point |
| 981, 982 | Point on lens |
| 989, 990 | Pin |
| 991-993 | Active touch area |
| 996-999 | Mid-line between pointer and reflection |

DETAILED DESCRIPTION

Aspects of the present invention relate to light-based touch screens and light-based touch surfaces.

For clarity of exposition, throughout the present specification the term "touch screen" is used as a generic term to refer to touch sensitive surfaces that may or may not include an electronic display. As such, the term "touch screen" as used herein includes inter alia a mouse touchpad as included in many laptop computers, and the cover of a handheld electronic device. The term "optical touch screen" is used as a generic term to refer to light-based touch screens, including inter alia screens that detect a touch based on the difference between an expected light intensity and a detected light intensity, where the detected light intensity may be greater than or less than the expected light intensity. The term "screen glass" is used as a generic term to refer to a transparent screen surface. The screen may be constructed inter alia from glass, or from a non-glass material including inter alia crystal, acrylic and plastic. In some embodiments of the present invention, the screen allows near-infrared light to pass through, but is otherwise non-transparent.

For clarity of exposition, throughout the present specification, the term "emitter" is used as a generic term to refer to a light emitting element, including inter alia a light-emitting diode (LED), and the output end of a fiber optic or tubular light guide that outputs light into a lens or reflector that directs the light over a display surface. The term "receiver" is used as a generic term to refer to a light detecting element, including inter alia a photo diode (PD), and the input end of a fiber optic or tubular light guide that receives light beams that traversed a display surface and directs them to a light detecting element or to an image sensor, the image sensor being inter alia a charge coupled device (CCD) or a complementary metal oxide semiconductor (CMOS) image sensor.

Figure 5:
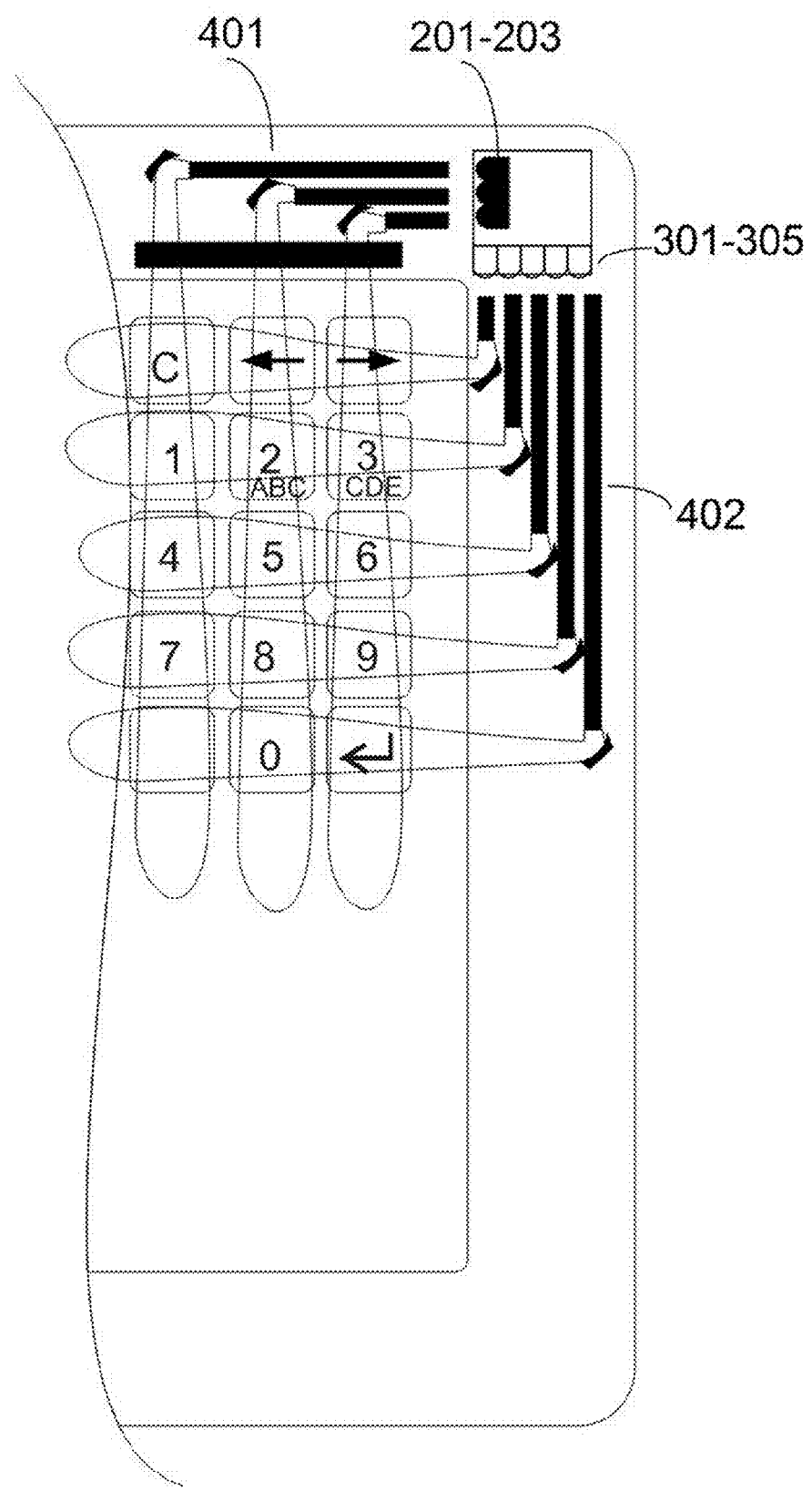
FIG. 5 is an illustration of a portion of a touch screen including a plurality of emitters that are positioned close together, wherein light is guided by fiber optic light guides to locations along a first screen edge, in accordance with an embodiment of the present invention.

Reference is made to FIG. 5, which is an illustration of a portion of a touch screen including a plurality of emitters 201-203 that are positioned close together, wherein light is guided by fiber optic light guides 401 to locations along a first screen edge, in accordance with an embodiment of the present invention. The portion of the touch screen also includes a plurality of receivers 301-305 that are positioned close together, wherein light is guided thereto by fiber optic light guides 402 from locations a long a second screen edge.

According to embodiments of the present invention, a light-based touch screen includes one or more emitters, including inter alia infra-red or near infra-red light-emitting diodes (LEDs), and a plurality of receivers, including inter alia photo diodes (PDs), arranged along the perimeter surrounding the touch screen or touch surface. The emitters project light substantially parallel to the screen surface, and this light is detected by the receivers. A pointer, such as a finger or a stylus, placed over a portion of the screen blocks some of the light beams, and correspondingly some of the receivers detect less light intensity. The geometry of the locations of the receivers, and the light intensities they detect, suffice to determine screen coordinates of the pointer. The emitters and receivers are controlled for selective activation and de-activation by a controller. Generally, each emitter and receiver has I/O connectors, and signals are transmitted to specify which emitters and which receivers are activated.

In an embodiment of the present invention, plural emitters are arranged along two adjacent sides of a rectangular screen, and plural receivers are arranged along the other two adjacent sides. In this regard, reference is now made to FIG. 6, which is a diagram of a touch screen 800 having 16 emitters 200 and 16 receivers 300, in accordance with an embodiment of the present invention. Emitters 200 emit infra-red or near infra-red light beams across the top of the touch screen, which are detected by corresponding receivers 300 that are directly opposite respective emitters 200. When a pointer touches touch screen 800, it blocks light from reaching some of receivers 300. By identifying, from the receiver outputs, which light beams have been blocked by the pointer, the pointer's location can be determined.

Figure 6:
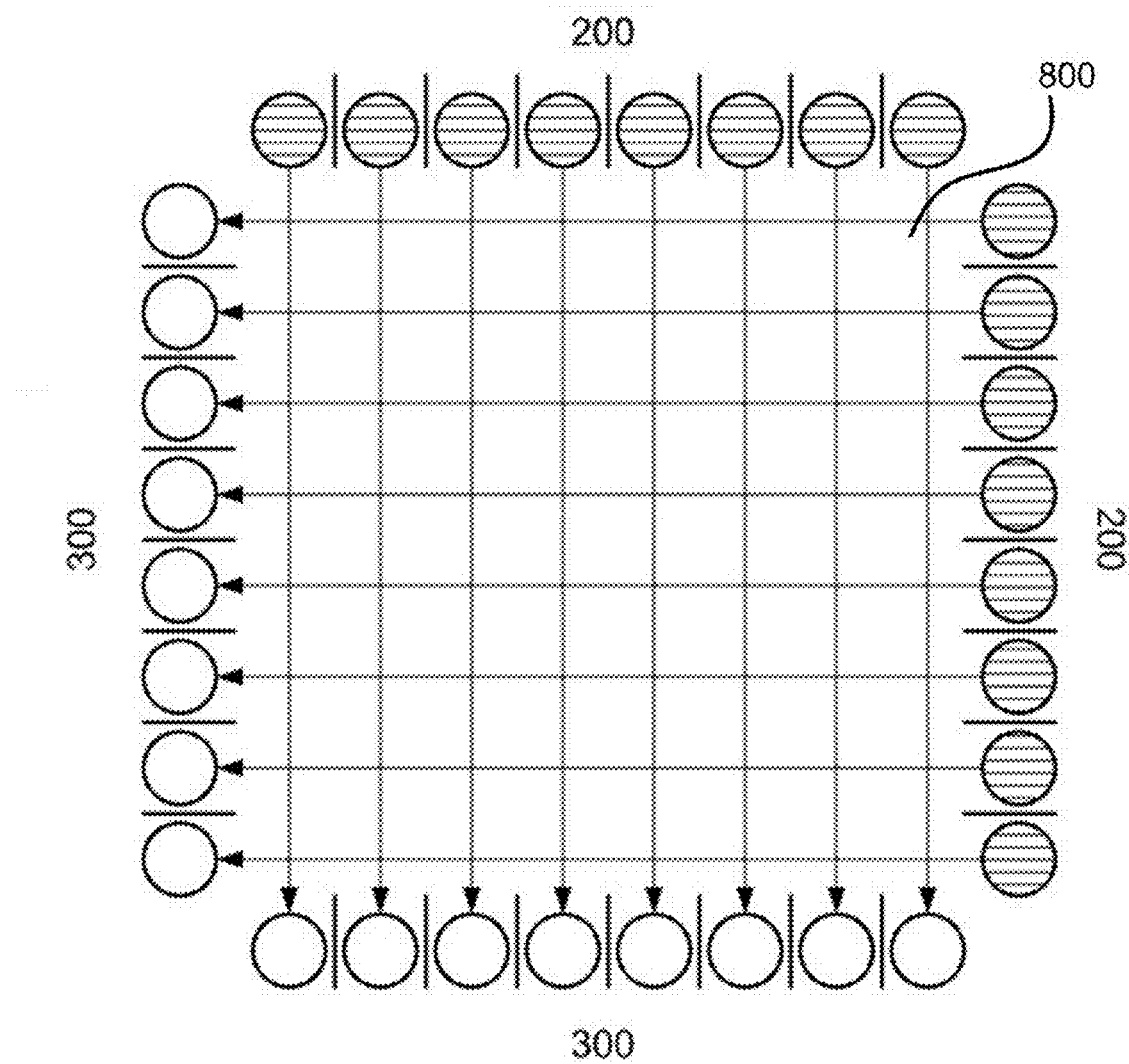
FIG. 6 is a diagram of a touch screen having 16 emitters and 16 receivers, in accordance with an embodiment of the present invention.
Figure 7:
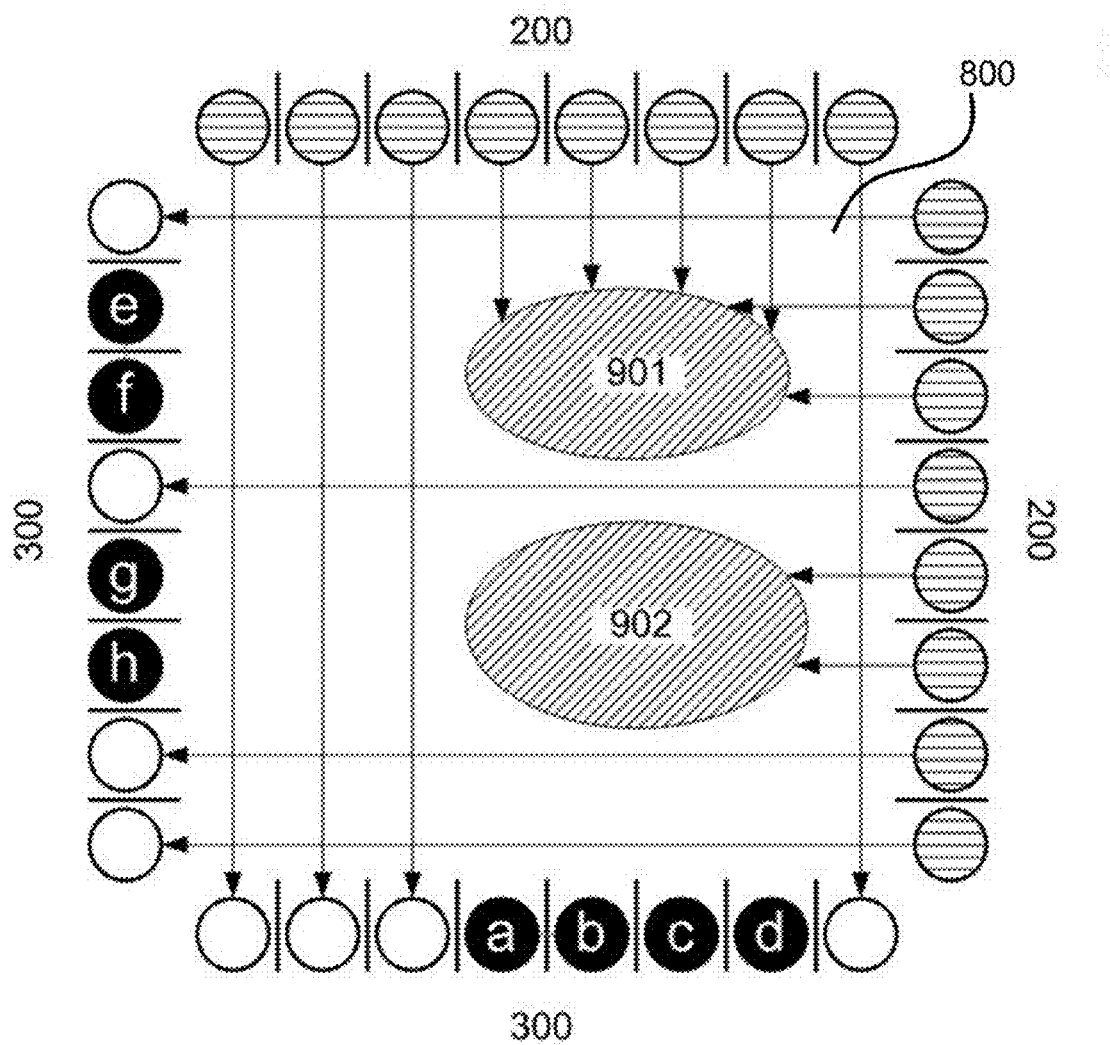
FIGS. 7-9 are diagrams of the touch screen of FIG. 6, showing detection of two pointers that touch the screen simultaneously, in accordance with an embodiment of the present invention.
Figure 8:
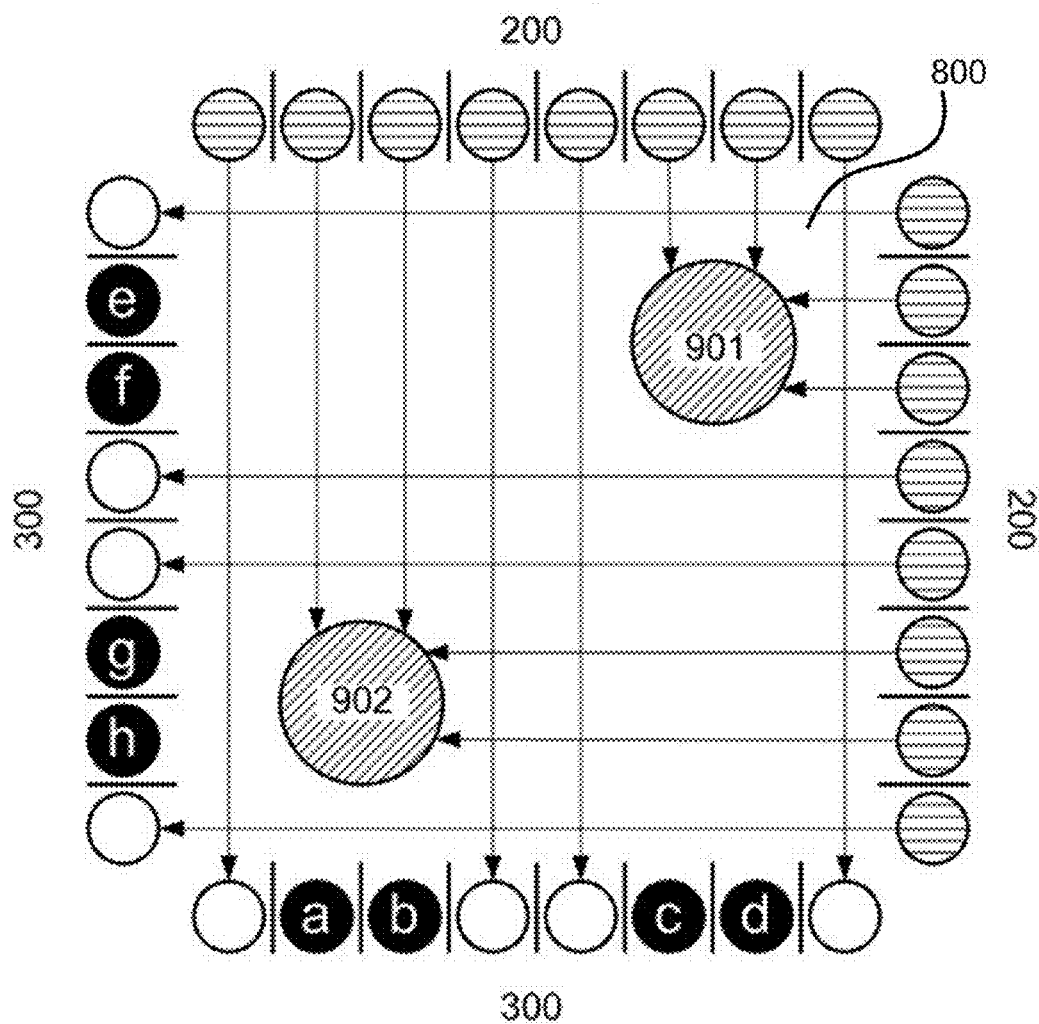
Figure 9:
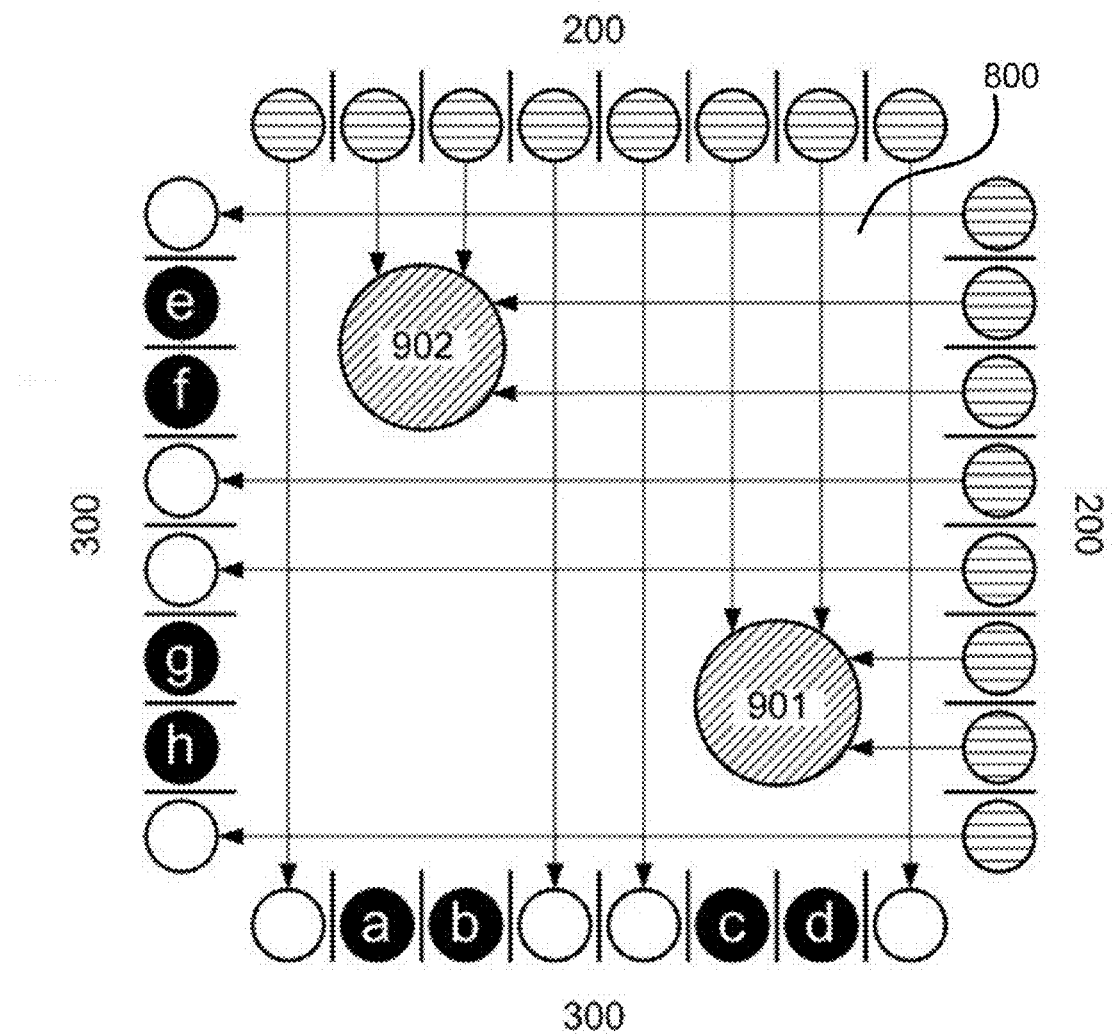

Reference is now made to FIGS. 7-9, which are diagrams of touch screen 800 of FIG. 6, showing detection of two pointers, 901 and 902, that touch the screen simultaneously, in accordance with an embodiment of the present invention. When two or more pointers touch the screen simultaneously, this is referred to as a "multi-touch." Pointers 901 and 902, which are touching the screen, block light from reaching some of receivers 300. In accordance with an embodiment of the present invention, the locations of pointers 901 and 902 are determined from the crossed lines of the infra-red beams that the pointers block. In distinction, prior art resistance-based and capacitance-based touch screens are generally unable to detect a multi-touch.

When two or more pointers touch screen 800 simultaneously along a common horizontal or vertical axis, the positions of the pointers are determined by the receivers 300 that are blocked. Pointers 901 and 902 in FIG. 7 are aligned along a common vertical axis and block substantially the same receivers 300 along the bottom edge of touch screen 800; namely the receivers marked a, b, c and d. Along the left edge of touch screen 800, two different sets of receivers 300 are blocked. Pointer 901 blocks the receivers marked e and f, and pointer 902 blocks the receivers marked g and h. The two pointers are thus determined to be situated at two locations. Pointer 901 has screen coordinates located at the intersection of the light beams blocked from receivers a-d and receivers e and f; and pointer 902 has screen coordinates located at the intersection of the light beams blocked from receivers a-d and receivers g and h.

Pointers 901 and 902 shown in FIGS. 8 and 9 are not aligned along a common horizontal or vertical axis, and they have different horizontal locations and different vertical locations. From the blocked receivers a-h, it is determined that pointers 901 and 902 are diagonally opposite one another. They are either respectively touching the top right and bottom left of touch screen 800, as illustrated in FIG. 8; or else respectively touching the bottom right and top left of touch screen 800, as illustrated in FIG. 9.

Discriminating between FIG. 8 and FIG. 9 is resolved by either (i) associating the same meaning to both touch patterns, or (ii) by associating meaning to only one of the two touch patterns, or (iii) by measuring the amount of light detected at the blocked receivers. In case (i), the UI arranges its icons, or is otherwise configured, such that the effects of both touch patterns FIG. 8 and FIG. 9 are the same. For example, touching any two diagonally opposite corners of touch screen 800 operates to unlock the screen.

In case (ii), the UI arranges its icons, or is otherwise configured, such that only one of the touch patterns FIG. 8 and FIG. 9 has a meaning associated therewith. For example, touching the upper right and lower left corners of touch screen 800 operates to unlock the screen, and touch the lower right and upper left of touch screen 800 has no meaning associated therewith. In this case, the UI discriminates that FIG. 8 is the correct touch pattern.

In case (iii), a finger closer to a receiver blocks more light from reaching the receiver than does a finger that is farther from the receiver. In part, this is due to the closer finger blocking more ambient light from reaching the receiver than does the farther finger. The light intensities detected at receivers e and f are compared with the light intensities detected at receivers g and h. Similarly, the light intensities detected at receivers a and b are compared with the light intensities detected at receivers c and d. If the light detected at receivers e and f and at receivers c and d is greater than the light detected at receivers g and h and at receivers a and b, then it is inferred that the fingers are positioned as shown in FIG. 8. Similarly, if the light detected at receivers e and f and at receivers c and d is less than the light detected at receivers g and h and at receivers a and b, then it is inferred that the fingers are positioned as shown in FIG. 9. The comparison may be based on summing or averaging the respective blocked receivers along each edge separately, e+f vs. g+h, and a+b vs. c+d. Alternatively, the comparison may be based on summing or averaging blocked receivers along two edges; i.e., based on the maximum and minimum of the values a+b+e+f, a+b+g+h, c+d+e+f, and c+d+g+h. The maximum and minimum values determine the locations of the fingers. E.g., if c+d+e+f is the maximum value and if a+b+g+h is the minimum value, then it is inferred that the fingers are positioned as shown in FIG. 8.

The number of receivers in each sum depends on the sequence of blocked, or at least partially blocked, receivers. The number of receivers may be different for each sequence. E.g., a sum of four receivers may be compared to a sum of six receivers. In one embodiment of the present invention the minimum receiver value in each sequence is used. The minimum receiver value corresponds to the receiver that is most blocked within a sequence of blocked receivers, and is a good indicator of proximity of the blocking finger to the sequence of receivers.

Determining locations of a diagonally oriented multi-touch is discussed further hereinbelow with reference to shift-aligned arrangements of emitters and receivers.

Figure 10:
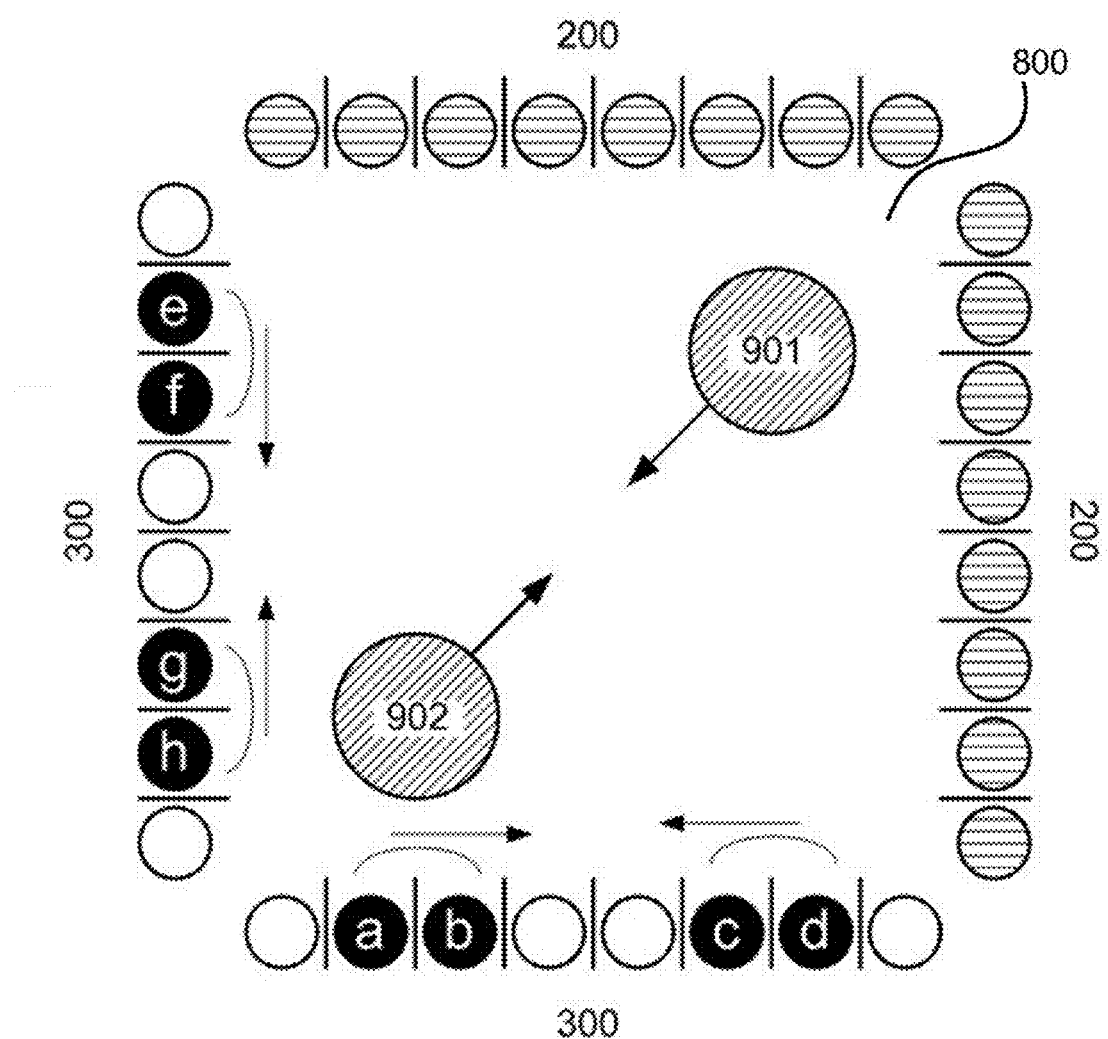
FIGS. 10 and 11 are diagrams of a touch screen that detects a two finger glide movement, in accordance with an embodiment of the present invention.
Figure 11:
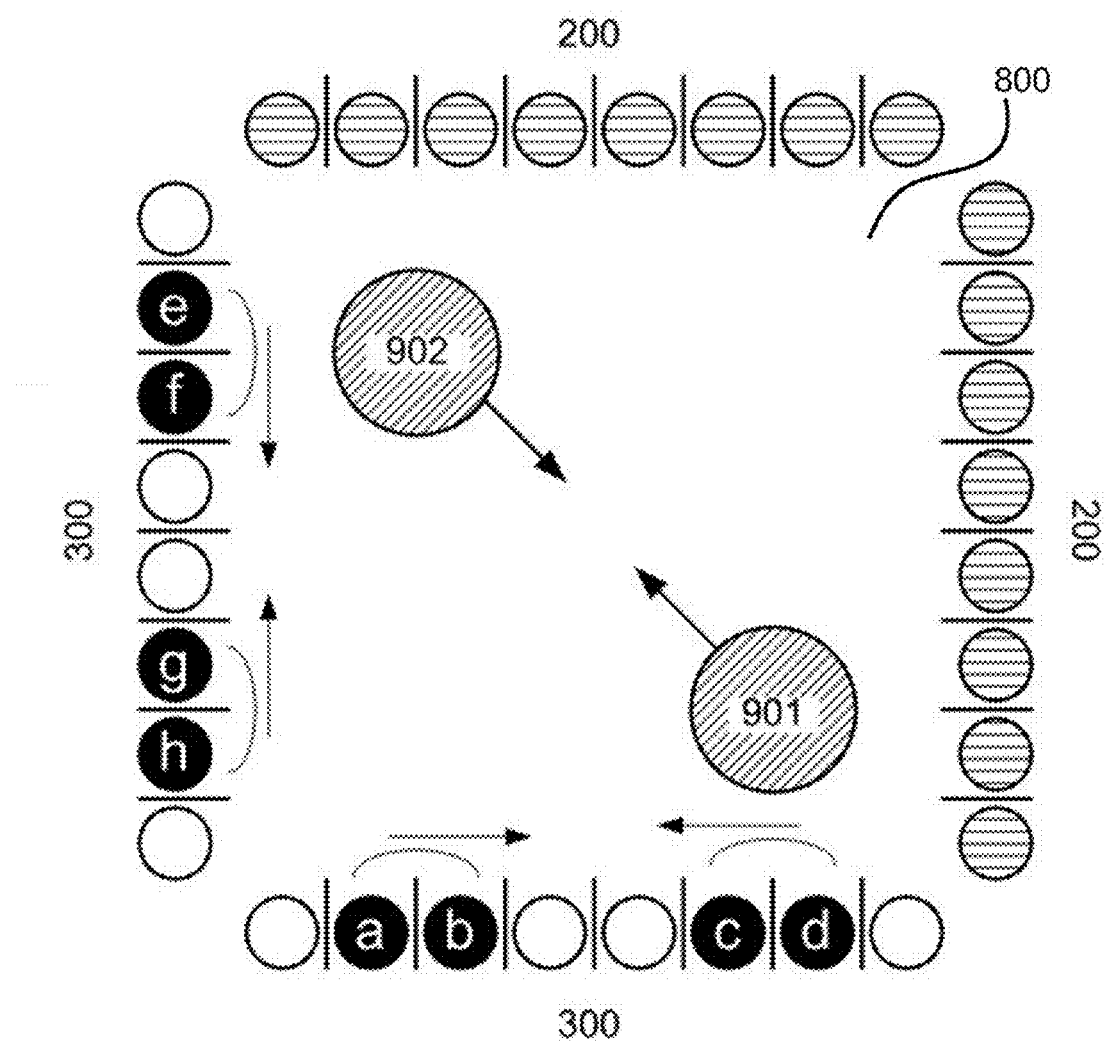

Reference is now made to FIGS. 10 and 11, which are diagrams of a touch screen 800 that detects a two finger glide movement, in accordance with an embodiment of the present invention. The glide movement illustrated in FIGS. 10 and 11 is a diagonal glide that brings pointers 901 and 902 closer together. The direction of the glide is determined from changes in which receivers 300 are blocked. As shown in FIGS. 10 and 11, blocked receivers are changing from a and b to receivers 300 more to the right, and from c and d to receivers 300 more to the left. Similarly, blocked receivers are changing from e and f to receivers 300 more to the bottom, and from g and h to receivers 300 more to the top. For a glide in the opposite direction, that moves pointers 901 and 902 farther apart, the blocked receivers change in the opposite directions.

When pointers 901 and 902 are aligned in a common vertical or horizontal axis, there is no ambiguity in identifying glide patterns. When pointers 901 and 902 are not aligned in a common vertical or horizontal axis, there may be ambiguity in identifying glide patterns, as illustrated in FIGS. 10 and 11. In case of such ambiguity, and as described hereinabove with reference to FIGS. 8 and 9, discriminating between FIG. 10 and FIG. 11 is resolved by either (i) by associating the same meaning to both glide patterns, or (ii) by associating meaning to only one of the two glide patterns, or (iii) by measuring and comparing the amounts of light detected at the blocked receivers.

Associating the same meaning to both glide patterns may be performed in a pinch zoom gesture, whereby a user places two fingers on the screen and spreads the fingers apart along a diagonal of the screen. Such a gesture activates a zoom-in operation, for increasing the magnification of graphics displayed on the screen. Such a gesture has the same meaning irrespective of whether the pinch zoom is performed along a top-left to bottom-right diagonal, or along a top-right to bottom-left diagonal.

Similar considerations apply to a zoom-out gesture, whereby a user places two fingers on the screen and brings the fingers closer together along a diagonal of the screen, for decreasing the magnification of graphics displayed on the screen. This gesture, too, has the same meaning irrespective of along which diagonal of the screen the gesture is performed.

Figure 12:
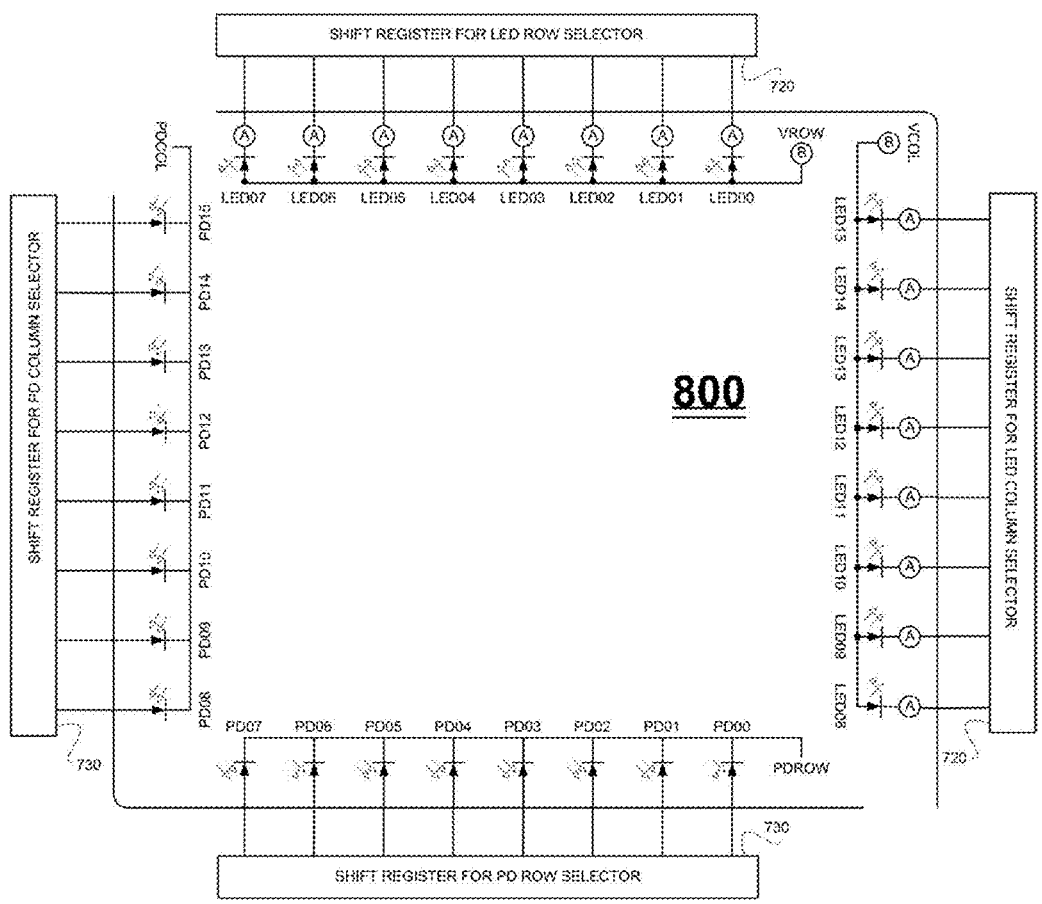
FIG. 12 is a circuit diagram of the touch screen from FIG. 6, in accordance with an embodiment of the present invention.

Reference is made to FIG. 12, which is a circuit diagram of touch screen 800 from FIG. 6, in accordance with an embodiment of the present invention. The emitters and receivers are controlled by a controller (not shown). The emitters receive respective signals LED00-LED15 from switches A, and receive current from VROW and VCOL through current limiters B. The receivers receive respective signals PD00-PD15 from shift register 730. Receiver output is sent to the controller via signals PDROW and PDCOL. Operation of the controller, of switches A and of current limiters B is described in applicant's co-pending application, U.S. application Ser. No.

12/371,609 filed on Feb. 15, 2009 and entitled LIGHT-BASED TOUCH SCREEN, the contents of which are hereby incorporated by reference.

According to an embodiment of the present invention, the emitters are controlled via a first serial interface, which transmits a binary string to a shift register 720. Each bit of the binary string corresponds to one of the emitters, and indicates whether to activate or deactivate the corresponding emitter, where a bit value "1" indicates activation and a bit value "0" indicates deactivation. Successive emitters are activated and deactivated by shifting the bit string within shift register 720.

Similarly, the receivers are controlled by a second serial interface, which transmits a binary string to a shift register 730. Successive receivers are activated and deactivated by shifting the bit string in shift register 730. Operation of shift registers 720 and 730 is described in applicant's co-pending application, U.S. application Ser. No. 12/371,609 filed on Feb. 15, 2009 and entitled LIGHT-BASED TOUCH SCREEN, the contents of which are hereby incorporated by reference.

Figure 13:
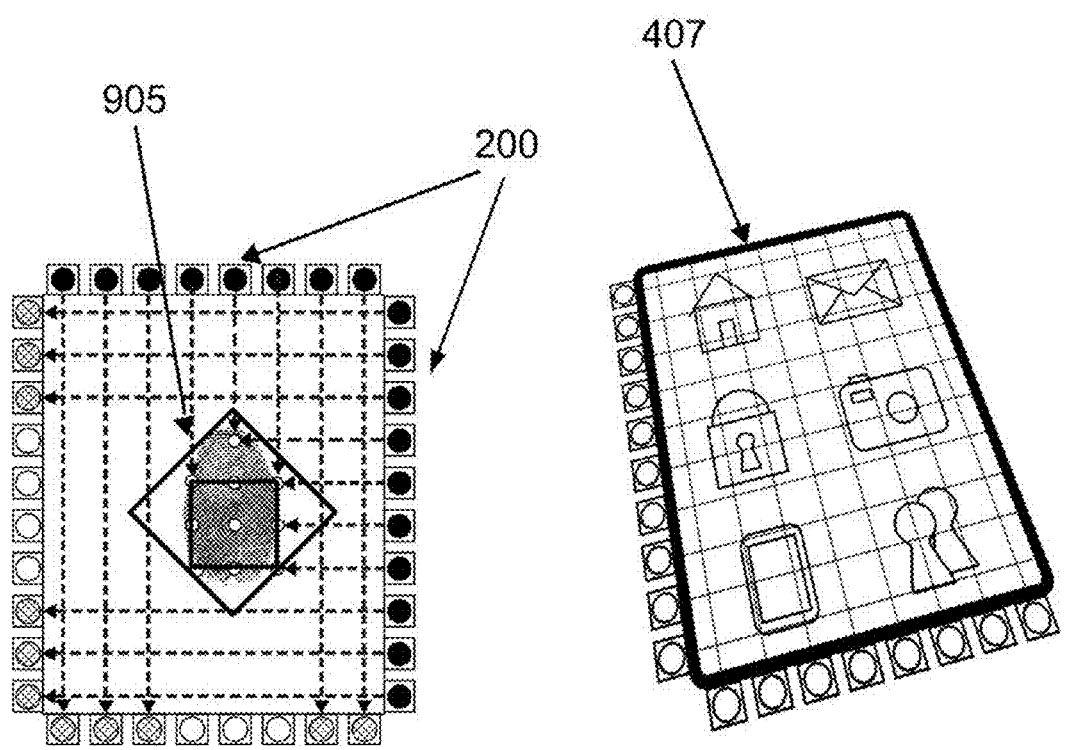
FIG. 13 is a simplified diagram of a light-based touch screen system, in accordance with an embodiment of the present invention.

Reference is made to FIG. 13, which is a simplified diagram of a light-based touch screen system, in accordance with an embodiment of the present invention. The touch screen of FIG. 13 does not require an overlay. Instead, a small frame 407 surrounds the display with emitters 200 and receivers 300 positioned on opposite sides of the screen, and hidden behind an infrared transparent bezel. When a pointer, such as a finger or a stylus, touches the screen in a specific area 905, one or more light beams generated by emitters 200 are obstructed. The obstructed light beams are detected by corresponding decreases in light received by one or more of the receivers, which is used to determine the location of the pointer.

Figure 14:
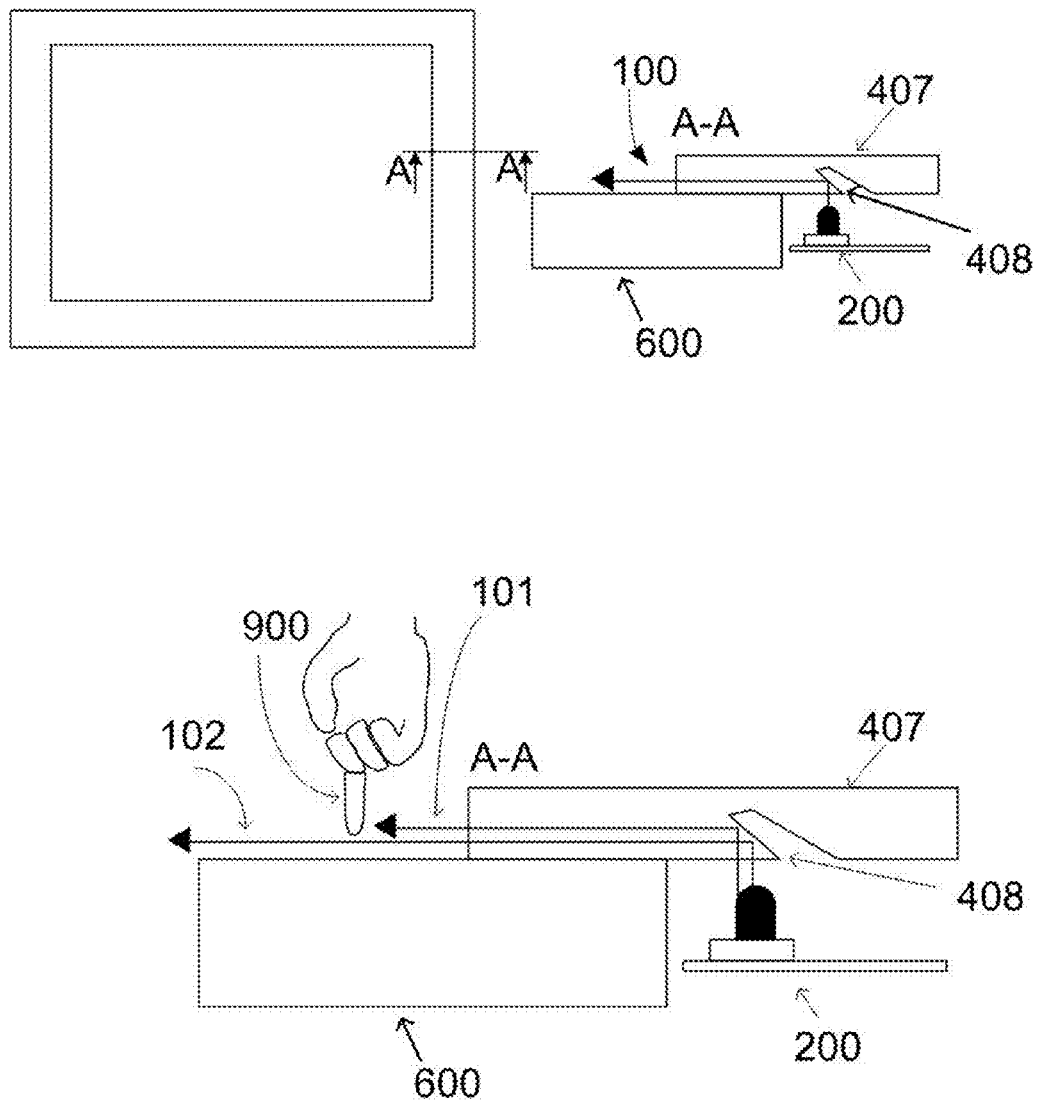
FIG. 14 is a simplified cross-sectional diagram of the touch screen system of FIG. 13, in accordance with an embodiment of the present invention.

Reference is made to FIG. 14, which is a simplified cross-sectional diagram of the touch screen system of FIG. 13, in accordance with an embodiment of the present invention. Shown in FIG. 14 is a cross-sectional view of a section A-A of an LCD display 600 and its surrounding infrared transparent frame 407. The cross-sectional view shows an emitter 200 emitting light 100 that is reflected by a cut-out 408 in frame 407, and directed substantially parallel over the display surface. As a finger 900 approaches near the display surface, some of the light, 101, emitted by the emitters and directed over the location of the near touch is blocked by the finger, and some of the light, 102, passes between the fingertip and the screen glass. When finger 900 touches the display surface, all of the light emitted by the emitters and directed over the touch location is blocked by finger 900.

Touch Screen System Configuration No. 1

Figure 15:
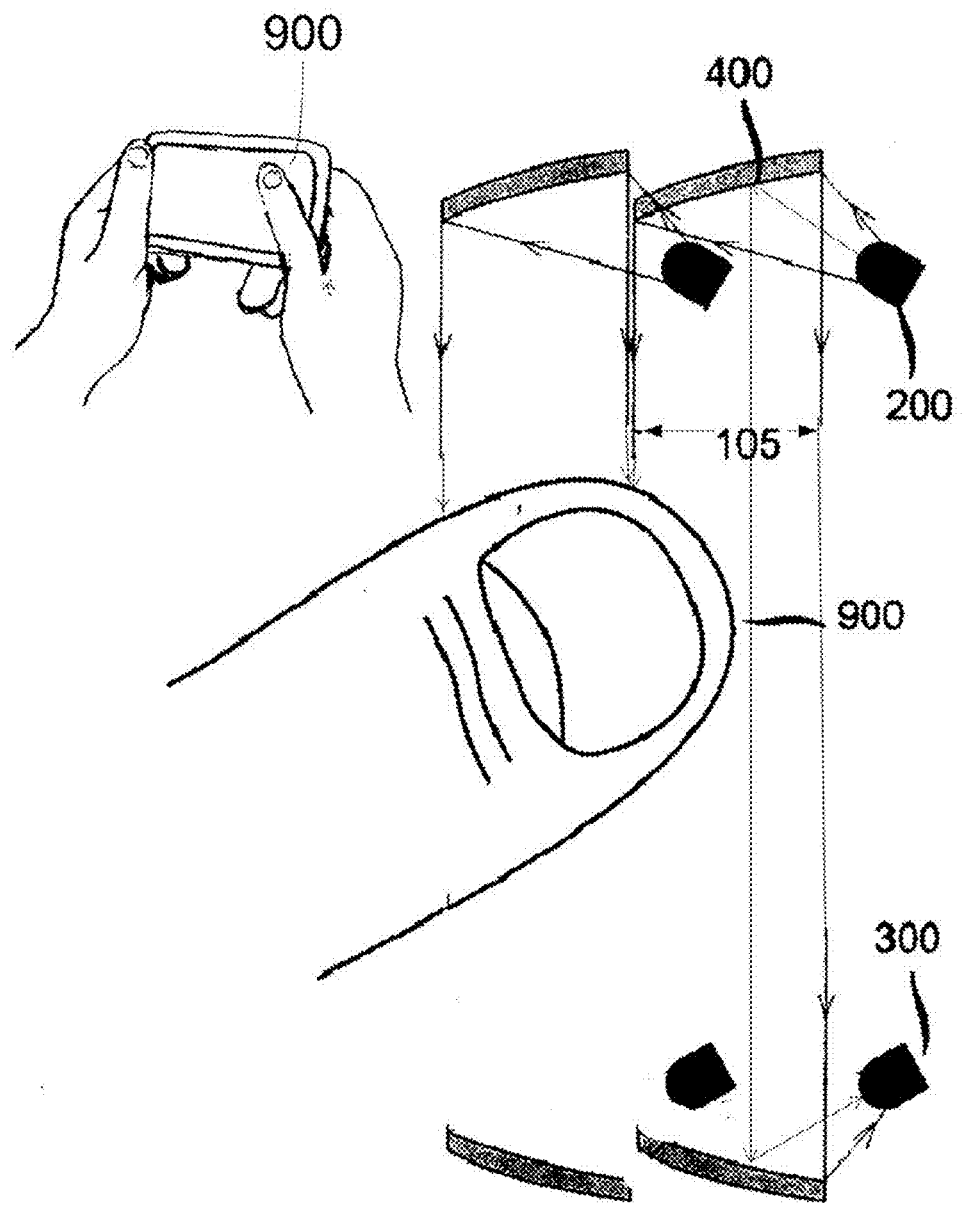
FIG. 15 is a simplified illustration of an arrangement of emitters, receivers and optical elements that enable a touch screen system to read pointers that are smaller than the sensor elements, in accordance with an embodiment of the present invention.

Reference is made to FIG. 15, which is a simplified illustration of an arrangement of emitters, receivers and optical elements that enable a touch screen system to read pointers that are smaller than the sensor elements, in accordance with an embodiment of the present invention. Shown in FIG. 15 are a mirror or optical lens 400, an emitter 200, a wide reflected light beam 105, a pointer 900 and a receiver 300. Mirror or optical lens 400 generates a wide light beam that is focused onto receiver 300 by a second mirror or optical lens. The wide beam makes it possible to sense an analog change in the amount of light detected at receiver 300 when a pointer blocks a portion of the wide beam. The wide beam enables sensing an analog change when pointer 900 is placed in front of mirror or lens 400. Thus, pointer 900 in FIG. 15 blocks only a portion of wide beam 105. The wide beam also enables mounting the emitters far apart from one another, and mounting the receivers far apart from one another. Consequently, this reduces the bill of materials by requiring fewer emitters and fewer receivers.

Figure 16:
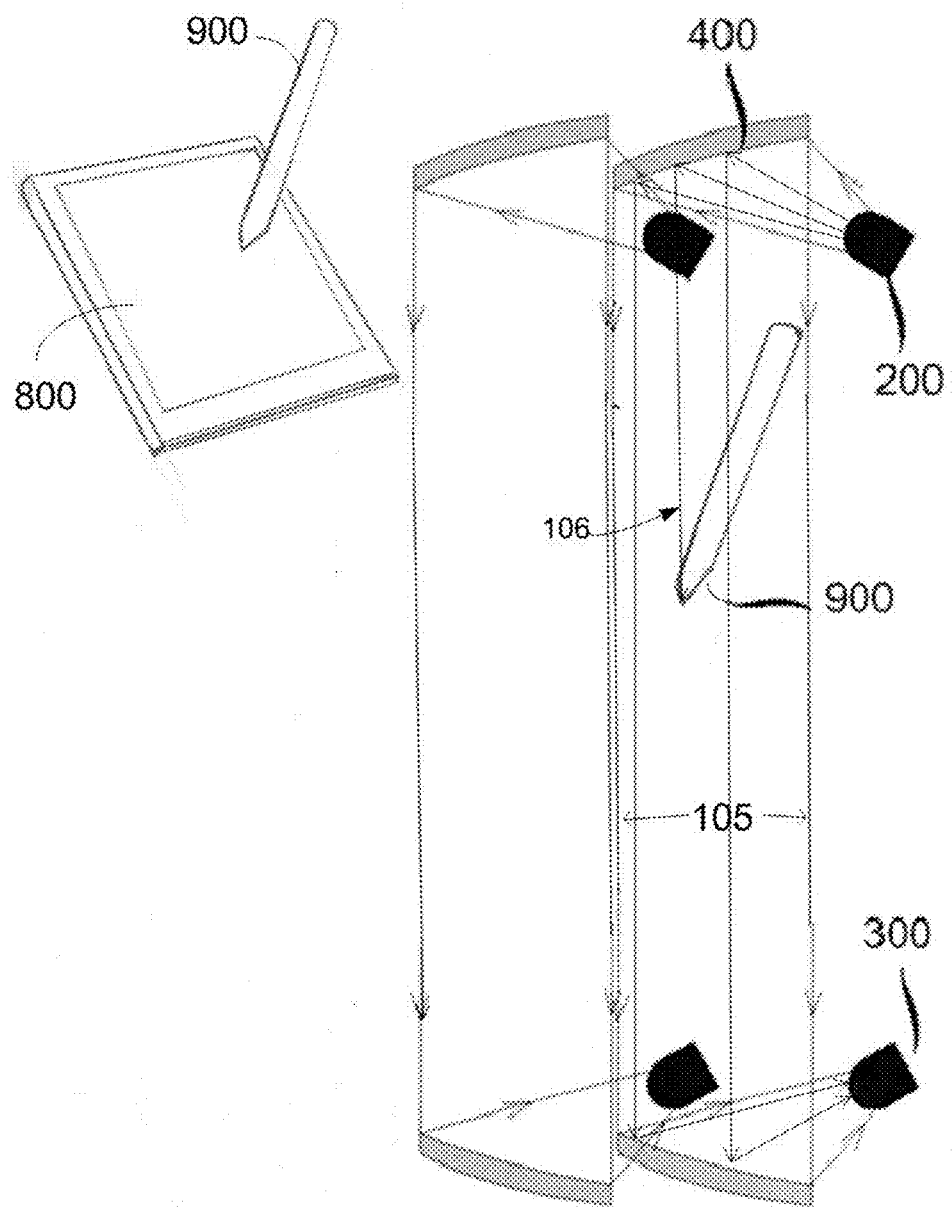
FIG. 16 is a simplified illustration of an arrangement of emitters, receivers and optical elements that enable a touch screen system to detect a pointer that is smaller than the sensor elements, including inter alia a stylus, in accordance with an embodiment of the present invention.

Reference is made to FIG. 16, which is a simplified illustration of an arrangement of emitters, receivers and optical elements that enable a touch screen system to detect a pointer that is smaller than the sensor elements, including inter alia a stylus, in accordance with an embodiment of the present invention. Shown in FIG. 16 are a mirror or optical lens 400, an emitter 200, a wide reflected light beam, 105, a pointer 900 and a receiver 300. Mirror or optical lens 400 generates a wide light beam that is focused onto receive 300 by a second mirror or optical lens. The wide beam enables sensing of an analog change in the amount of light detected at receiver 300 when a pointer 900 blocks a portion of the wide beam, in particular, when pointer 900 is placed in front of mirror or lens 400. Pointer 900, as shown in FIG. 16, blocks only a portion of wide beam 105, indicated by beam 106 being blocked by the tip of pointer 900. The wide beam also enables mounting emitters far apart from one another, and mounting receivers far apart from one another. In turn, this reduces the bill of materials by requiring fewer emitters and fewer receivers.

Without the wide beam, there are generally spaces between beams that go undetected, making it impossible to distinguish between a user dragging a fine-point stylus across the beams, and the user tapping on different beams with a fine-point stylus. Moreover, with widely spaced narrow beams the pointer touch must be very precise in order to cross a narrow beam.

Figure 17:
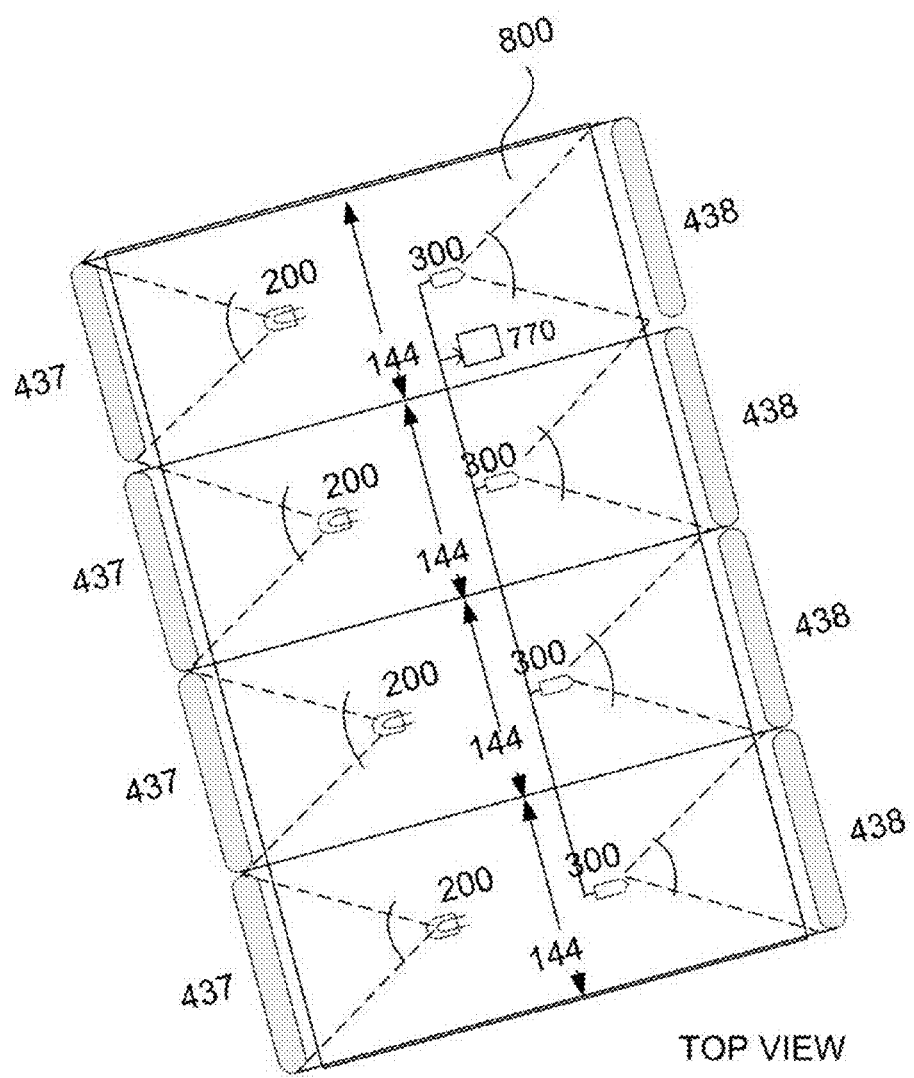
FIG. 17 is a simplified diagram of a touch screen with wide light beams covering the screen, in accordance with an embodiment of the present invention.
Figure 17:
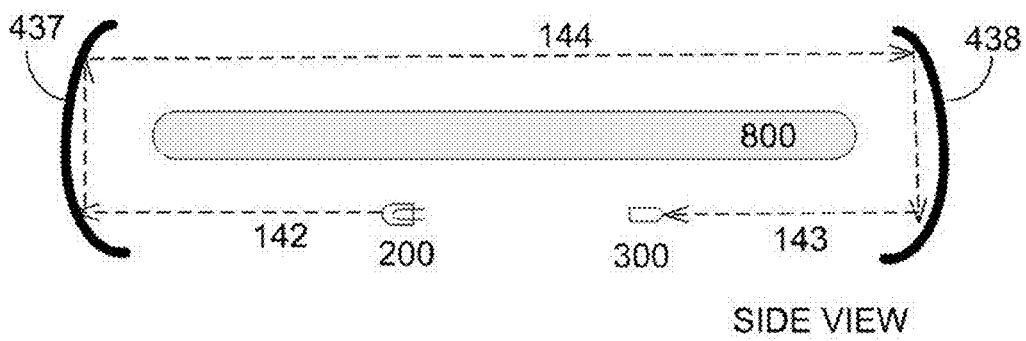

Reference is made to FIG. 17, which is a simplified diagram of a touch screen with wide light beams covering the screen, in accordance with an embodiment of the present invention. Touch screen systems using wide beams are described in applicant's provisional patent application, U.S. Application Ser. No. 61/317,255 filed on Mar. 24, 2010 and entitled OPTICAL TOUCH SCREEN WITH WIDE BEAM TRANSMITTERS AND RECEIVERS, the contents of which are hereby incorporated by reference.

The emitters and receivers shown in FIG. 17 are spaced relatively widely apart. Generally, the emitters are not activated simultaneously. Instead, they are activated one after another, and the coverage areas of their light beams are substantially connected.

FIG. 17 shows a top view and a side view of a touch system having a touch screen or touch surface 800. The touch system provides touch-sensitive functionality to a surface irrespective of whether or not the surface includes a display screen. Moreover, a physical surface is not required; the light beams may be projected though the air, and the location of a pointer in mid-air that breaks the light beams may be detected.

Also shown in FIG. 17 are emitters 200, reflectors 437 and 438, and receivers 300 coupled with a calculating unit 770. Emitters 200 and receivers 300 are positioned beneath screen 800. Emitters 200 project arcs 142 of light under screen 800 onto reflectors 437. The distance between emitters 200 and reflectors 437 is sufficient for an arc to spread into a wide beam at a reflector 437. In various embodiments of the present invention, the distance between emitters 200 and reflectors 437 may be approximately 4 mm, 10 mm, 20 mm or greater, depending on factors including inter alia screen size, required touch resolution, emitter characteristics and optical reflector characteristics.

Reflectors 437 collimate the light as wide beams 144 across a swath of screen surface. A wide beam 144 reaches a reflector 438, which (i) redirects the light beam below screen 800, and (ii) narrows the wide beam 144 into an arc 143. As such, wide beam 144 converges onto the surface of one of receivers 300 below the surface of screen 800. The light intensity detected by each of receivers 300 is communicated to calculating unit 770.

The configuration of FIG. 17 is of advantage in that the wide light beams cover the entire screen surface, thereby enabling touch sensitive functionality anywhere on the screen. Additionally, the cost of materials for the touch screen is reduced, since relatively few emitter and receiver components are required.

Touch Screen System Configuration No. 2

Configurations 2-5 use multiple emitter-receiver pairs to precisely identify a touch position. In some of the configurations described hereinabove there are opposing rows of emitters and receivers, each emitter being opposite a respective receiver. In configurations 2-5 the emitters are shift-aligned with the receivers. For example, each emitter may be positioned opposite a midpoint between two opposing receivers. Alternatively, each emitter may be off-axis aligned with an opposite receiver, but not opposite the midpoint between two receivers.

Embodiments of the present invention employ two types of collimating lenses; namely, (i) conventional collimating lenses, and (ii) collimating lenses coupled with a surface of micro-lenses that refract light to form multiple wide divergent beams. As used throughout the present specification, the term "collimating lens" includes both types of lenses. When a light source is positioned at the focus of a conventional collimating lens, the lens outputs light in substantially parallel beams, as illustrated inter alia in FIGS. 15-17. When a light source is positioned between a conventional collimating lens and its focus, the lens outputs a wide beam, the outer edges of which are not parallel to each other, as illustrated inter alia in FIGS. 23-26.

Figure 18:
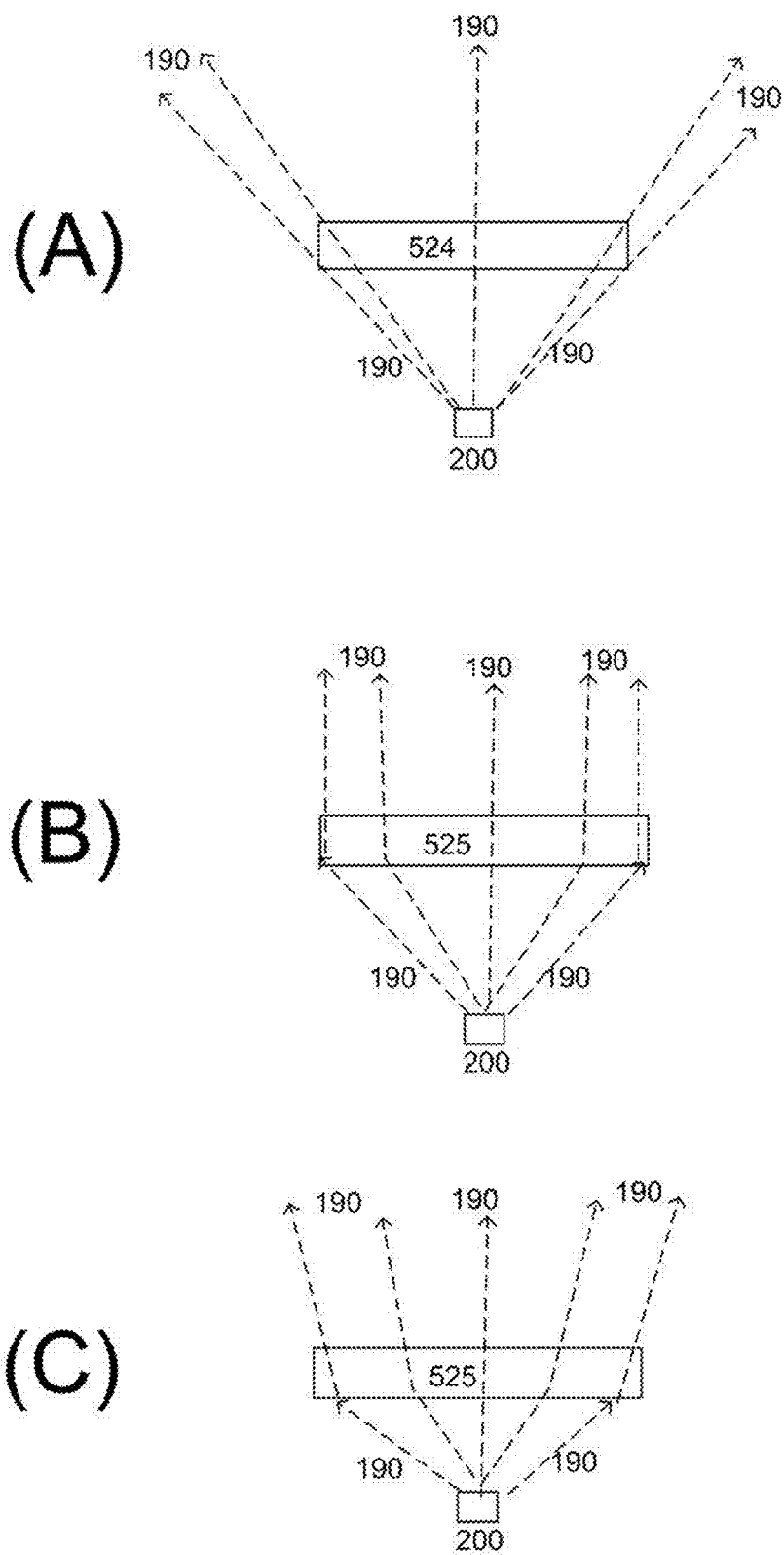
FIG. 18 is a simplified illustration of a collimating lens, in accordance with an embodiment of the present invention.

Reference is made to FIG. 18, which is a simplified illustration of a collimating lens in cooperation with a light emitter, in accordance with an embodiment of the present invention. Shown in FIG. 18 is (A) a light emitter 200 transmitting light beams 190 through a flat clear glass 524. Beams 190 are unaltered by the glass.

Also shown in FIG. 18 is (B) an emitter positioned at the focus of a collimating lens 525. Beams 190 are collimated by lens 525.

Also shown in FIG. 18 is (C) an emitter 200 positioned between collimating lens 525 and the lens' focus. Beams 190 are partially collimated by lens 525; i.e., the output wide beams are not completely parallel.

Figure 19:
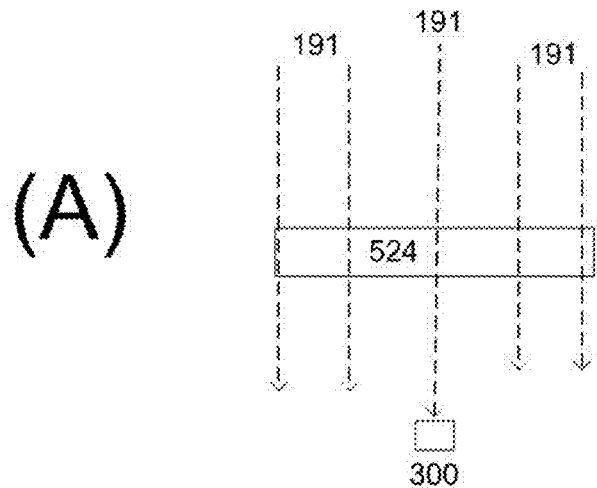
FIG. 19 is a simplified illustration of a collimating lens in cooperation with a light receiver, in accordance with an embodiment of the present invention.
Figure 19:
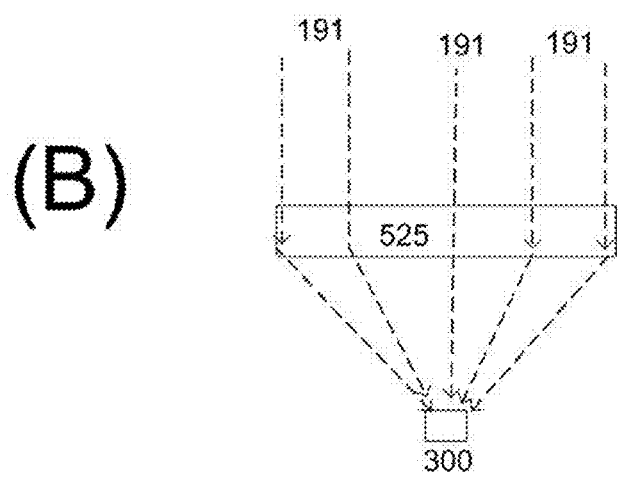
Figure 19:
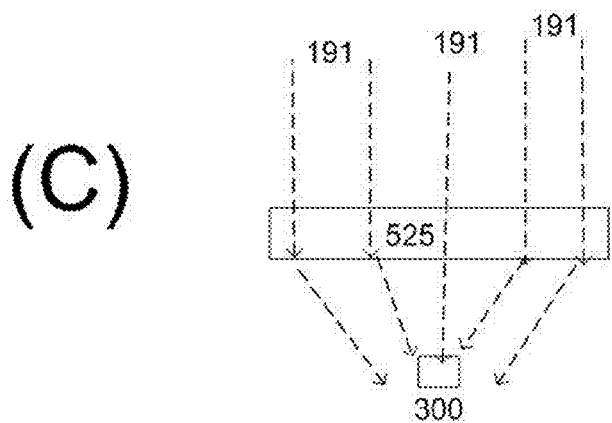

Reference is made to FIG. 19, which is a simplified illustration of a collimating lens in cooperation with a light receiver, in accordance with an embodiment of the present invention. Shown in FIG. 19 is (A) substantially parallel light beams 191 transmitted through a flat clear glass 524. Beams 191 are unaltered by the glass.

Also shown in FIG. 19 is (B) a receiver 300 positioned at the focus of collimating lens 525. Beams 191 are refracted onto receiver 300 by collimating lens 525.

Also shown in FIG. 19 is (C) a receiver 300 positioned between collimating lens 525 and the lens' focus. Beams 191 are collimated by lens 525, but because receiver 300 is not at the lens focus, the beams do not converge thereon.

Figure 30:
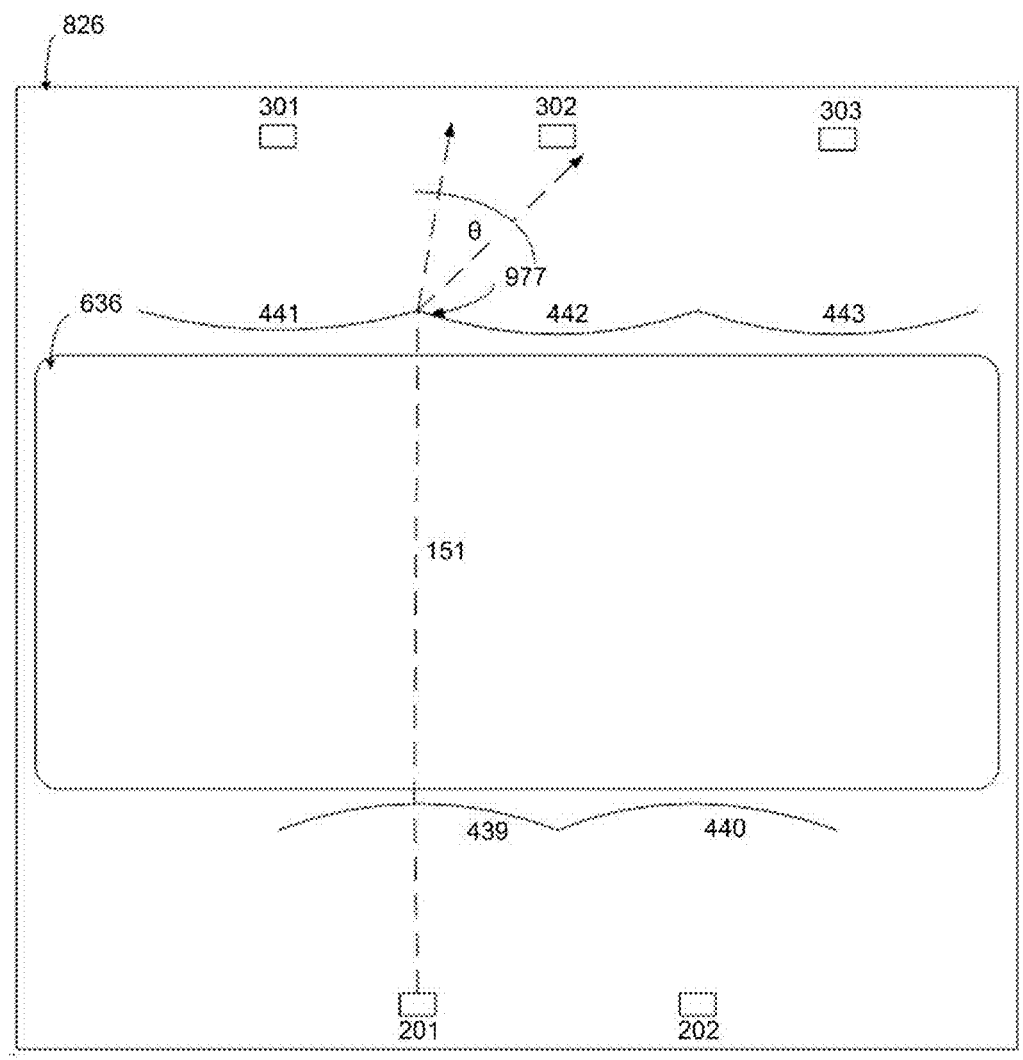
FIGS. 30 and 31 are simplified diagrams of a wide-beam touch screen with emitter and receiver lenses that have micro-lens patterns, in accordance with an embodiment of the present invention.
Figure 33:
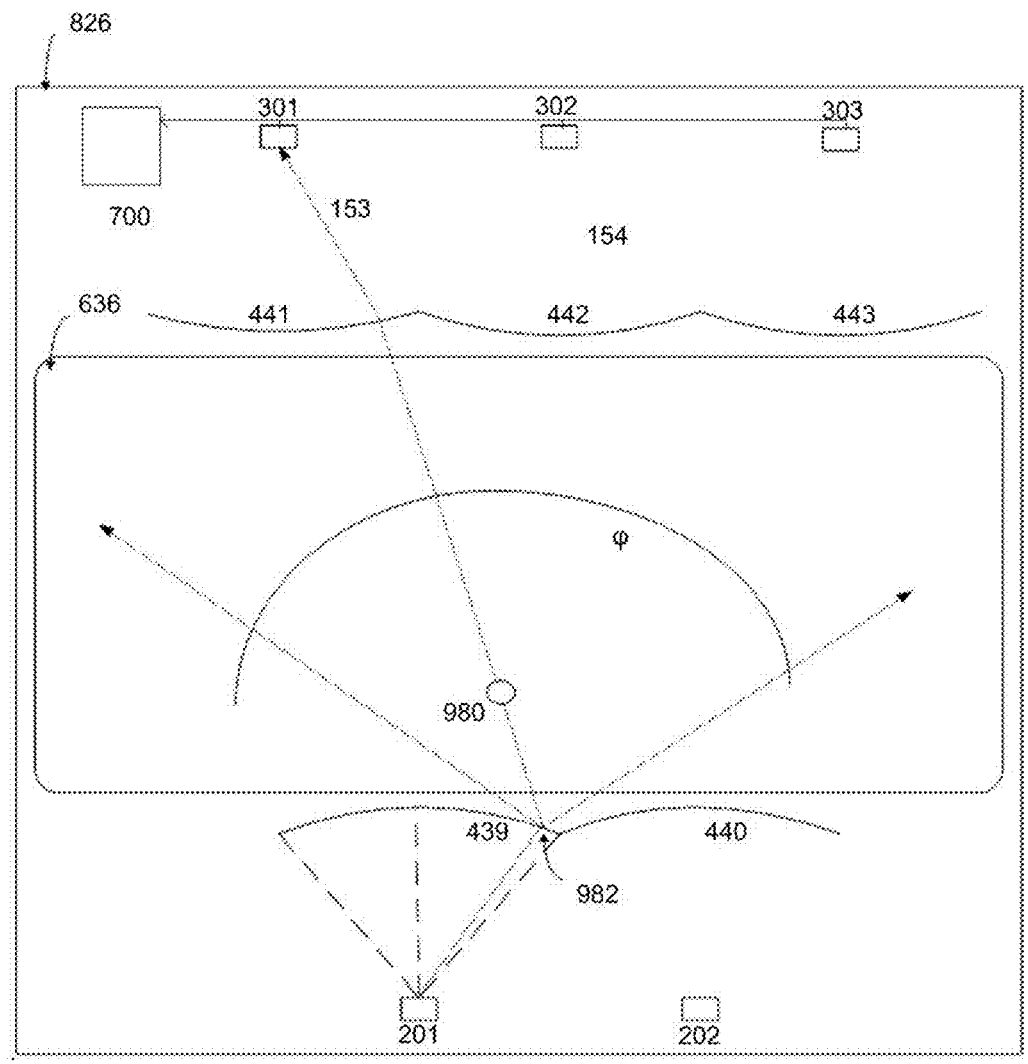
FIG. 33 is a simplified diagram of a wide beam touch screen, with emitter and receiver lenses that have micro-lens patterns, in accordance with an embodiment of the present invention.
Figure 34:
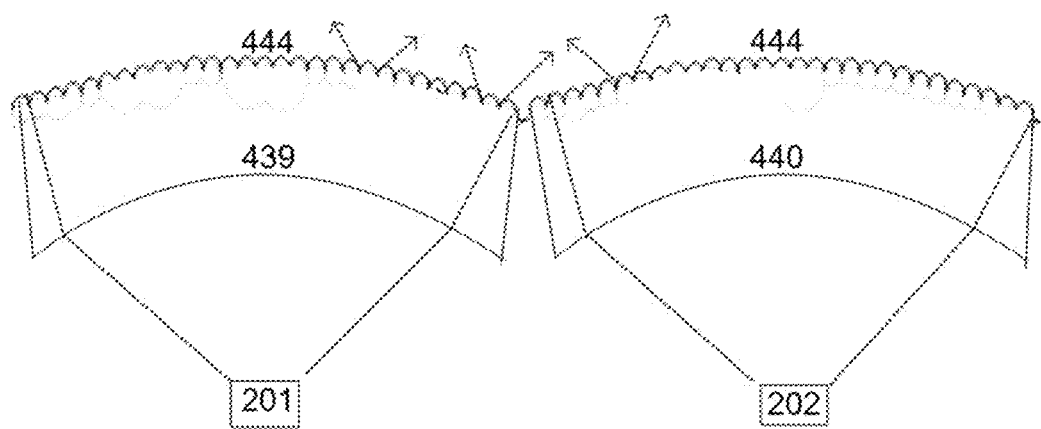
FIG. 34 is a simplified diagram of two emitters with lenses that have micro-lens patterns integrated therein, in accordance with an embodiment of the present invention.
Figure 35:
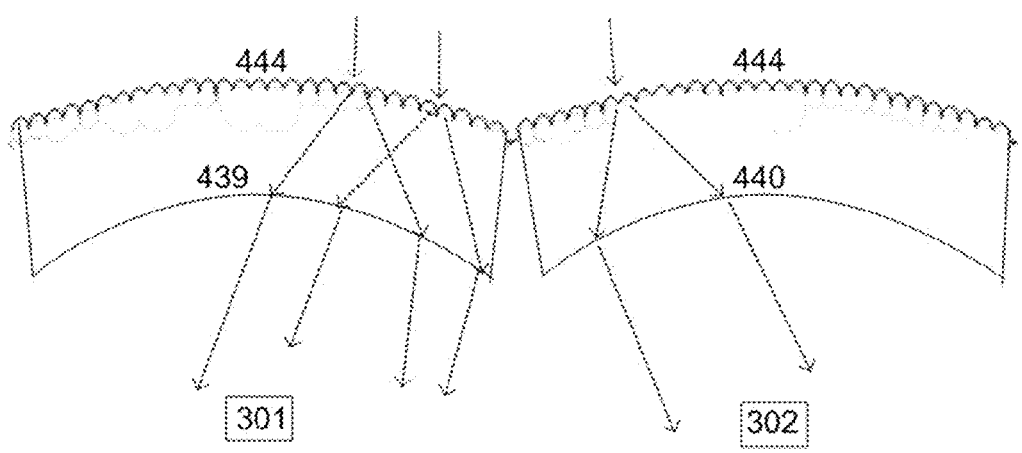
FIG. 35 is a simplified diagram of two receivers with lenses that have micro-lens patterns integrated therein, in accordance with an embodiment of the present invention.

Collimating lenses coupled with an outer surface of micro-lenses, which face away from emitters or receivers, transmit light in two stages. As light passes through the bodies of the lenses, light beams are collimated as with conventional collimating lenses. However, as the light passes through the surface of micro-lenses, the light is refracted into multiple wide divergent beams, as illustrated inter alia in FIGS. 30, 31 and 33-35. In FIGS. 34 and 35, collimating lenses 439 and 440 are shown having micro-lens surfaces 444. In FIG. 34, light emitters 201 and 202 are positioned within the focal distance of collimating lenses 439 and 440, and wide light beams from the emitters are shown entering lenses 439 and 440. Light is collimated as it passes through the lens, as with conventional collimating lenses. When the collimated light passes through micro-lens surface 444, it is refracted into multiple wide divergent beams, three of which are illustrated in FIG. 30. In FIG. 35, light receivers 301 and 302 are positioned within the focal distance of the collimating lenses, and light beams are shown entering lenses 439 and 440 through micro-lens surface 444. The incoming beams are refracted into wide divergent beams inside the lens bodies. The refracted beams are directed by the collimating portions of lenses 439 and 440, which concentrate the beams onto light receivers 301 and 302.

Figure 20:
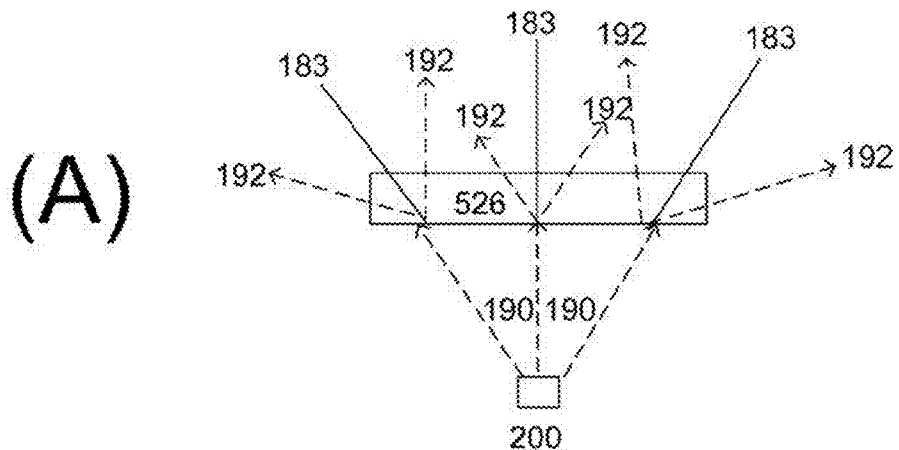
FIG. 20 is a simplified illustration of a collimating lens having a surface of micro-lenses facing an emitter, in accordance with an embodiment of the present invention.
Figure 20:
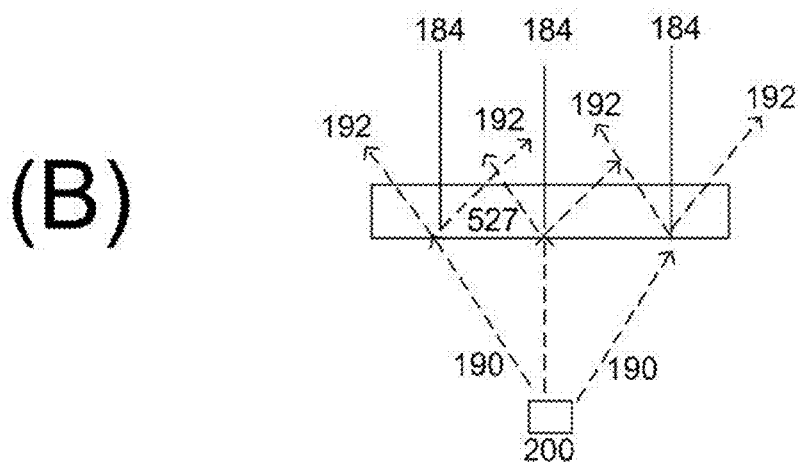
Figure 20:
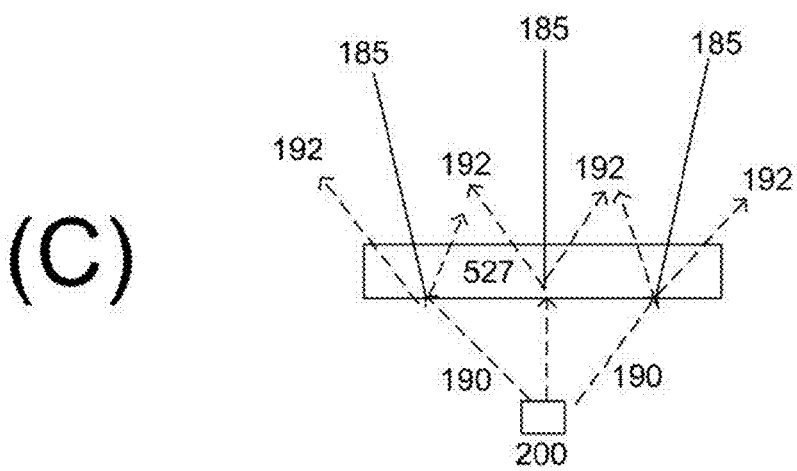

Reference is made to FIG. 20, which is a simplified illustration of a collimating lens having a surface of micro-lenses facing an emitter, in accordance with an embodiment of the present invention. FIG. 20 shows (A) a flat glass 526 having micro-lenses etched on a surface facing an emitter 200. Light beams 190 enter glass 526 at various angles. At each entry point, a micro-lens refracts an incoming beam into a wide arc 192. Lines 183 show how the middle of each arc is oriented in a different direction, depending on the angle of approach of the beam into glass 526.

FIG. 20 also shows (B) a collimating lens 527 having micro-lenses etched on a surface facing an emitter 200. A focus point of the lens, without the micro-lenses, is determined, and emitter 200 is positioned at that point. Light beams 190 enter collimating lens 527 at various angles. At each entry point, a micro-lens refracts the incoming beams into a wide arc 192. Lines 184 show how the middle of each arc is oriented in the same direction, irrespective of the angle of approach of the beams into collimating lens 527. This type of lens is referred to as a "mufti-directional collimating lens", because it outputs arcs of light, not parallel beams, but all of the arcs are substantially uniformly directed.

FIG. 20 also shows (C) the same collimating lens 527, but with emitter 200 positioned between the lens and the focus point. The output arcs 192 are oriented in directions between those of the arcs of (A) and the arcs of (B), indicated by lines 185.

Figure 21:
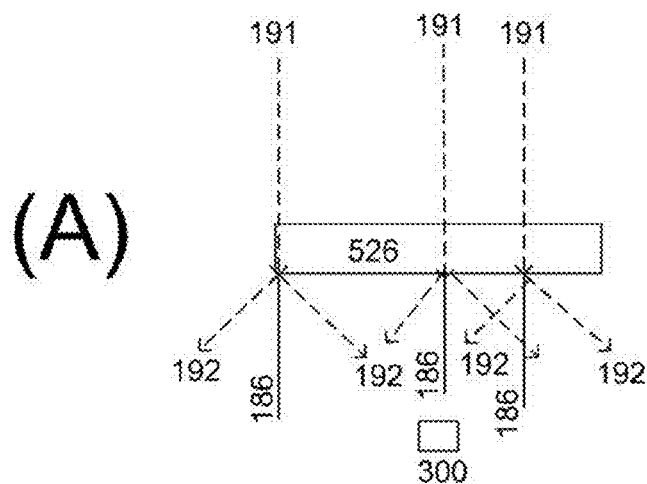
FIG. 21 is a simplified illustration of a collimating lens having a surface of micro-lenses facing a receiver, in accordance with an embodiment of the present invention.
Figure 21:
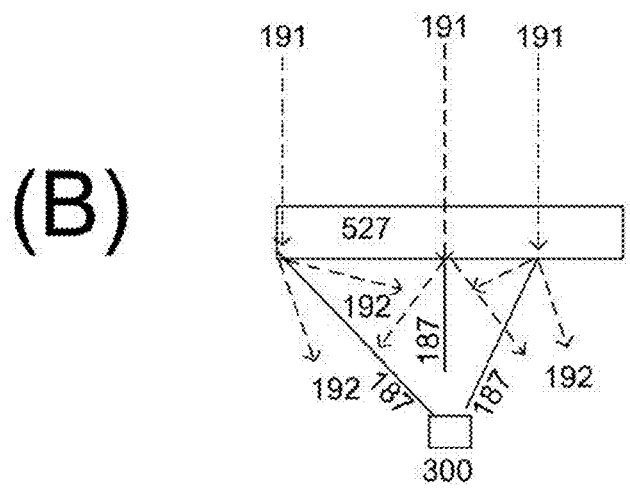
Figure 21:
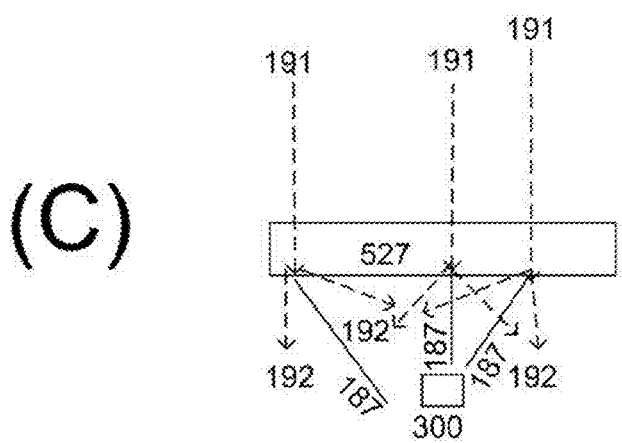

Reference is made to FIG. 21, which is a simplified illustration of a collimating lens having a surface of micro-lenses facing a receiver, in accordance with an embodiment of the present invention. FIG. 21 shows (A) a flat glass 526 having micro-lenses etched on a surface facing a receiver 300. Light beams 191 are shown entering glass 526 as parallel beams. At each exit point, a micro-lens refracts a beam into a wide arc 192. Lines 186 show how the middle of each arc is oriented in the same direction. The arcs do not converge on receiver 300.

FIG. 21 also shows (B) a mufti-directional collimating lens 527 having micro-lenses etched on a surface facing receiver 300. A focus point of the lens, without the micro-lenses, is determined, and receiver 300 is positioned at that point. Light beams 191 enter lens 527 as substantially parallel beams. At each exit point, a micro-lens refracts an incoming beam into a wide arc 192. Lines 187 show how the middle of each arc is oriented towards receiver 300.

FIG. 21 also shows (C) the same lens 527, but with receiver 300 positioned between the lens and the focus point. The output arcs are oriented in directions between those of the arcs of (A) and the arcs of (B).

As used through the present specification, the term "collimating lens" includes a mufti-directional collimating lens.

Figure 22:
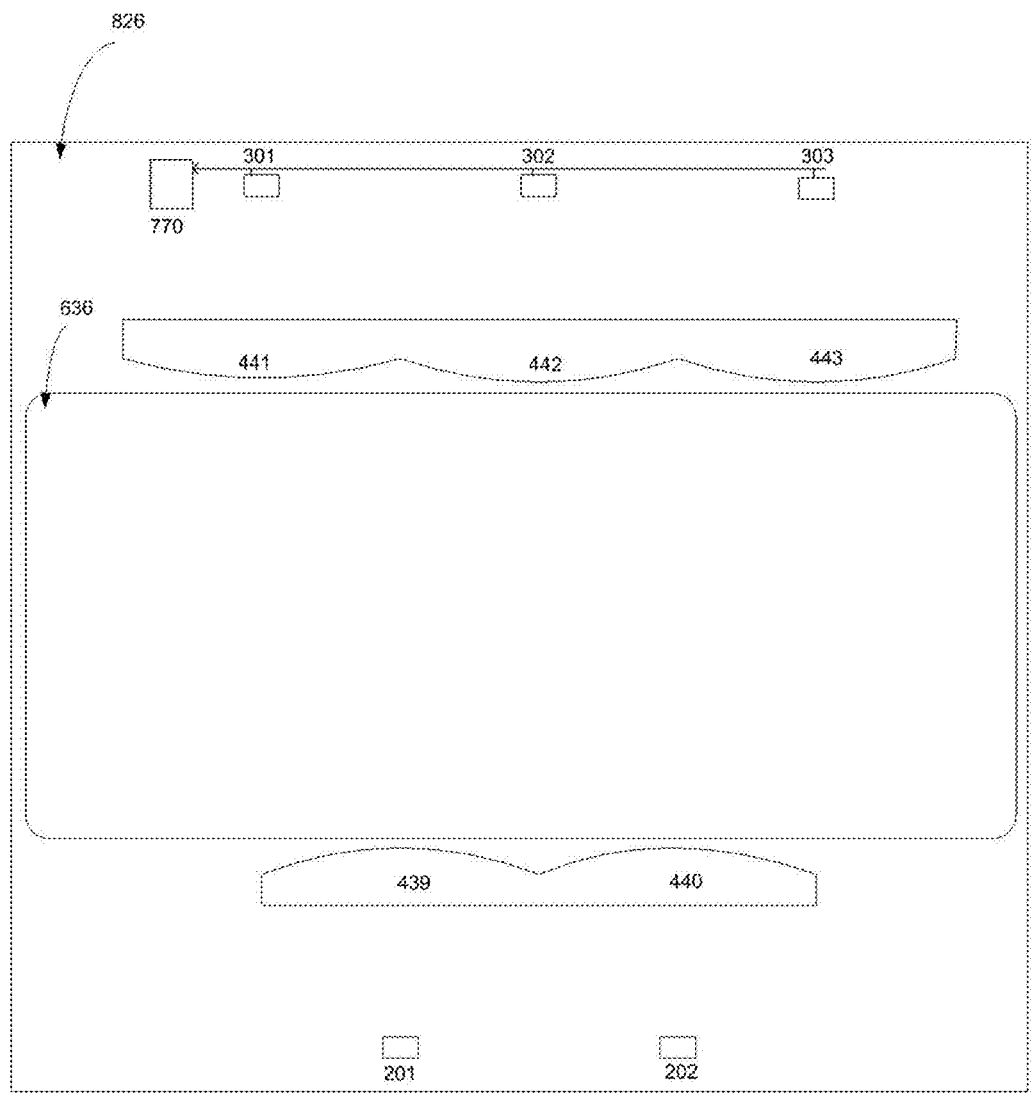
FIG. 22 is a simplified diagram of an electronic device with a wide-beam touch screen, in accordance with an embodiment of the present invention.

Reference is made to FIG. 22, which is a simplified diagram of an electronic device with a wide-beam touch screen, in accordance with an embodiment of the present invention.

Shown in FIG. 22 is an electronic device 826 with two emitters, 201 and 202, and three receivers, 301, 302 and 303, the emitters and receivers being placed along opposite edges of a display 636. Light intensities detected at each of receivers 301, 302 and 303, are communicated to a calculating unit 770. Each emitter and receiver uses a respective primary lens, labeled respectively 441, 442, 443, 439 and 440. Emitters and receivers use the same lens arrangement, to ensure that light emitted by an emitter and re-directed by an emitter lens, is reverse-directed by an opposing lens onto a receiver.

It is desirable that the light beam from each emitter covers its two opposite receiver lenses. Such a condition is achieved by positioning each emitter between its lens and its lens' focal point. As such, the emitter is not in focus and, as a result, its light is spread, instead of being collimated, by its lens. Each receiver is similarly positioned between its lens and its lens' focal point.

Figure 23:
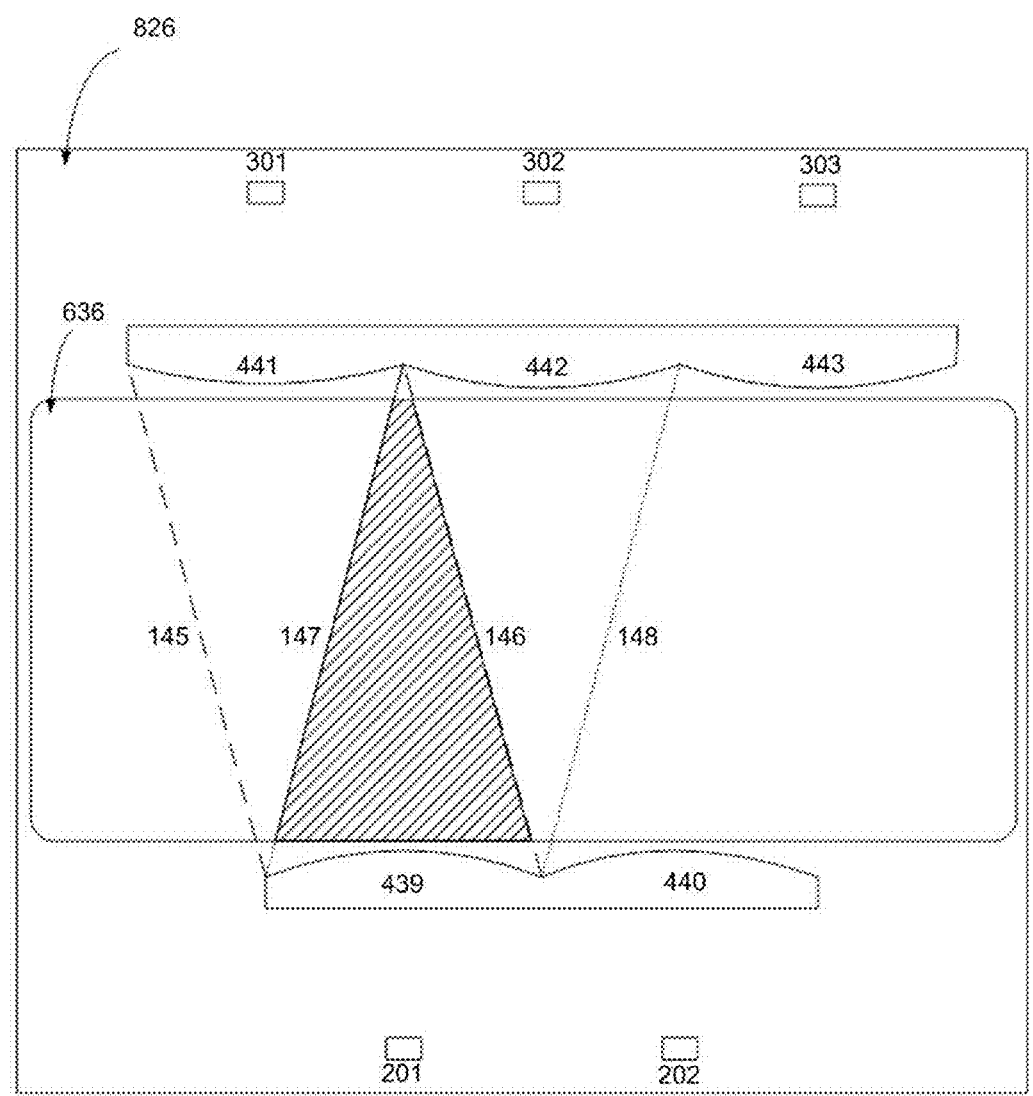
FIG. 23 is a diagram of the electronic device of FIG. 22, depicting overlapping light beams from one emitter detected by two receivers, in accordance with an embodiment of the present invention.

Reference is made to FIG. 23, which is a diagram of electronic device 826 of FIG. 22, depicting overlapping light beams from one emitter detected by two receivers, in accordance with an embodiment of the present invention. Shown in FIG. 23 are two wide light beams from emitter 201, one of which is detected at receiver 301 and another of which is detected at receiver 302, respectively. The left and right sides of the one beam are marked 145 and 146, respectively, and the left and right sides of the other beam are marked 147 and 148, respectively. The shaded area in FIG. 23 indicates the area on display 636 at which a touch blocks a portion of both wide beams. As such, a touch in this area is detected by two emitter-receiver pairs; namely, 201-301 and 201-302.

Figure 24:
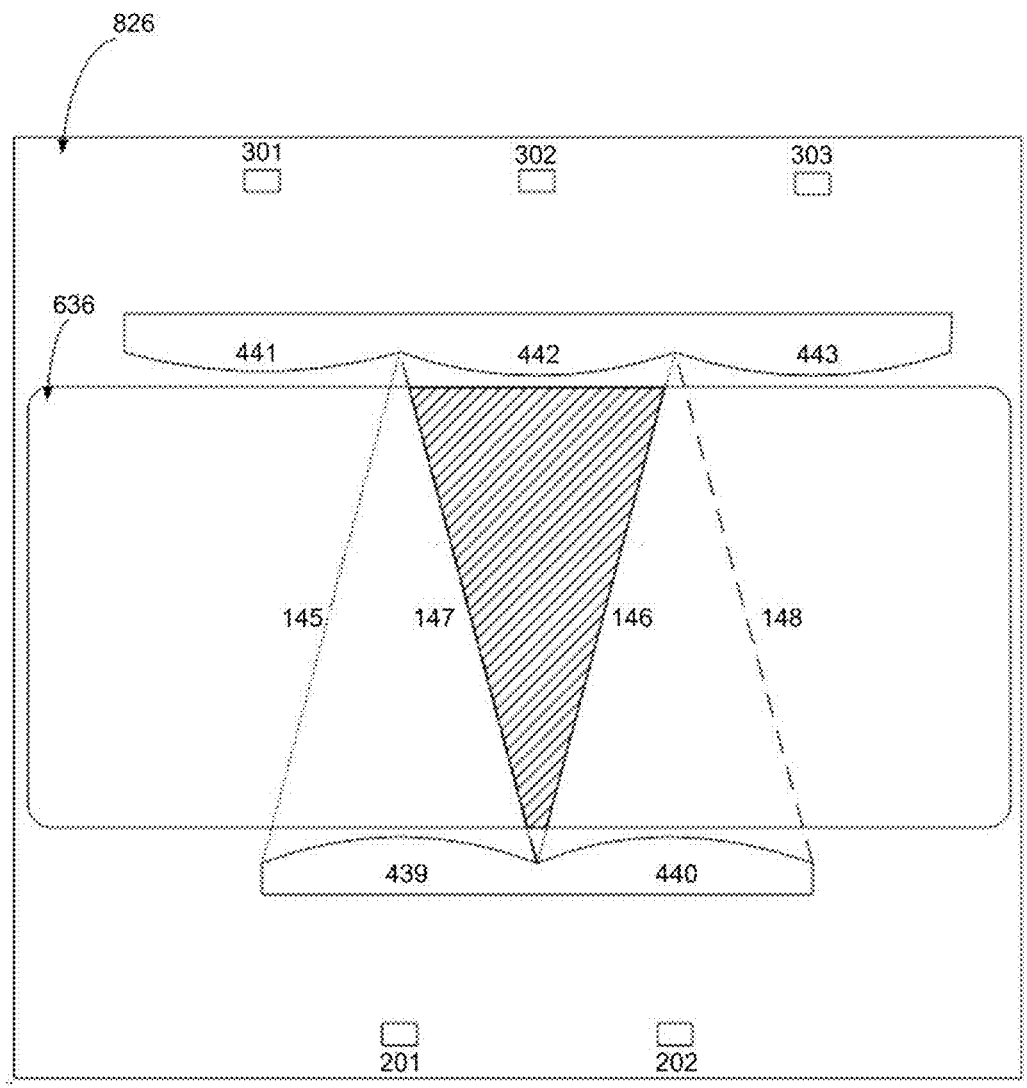
FIG. 24 is a diagram of the electronic device of FIG. 22, depicting overlapping light beams from two emitters detected by one receiver, in accordance with an embodiment of the present invention.

Reference is made to FIG. 24, which is a diagram of electronic device 826 of FIG. 22, depicting overlapping light beams from two emitters detected by one receiver, in accordance with an embodiment of the present invention. Shown in FIG. 24 are wide beams, one from emitter 201 and another from emitter 202, that are both detected at receiver 302. The left and right sides of the one beam are marked 145 and 146, respectively, and the left and right sides of the other beam are marked 147 and 148, respectively. The shaded area in FIG. 24 indicates the area on display 636 at which a touch blocks a portion of both wide beams. As such, a touch in this area is detected by two emitter-receiver pairs; namely, 201-302 and 202-302.

Figure 25:
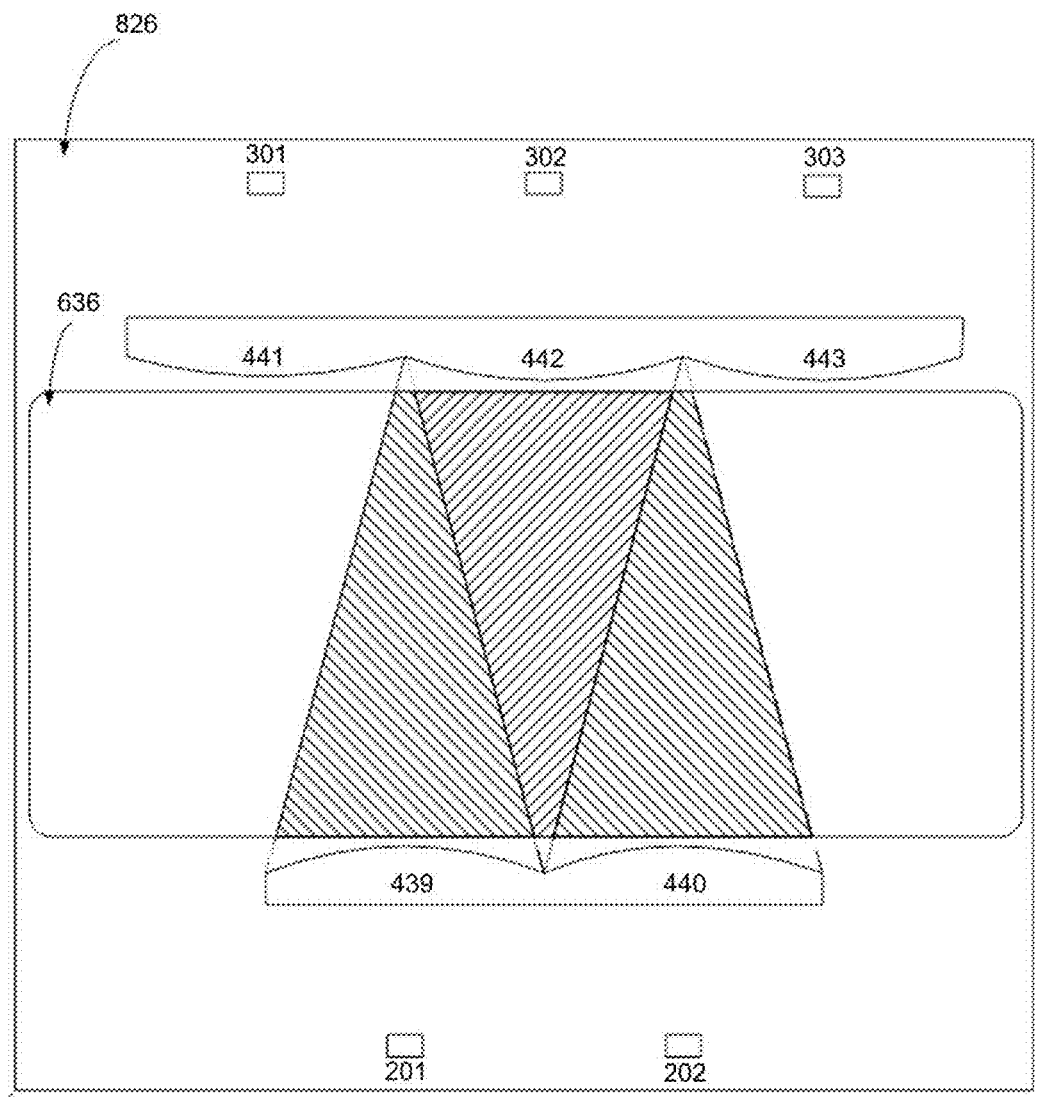
FIG. 25 is a diagram of the electronic device of FIG. 22, showing that points on the screen are detected by at least two emitter-receiver pairs, in accordance with an embodiment of the present invention.

Reference is now made to FIG. 25, which is a diagram of the electronic device 826 of FIG. 22, showing that points on the screen are detected by at least two emitter-receiver pairs, in accordance with an embodiment of the present invention. FIG. 25 shows the wide beams of FIGS. 23 and 24, and illustrates that touches in the shaded wedges on display 636 are detected by at least two emitter-receiver pairs. The two emitter-receiver pairs are either one emitter with two receivers, as in FIG. 23, or two emitters with one receiver, as in FIG. 24. More specifically, touches that occur near the row of emitters are generally detected by the former, and touches that occur near the row of detectors are generally detected by the latter. By surrounding the screen with similarly arranged emitters, lenses and receivers, any point may be similarly detected by two emitter-receiver pairs.

Figure 26:
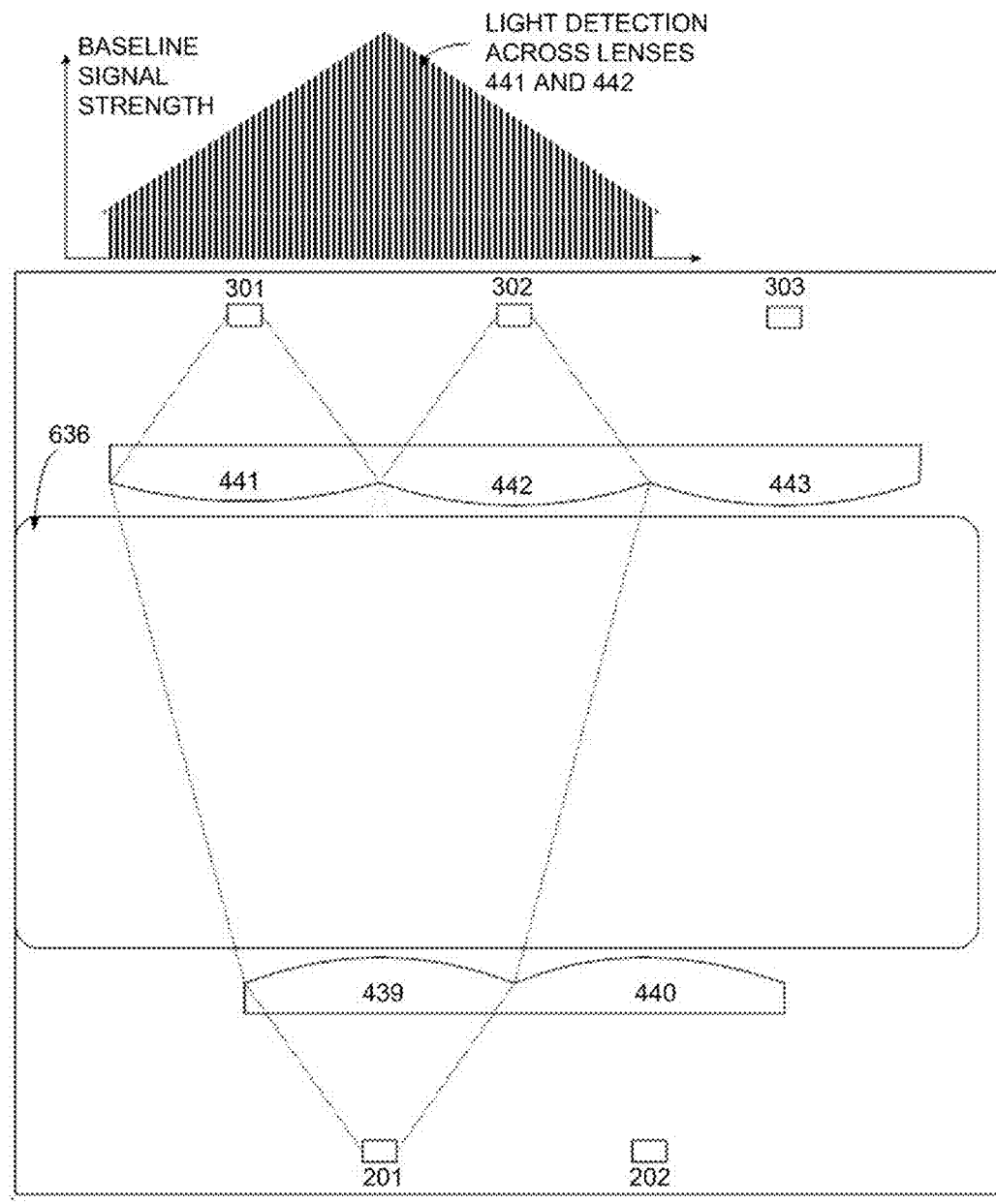
FIG. 26 is a simplified diagram of a wide-beam touch screen, showing an intensity distribution of a light signal, in accordance with an embodiment of the present invention.

Reference is made to FIG. 26, which is a simplified diagram of a wide-beam touch screen, showing an intensity distribution of a light signal, in accordance with an embodiment of the present invention. Shown in FIG. 26 is a wide angle light beam emitted by emitter 201 into lens 439. The light beam crosses over display 636 and substantially spans lenses 441 and 442. The light is detected at receivers 301 and 302.

Shown in FIG. 26 is a graph of detected light intensity. Total detected light corresponds to a shaded area under the graph. An object touching the screen blocks a portion of this light. If the object touching the screen moves across the wide beam, from left to right, the amount of blocked light increases, and correspondingly the total detected light decreases, as the object progresses from the left edge of the beam to the center of the beam. Similarly, the amount of blocked light decreases, and correspondingly the total detected light increases, as the object progresses from the center of the beam to the right edge of the beam.

It is noted that the detected light intensities at the edges of the light beam are strictly positive, thus ensuring that a touch at these edges is detected.

Figure 27:
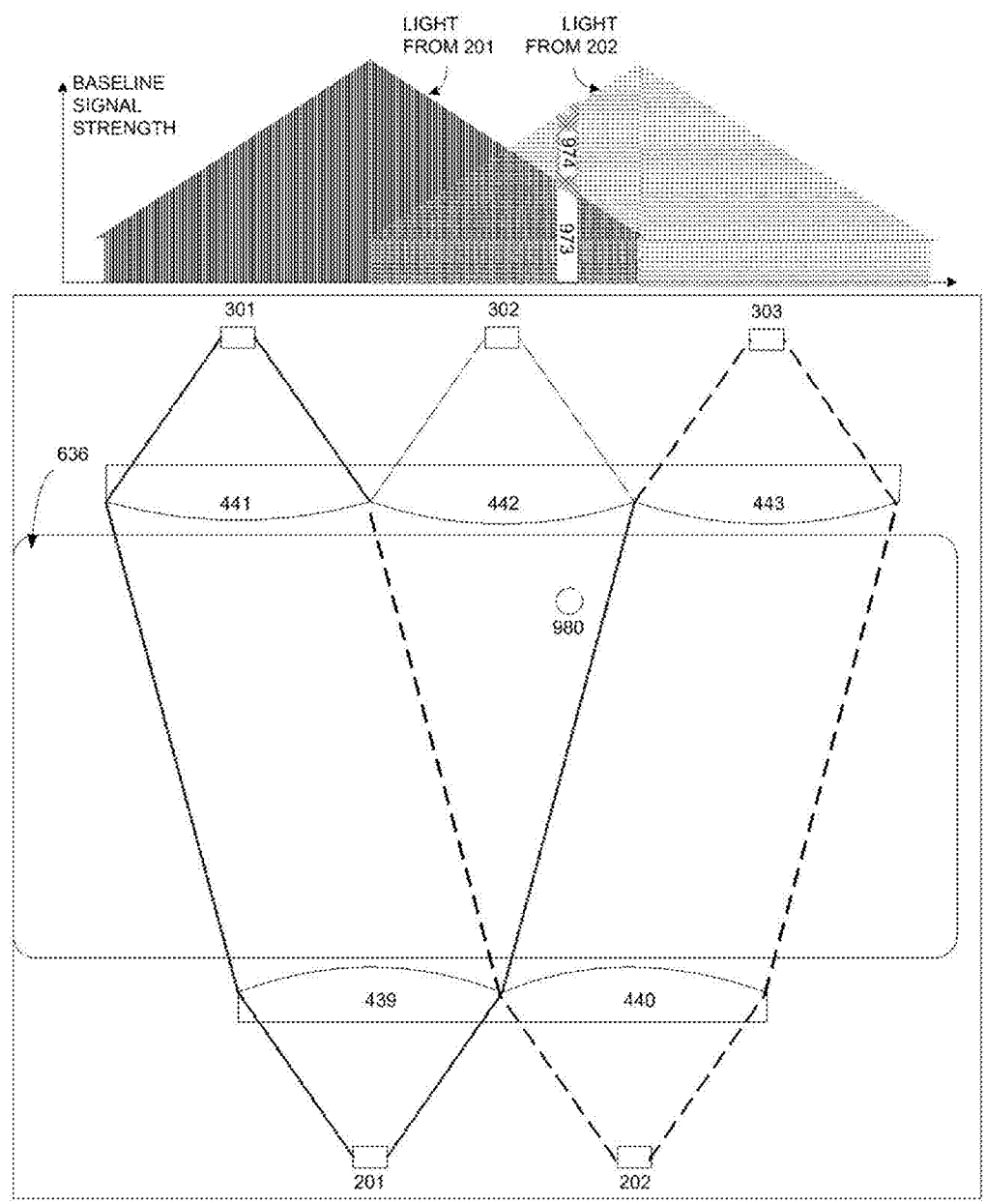
FIG. 27 is a simplified diagram of a wide-beam touch screen, showing intensity distributions of overlapping light signals from two emitters, in accordance with an embodiment of the present invention.

Reference is made to FIG. 27, which is a simplified diagram of a wide-beam touch screen, showing intensity distributions of overlapping light signals from two emitters, in accordance with an embodiment of the present invention. FIG. 27 shows light detected from emitters 201 and 202. A touch point 980 on display 636 blocks light from these emitters differently. Area 973 indicates attenuation of light from emitter 201 by point 980, and the union of areas 973 and 974 corresponds to the attenuation of light from emitter 202 by point 980. By comparing the light attenuation the two emitter-receiver pairs, 201-302 and 202-302, a precise touch coordinate is determined.

Figure 28:
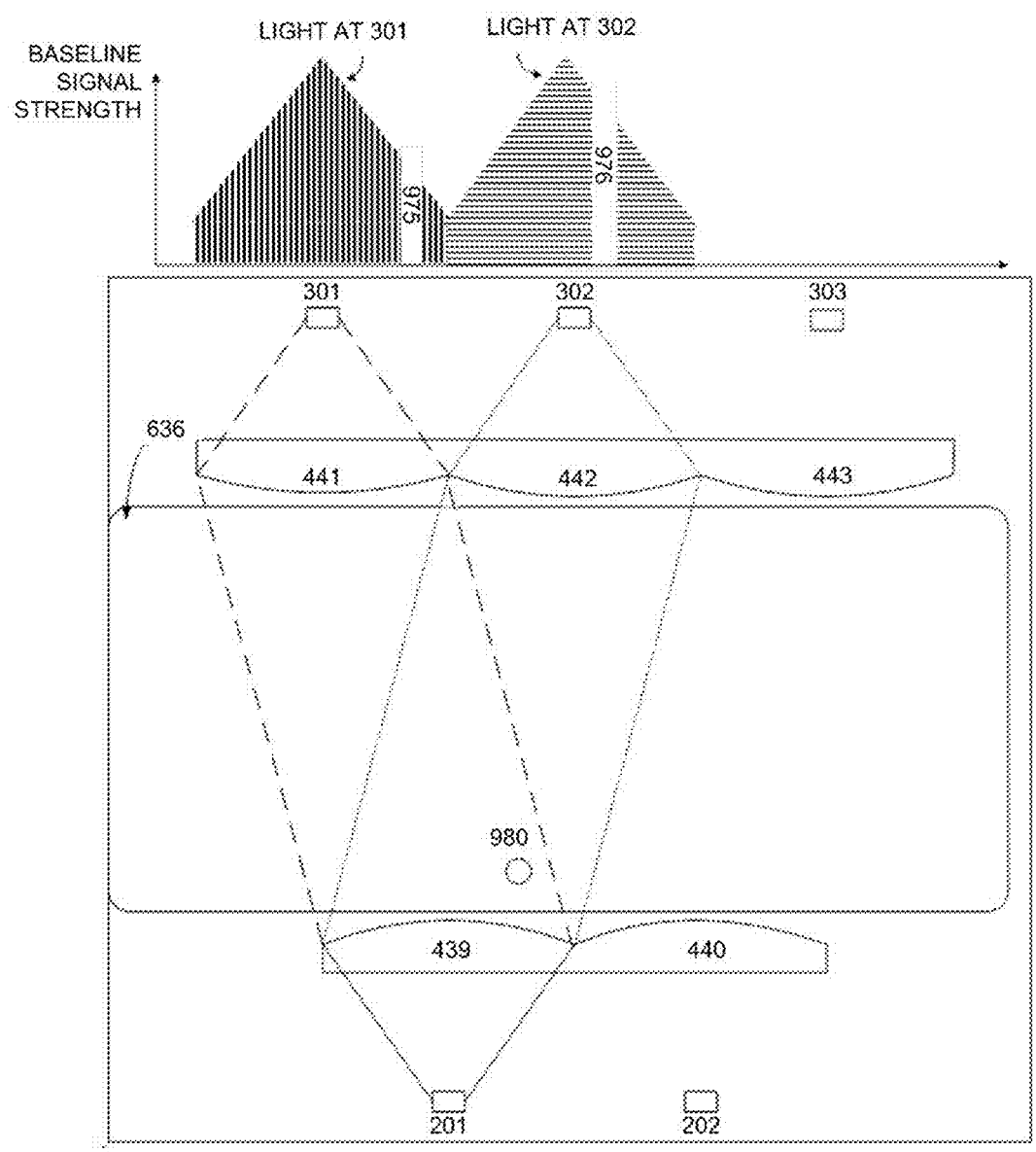
FIG. 28 is a simplified diagram of a wide-beam touch screen, showing intensity distributions of two sets of overlapping light signals from one emitter, in accordance with an embodiment of the present invention.

Reference is made to FIG. 28, which is a simplified diagram of a wide-beam touch screen, showing intensity distributions of two sets of overlapping light signals from one emitter, in accordance with an embodiment of the present invention. As shown in FIG. 28, touch point 980 is inside the area detected by emitter-receiver pair 201-301 and emitter-receiver pair 201-302. The attenuation of the light signal at receiver 302, depicted as area 976, is greater than the attenuation at receiver 301, depicted as area 975. By comparing the light attenuation in the two emitter-receiver pairs, 201-301 and 201-302, a precise touch coordinate is determined.

Determining the position of touch point 980 requires determining a position along an axis parallel to the edge along which the emitters are positioned, say, the x-axis, and along an axis perpendicular to the edge, say, the y-axis. In accordance with an embodiment of the present invention, an approximate y-coordinate is first determined and then, based on the expected attenuation values for a point having the thus determined y-coordinate and based on the actual attenuation values, a precise x-coordinate is determined. In turn, the x-coordinate thus determined is used to determine a precise y-coordinate. In cases where the touch point 980 is already touching the screen, either stationary or in motion, previous x and y coordinates of the touch point are used as approximations to subsequent x and y coordinates. Alternatively, only one previous coordinate is used to calculate a first subsequent coordinate, with the second subsequent coordinate being calculated based on the first subsequent coordinate. Alternatively, previous coordinates are not used.

Figure 29:
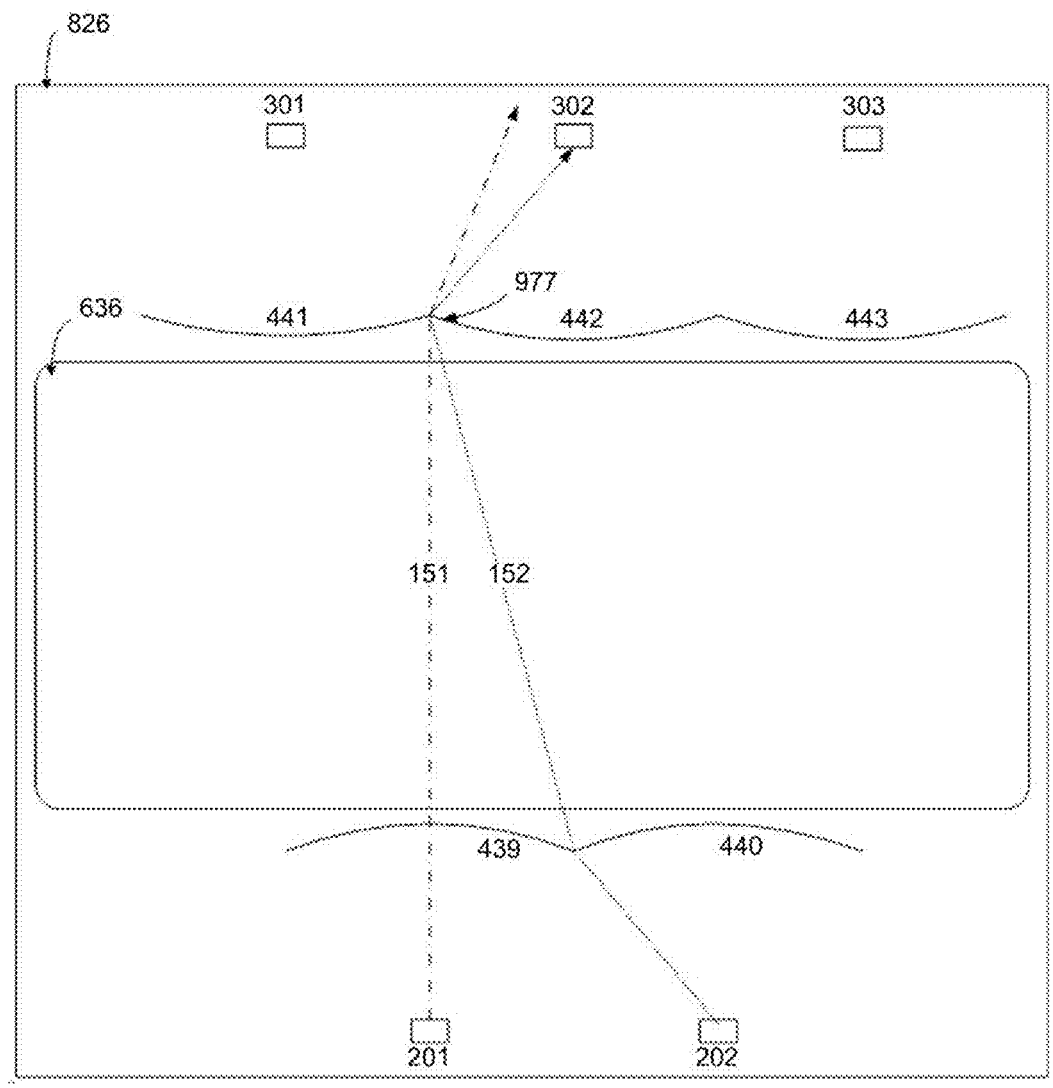
FIG. 29 is a simplified diagram of a wide beam touch screen with emitter and receiver lenses that do not have micro-lens patterns, in accordance with an embodiment of the present invention.

Reference is made to FIG. 29, which is a simplified diagram of a wide-beam touch screen with emitter and receiver lenses that do not have micro-lens patterns, in accordance with an embodiment of the present invention. Shown in FIG. 29 is an electronic device 826 with a display 636, emitters 201 and 202, corresponding emitter lenses 439 and 440, receivers 301, 302 and 303, and corresponding receiver lenses 441, 442 and 443. Two light beams, 151 and 152, from respective emitters 201 and 202, arrive at a point 977 that is located at an outer edge of lens 442. Since beams 151 and 152 approach point 977 at different angles of incidence, they do not converge on receiver 302. Specifically, light beam 152 arrives at receiver 302, and light beam 151 does not arrive at receiver 302.

Figure 31:
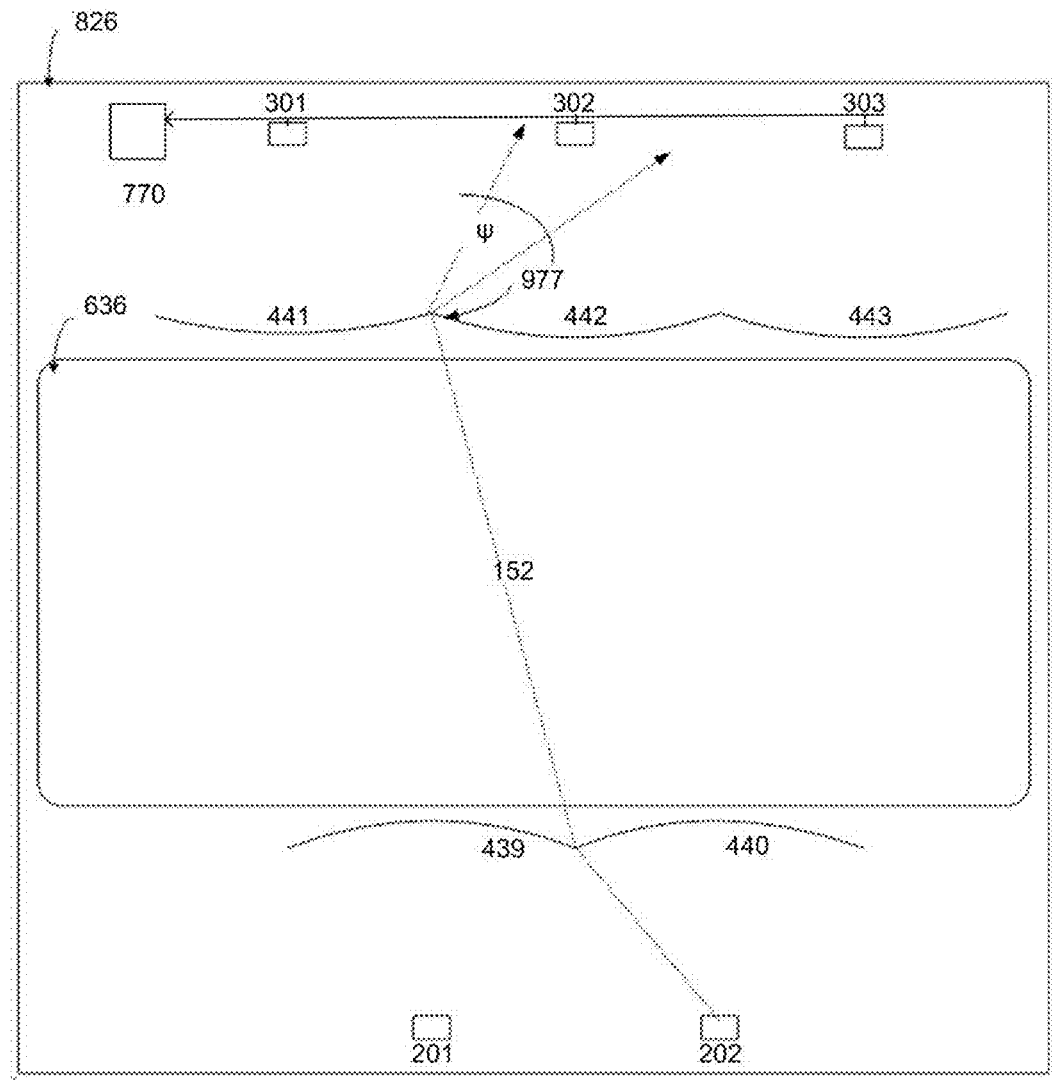

In order to remedy the non-convergence, a fine pattern of micro-lenses is integrated with the receiver lenses, at many points long the surfaces of the lenses. The micro-lenses distribute incoming light so that a portion of the light arriving at each micro-lens reaches the receivers. In this regard, reference is made to FIGS. 30 and 31, which are simplified diagrams of a wide-beam touch screen with emitter and detector lenses that have micro-lens patterns, in accordance with an embodiment of the present invention. FIG. 30 shows incoming beam 151 being spread across an angle θ by a micro-lens at location 977, thus ensuring that a portion of the beam reaches receiver 302. FIG. 31 shows incoming beam 152 being spread across an angle ψ by the same micro-lens at location 977, thus ensuring that a portion of this beam, too, reaches receiver 302. By arranging the micro-lenses at many locations along each receiver lens, light beams that enter the locations from different angles are all detected by the receiver. The detected light intensities are communicated to a calculating unit 770 coupled with the receiver.

Figure 32:
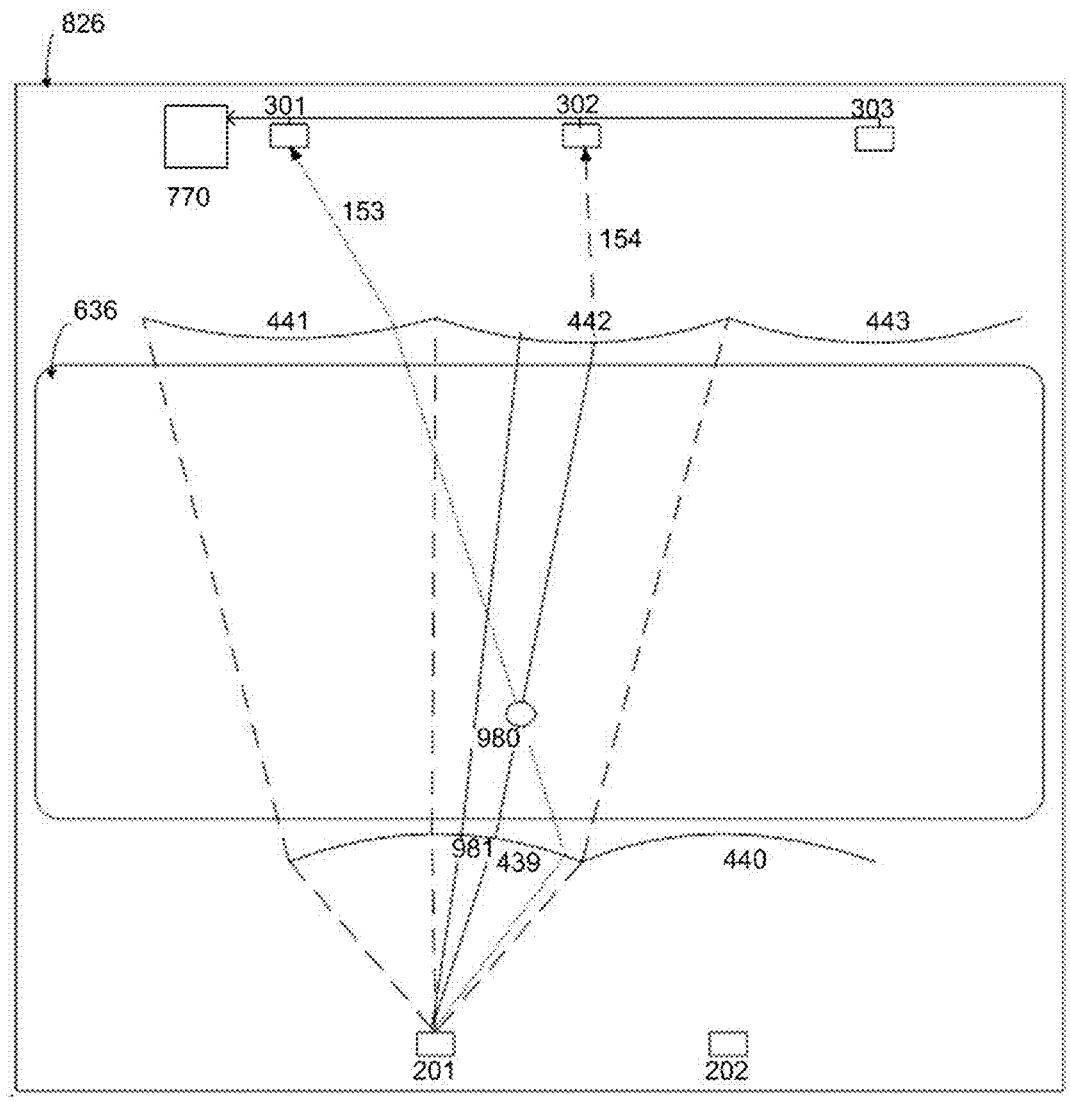
FIG. 32 is a simplified diagram of a wide-beam touch screen with emitter and receiver lenses that do not have micro-lens patterns, in accordance with an embodiment of the present invention.

Reference is made to FIG. 32, which is a simplified diagram of a wide-beam touch screen with emitter and receiver lenses that do not have micro-lens patterns, in accordance with an embodiment of the present invention. Shown in FIG. 32 is an electronic device 826 with a display 636, emitters 201 and 202, corresponding emitter lenses 439 and 440, receivers 301, 302 and 303, and corresponding receiver lenses 441, 442 and 443. Two light beams emitted by emitter 201 and detected by respective receivers 301 and 302, are desired in order to determine a precise location of touch point 980. However, lens 439, without micro-lens patterns, cannot refract a beam crossing point 980 to receiver 301. I.e., referring to FIG. 32, lens 439 cannot refract beam 153 as shown. Only the beam shown as 154, crossing point 980, is detected.

In order to remedy this detection problem, micro-lenses are integrated with the emitter lenses at many points along the surface of the lenses. The micro-lenses distribute outgoing light so that a portion of the light reaches the desired receivers. In this regard, reference is made to FIG. 33, which is a simplified diagram of a wide beam touch screen, with emitter and receiver lenses that have micro-lens patterns, in accordance with an embodiment of the present invention. FIG. 33 shows that a portion of light exiting from micro-lens location 982 reaches multiple receivers. As such, a touch at point 980 is detected by receivers 301 and 302. It will be noted from FIGS. 32 and 33 that the beams passing through point 980 are generated by micro-lenses at different locations 981 and 982. Light intensity values detected by the receivers of FIGS. 32 and 33 are communicated to a calculating unit 770.

Micro-lens patterns integrated with emitter and receiver lenses thus generate numerous overlapping light beams that are detected. Each point on the touch screen is traversed by multiple light beams from multiple micro-lenses, which may be on the same emitter lens. The micro-lenses ensure that the multiple light beams reach the desired receivers. Reference is made to FIG. 34, which is a simplified diagram of two emitters, 201 and 202, with respective lenses, 439 and 440, that have micro-lens patterns 444 integrated therein, in accordance with an embodiment of the present invention. Reference is also made to FIG. 35, which is a simplified diagram of two receivers, 301 and 302, with respective lenses, 439 and 440, that have micro-lens patterns 444 integrated therein, in accordance with an embodiment of the present invention.

In some cases it is of advantage to avoid having micro-lenses on the outermost surfaces of the emitter and receiver lenses. Since the outermost surfaces are visible to a user, it may be less aesthetic to have the micro-lenses on these surfaces, in order that the visible surfaces appear smooth. Moreover, outermost surfaces are susceptible to scratching and to accumulation of dust and dirt, which can degrade performance of the micro-lenses. As such, in embodiments of the present invention, the micro-lenses are integrated on surfaces that are not exposed to the user, as shown below in FIGS. 36, 37 and 40.

Figure 36:
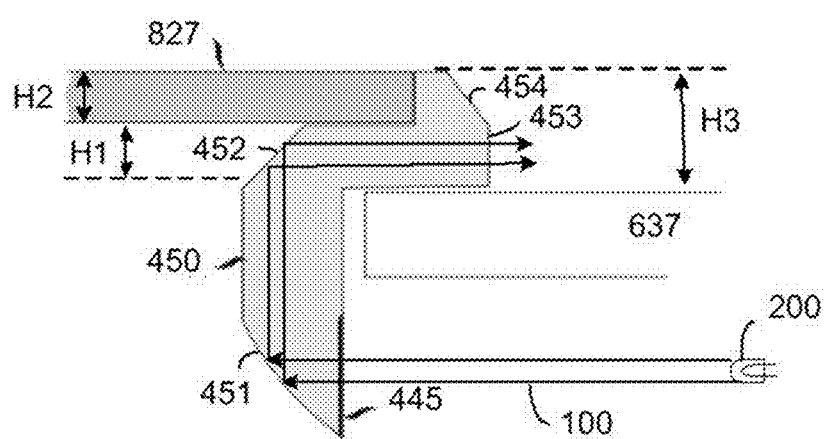
FIG. 36 is a simplified diagram of a side view of a single-unit light guide, in the context of an electronic device with a display and an outer casing, in accordance with an embodiment of the present invention.

Reference is made to FIG. 36, which is a simplified diagram of a side view of a single-unit light guide, in the context of an electronic device having a display and an outer casing, in accordance with an embodiment of the present invention. Shown in FIG. 36 is a cut-away of a portion of an electronic device with a display screen 637, an outer casing 827 above screen 637, and an emitter 200 below screen 637. A light guide 450 receives light beams 100 and reflects them above screen 637 so that they travel across the surface of screen 637 for detection. Light guide 450 includes internal reflective surfaces 451 and 452 for projecting light beams 100 above the surface of screen 637. A section 445 of light guide 450 serves as a primary lens to collimate light beams 100 when they are received. The surface of section 445 that faces emitter 200, indicated in bold, has patterns of micro-lenses etched thereon. As such, the micro-lenses are not visible to a user, and are protected from damage and dirt.

The surface of section 445 has a feather pattern for scattering incoming light beams 100 from an emitter 200. Reflective surfaces 451 and 452 reflect light beams 100. Reflective surface 451 is concave, and reflective surface 452 is a flat reflector oriented at a 45° angle with respect to incoming light beams 100.

Light beams 100 exit light guide 450 through flat surface 453. Surface 454 serves to connect light guide 450 to outer casing 827. Surface 454 is located above the plane of active light beams used by the touch system, and is angled for aesthetic purposes.

The reflective characteristics of surface 452 require that dust and dirt not accumulate on surface 452, and require that outer casing 827, which may be made inter alia of metal or plastic, not make contact with surface 452; otherwise, reflectivity of surface 452 may be impaired. As such, outer casing 827 is placed above surface 452, thereby protecting surface 452 from dust and dirt, and outer casing 827 is not flush with surface 452, so that casing material does not touch surface 452. Being a flat reflector at a 45° angle relative to incoming light beams, surface 452 is positioned above the upper surface of display 637. As such, the device height, H3, above display 637 due to light guide 450, comprises the height, H1, of surface 452 plus the thickness, H2, of outer casing 827.

At the receiving side, a light guide similar to 450 is used to receive light beams 100 that are transmitted over screen 637, and to direct them onto corresponding one or more receivers. Thus, light beams enter light guide 450 at surface 453, are re-directed by surface 452 and then by surface 451, and exit through the micro-lens patterned surface of section 445 to one or more receivers. At the receiving side, the surface of section 445 has a pattern that scatters the light beams as described hereinabove.

Figure 37:
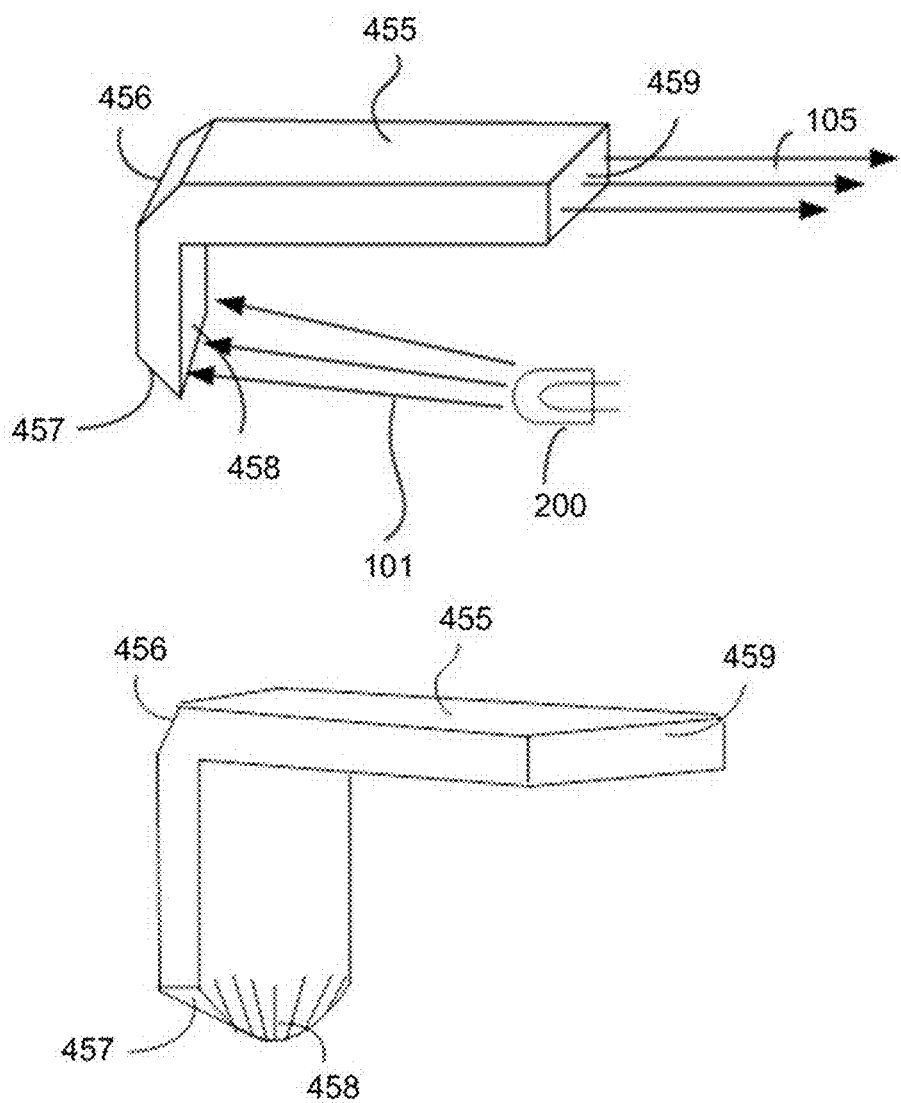
FIG. 37 is a simplified diagram of side views, from two different angles, of a lens with applied feather patterns on a surface, in accordance with an embodiment of the present invention.

Reference is made to FIG. 37, which is a simplified diagram of side views, from two different angles, of a lens with applied feather patterns on a surface, in accordance with an embodiment of the present invention. Shown in FIG. 37 is a light guide 455 having an internal reflective section 456, an internal collimating lens 457, and etched micro-lenses 458. Light beams 101 entering light guide 455 at lens 457 exit the light guide through a surface 459 as light beams 105.

Similar light guides are used for receiving beams that have traversed the screen, to focus them onto receivers. In this case, light beams enter at surface 459, are reflected below the screen surface by internal reflective section 456, are re-focused onto a receiver by collimating lens 457, and re-distributed by micro-lenses 458. In general, the same lens and micro-lenses are used with an emitter and a detector, in order that the light beam be directed at the receiving side in reverse to the way it is directed at the emitting side.

Collimating lens 457 has a rounded bottom edge, as shown at the bottom of FIG. 37. In order to properly refract incoming light on the emitter side, the micro-lenses 458 are formed in a feather pattern, spreading as a fan, as shown at the bottom of FIG. 37 and in FIG. 38.

Figure 38:
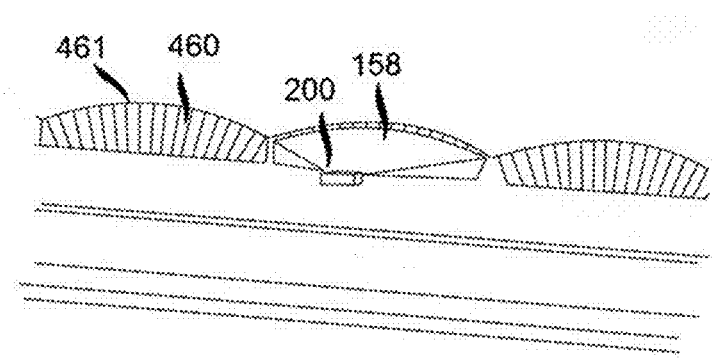
FIG. 38 is a simplified diagram of a portion of a wide-beam touch screen, in accordance with an embodiment of the present invention.

Reference is made to FIG. 38, which is a simplified diagram of a portion of a wide-beam touch screen, in accordance with an embodiment of the present invention. A feather pattern 460 is shown applied to the surface of a lens 461. A similar neighboring lens is associated with an emitter 200 emitting a wide beam 158.

Figure 39:
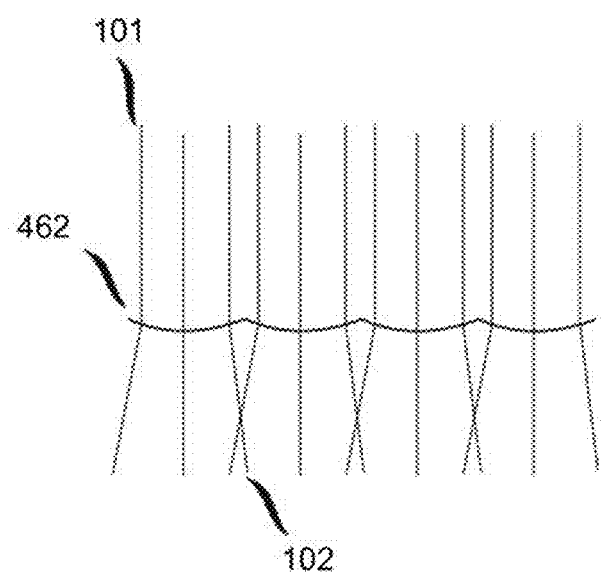
FIG. 39 is a top view of a simplified diagram of light beams entering and exiting micro-lenses etched on a lens, in accordance with an embodiment of the present invention.

Reference is made to FIG. 39, which is a top view of light beams entering and exiting micro-lenses etched on a lens, in accordance with an embodiment of the present invention. Substantially collimated light beams 101 are shown in FIG. 39 entering micro-lenses 462 and being refracted to light beams 102, such that each micro-lens acts as a light source spreading a wide beam across a wide angle.

Touch Screen System Configuration No. 3

Several challenges arise in the manufacture of the micro-lenses in configuration no. 2. One challenge is the difficulty of accurately forming the fan-shaped feather pattern of micro-lenses. It is desirable instead to use micro-lenses arranged parallel to one another, instead of the fan/feather pattern.

A second challenge relates to the mold used to manufacture the light guide in configuration no. 2. Referring to FIG. 36, it is desirable that the outer surface of section 445, facing emitter 200, be vertical, so that the front surface of section 445 is parallel with the straight back surface portion of light guide 450. However, it is difficult to manufacture exactly parallel surfaces. Moreover, if the light guide 450 were to be wider at its bottom, then it would not be easily removable from its mold. As such, the two surfaces generally form a wedge, and the surface of section 445 facing emitter 200 is not perfectly vertical. To compensate for this, the micro-lenses are arranged so as to be perpendicular to a plane of incoming light beams.

A third challenge is the constraint that, for optimal performance, the micro-lenses be positioned accurately relative to their corresponding emitter or receiver. The tolerance for such positioning is low. As such, it is desirable to separate section 445 of the light guide so that it may be positioned accurately, and to allow more tolerance for the remaining portions of the light guide as may be required during assembly or required for robustness to movement due to trauma of the electronic device.

Configuration no. 3, as illustrated in FIGS. 40-42 and 48, serves to overcome these, and other, challenges.

Figure 40:
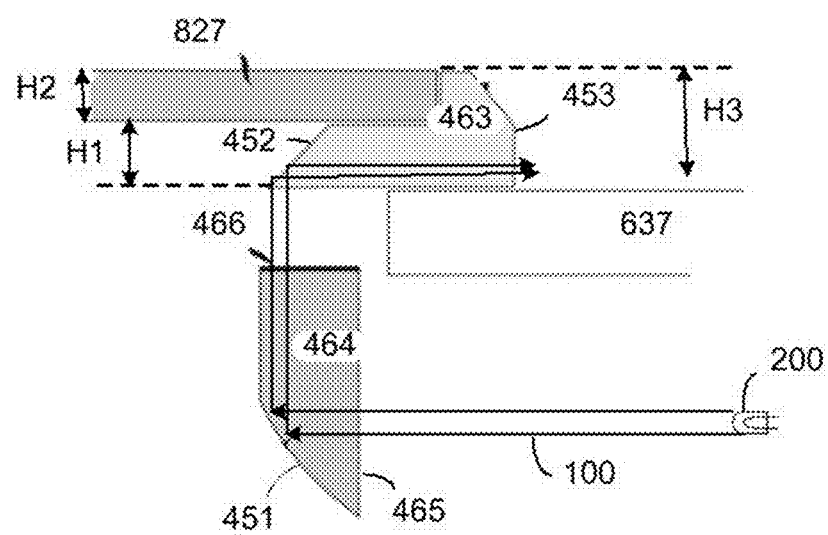
FIG. 40 is a simplified diagram of a side view of a dual-unit light guide, in the context of a device having a display and an outer casing, in accordance with an embodiment of the present invention.

Reference is made to FIG. 40, which is a simplified diagram of a side view of a dual-unit guide, in the context of an electronic device having a display 637 and an outer casing 827, in accordance with an embodiment of the present invention. Shown in FIG. 40 is an arrangement similar to that of FIG. 36, but with light guide 450 split into an upper portion 463 and a lower portion 464. The micro-lenses are located at an upper surface 466 of lower portion 464. As such, the micro-lenses are not embedded in the collimating lens portion of light guide 464.

Figure 42:
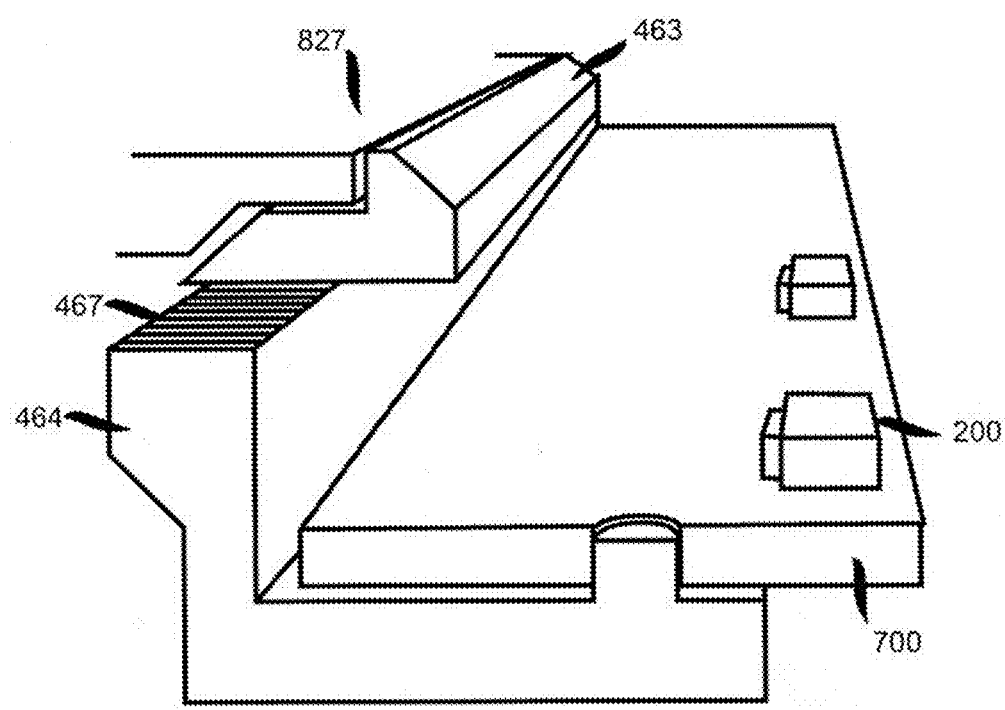
FIG. 42 is a top view of the light guide units of FIG. 41, in accordance with an embodiment of the present invention.

In configuration no. 2, the curved shape of the collimating lens necessitated a fan/feather pattern for the micro-lenses etched thereon. In distinction, in configuration no. 3 the micro-lenses are etched on rectangular surface 466, and are arranged as parallel rows. Such a parallel arrangement, referred to herein as a "tubular arrangement", is shown in FIG. 42. Specifically, a parallel series of micro-lenses 467 are shown along an upper surface of light guide 464 in FIG. 42.

An advantage of configuration no. 3 is that the flat upper surface of the light guide may be molded as nearly parallel with the screen surface as possible, since the mold is one flat surface that lifts off the top of light guide 464. Furthermore, in configuration no. 3, only portion 464 of the light guide has a low tolerance requirement for positioning. Portion 463 has a higher tolerance, since its surfaces are not placed at a focal point of an element.

As shown in FIG. 40, light beams 100 emitted by emitter 200 enter light guide unit 464 at surface 465, are reflected by reflective surface 451 through surface 466, and into light guide unit 463. Inside light guide unit 463, light beams 100 are reflected by surface 452, and exit through surface 453 over display 637.

FIG. 40 indicates that the height, H3, added by the light guide over display 637 comprises the sum of the height, H1, of internal reflective surface 452, and the height, H2, of the thickness of outer casing 827.

Figure 41:
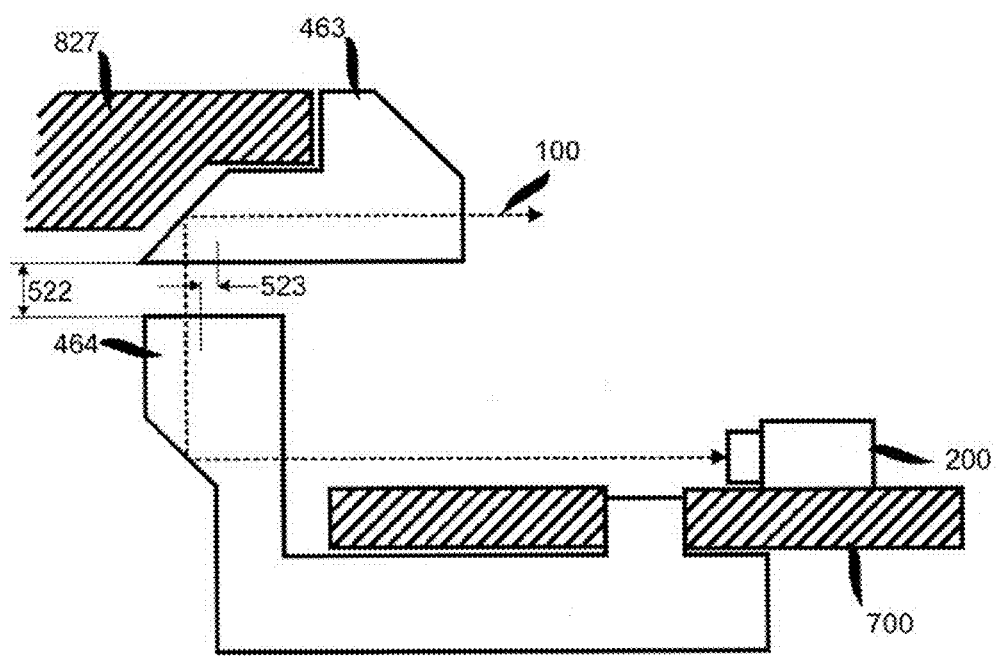
FIG. 41 is a picture of light guide units, within the content of a device having a PCB and an outer casing, in accordance with an embodiment of the present invention.

Reference is made to FIG. 41, which is a picture of light guide units 463 and 464, within the content of a device having a PCB 700 and an outer casing 827, in accordance with an embodiment of the present invention. The tubular pattern on the upper surface of light guide unit 464 is a fine pattern. In order for this pattern to distribute the light beams correctly, light guide 464 is placed precisely relative to its respective LED or PD. By contrast, light guide unit 463 has a flat reflective surface and, as such, does not require such precision placement. FIG. 40 indicates the relative positioning of light guide units 463 and 464. Their alignment is represented by a distance 523, and has a tolerance of up to 1 mm. A distance 522 represents the height between the light guide units.

Reference is made to FIG. 42, which is a top view of light guide units 463 and 464 of FIG. 41, in accordance with an embodiment of the present invention. Tubular pattern 467 appears on the upper surface of light guide unit 464.

Touch Screen System Configuration No. 4

Configuration no. 4 uses a reflective light guide and lens that reduce the height of a light guide above a display. The reflective light guide and lens of configuration 4 are suitable for use with the feather pattern lenses of configuration no. 2 and with the tubular pattern lenses of configuration no. 3. Many electronic devices are designated with a display surface that is flush with the edges of the devices. This is often an aesthetic feature and, as such, when integrating optical touch screens with electronic devices, it is desirable to minimize or eliminate the raised rims. Less visibly prominent rims result in sleeker, more flush outer surfaces of the devices.

Moreover, in optical touch screens, the raised rim occupies a width around the display, beyond the edges of the display. Many electronic devices are designed with display surfaces that seamlessly extend to the edges of the devices. This is often an aesthetic feature and, as such, when integrating optical touch screens with electronic devices, it is desirable to design the reflective raised rims in such a way that they appear as seamless extensions of the display.

Configuration no. 4 achieves these objectives by reducing bezel height and providing a seamless transition between a display edge and an outer border of a device, resulting in a more appealing aesthetic design. The light guide of configuration no. 4 integrates with an outer casing having an elongated rounded edge, thereby softening sharp angles and straight surfaces.

Configuration no. 4 employs two active mirror surfaces; namely, a parabolic reflective surface that folds and focuses incoming light to a focal location, and an elliptical refractive surface that collects light from the focal location and collimates the light into beams across the screen.

Figure 43:
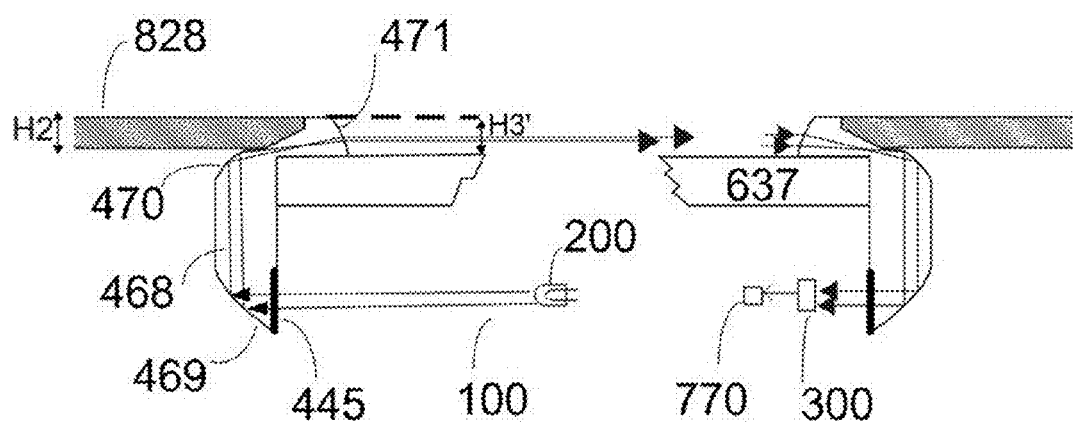
FIG. 43 is a simplified diagram of a side view cutaway of a light guide within an electronic device, in accordance with an embodiment of the present invention.

Reference is made to FIG. 43, which is a simplified diagram of a side view of a light guide within an electronic device, in accordance with an embodiment of the present invention. Shown in FIG. 43 is a light guide 468 between an outer casing 828 and a display 637. Light beams from an emitter 200 enter light guide 468 through a surface 445. A feather pattern of micro-lenses is present on a lower portion of surface 445, in order to scatter the light beams 100. Light beams 100 are reflected by an internal concave reflective surface 469 and by a parabolic reflective surface 470, and exit light guide 468 through an elliptical refractive surface 471. Elliptical refractive surface 471 redirects at least a portion of light beams 100 in a plane parallel with the surface of display 637. Light beams 100 are received at the other end of display 637, by a similar light guide that directs the beams onto a light receiver 300. The light intensity detected by light receiver 300 is communicated to a calculating unit 770.

Figure 44:
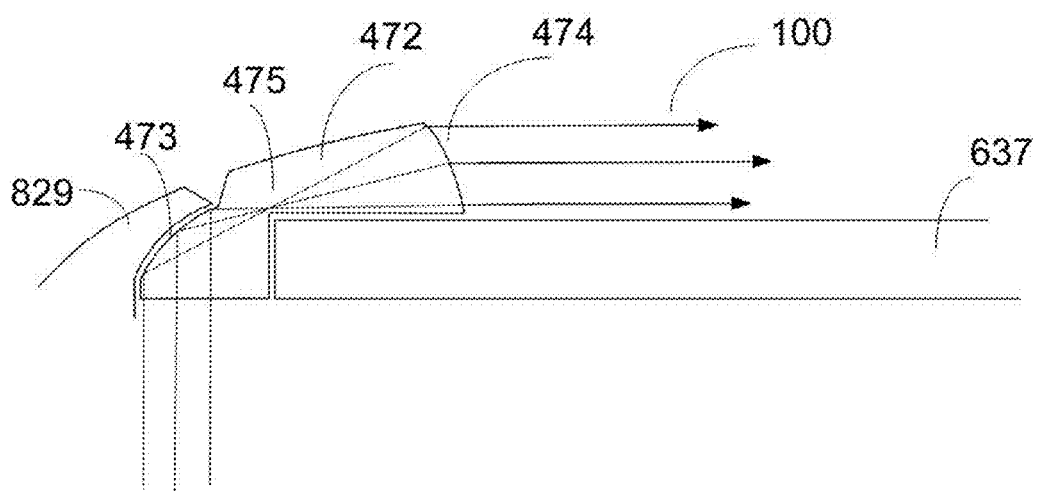
FIG. 44 is a simplified diagram of a side view cutaway of a portion of an electronic device and an upper portion of a light guide with at least two active surfaces for folding light beams, in accordance with an embodiment of the present invention.

Reference is made to FIG. 44, which is a simplified diagram of a side view cutaway of a portion of an electronic device and an upper portion of a light guide with at least two active surfaces for folding light beams, in accordance with an embodiment of the present invention. Shown in FIG. 44 is an upper portion of a light guide 472. Surface 473 is part of a parabola, or quasi-parabola, or alternatively is a free form, having a focal line 475. Focal line 475, and surfaces 473 and 474 extend along the rim of display 637. Surface 474 is part of an ellipse, or quasi-ellipse, or alternatively a free form, having focal line 475.

On the emitter side, light beams enter the light guide, and parabolic mirror 473 reflects the beams to a focal point inside the light guide. Refracting elliptical lens 474 has the same focal point as parabolic mirror 473. Elliptical lens 474 refracts the light from the focal point into collimated light beams over display 637. On the receiver side, collimated light beams enter the light guide, and are refracted by elliptical lens 474 into a focal point. Parabolic mirror 473 reflects the beams from the focal point inside the light guide, to collimated output beams.

Surface 469 in FIG. 43 folds light beams 100 upwards by 90°. Surface 469 is formed as part of a parabola. In one embodiment of the present invention, surface 469 is corrected for aberrations due to input surface 445 being slightly inclined rather than perfectly vertical, and also due to the light source being wider than a single point.

Surfaces 469 and 470 use internal reflections to fold light beams. Thus these surfaces need to be protected from dirt and scratches. In FIG. 44, surface 473 is protected by outer casing 829. The lower surface (now shown) of light guide 472 is deep within the electronic device, and is thus protected.

Using configuration no. 4, substantially all of reflective surface 473 is located below the upper surface of display 637. Thus, this configuration adds less height to an electronic device than does configuration no. 2. Referring back to FIG. 43, the height, H3', added by the light guide in the present configuration is approximately the thickness, H2, of the outer casing, which is less than the corresponding height, H3, in configuration no. 2. Moreover, the convex shape of surface 471 of FIG. 43 and surface 474 of FIG. 44 is easier for a user to clean than is the perpendicular surface 453 of FIG. 36. Thus a user can easily wipe away dust and dirt that may accumulate on display 637 and on surface 471. It is noted that configuration no. 4 eliminates the need for surface 454 of FIG. 36, since outer casing 828 is flush with the height of surface 471, instead of being above it.

The convex shape of surface 471 of FIG. 43 makes the bezel less visibly prominent than does the perpendicular surface 453 of FIG. 36.

Some electronic devices are covered with a flat sheet of glass that extends to the four edges of the device. The underside of the glass is painted black near the devices edges, and the display is viewed through a clear rectangular window in the middle of the glass. Examples of such devices include the IPHONE®, IPOD TOUCH® and IPAD®, manufactured by Apple Inc. of Cupertino, Calif., and also various models of flat-panel computer monitors and televisions. In some cases, the light guides surrounding the various touch screens described herein may appear non-aesthetic, due to (a) the light guide being a separate unit from the screen glass and thus the border between them is noticeable, and (b) the light guide extending below the screen and thus, even if the underside of the light guide is also painted black, the difference in heights between the bottom of the light guide and the screen glass is noticeable. Embodiments of the present invention employ a two-unit light guide to overcome this problem.

Figure 45:
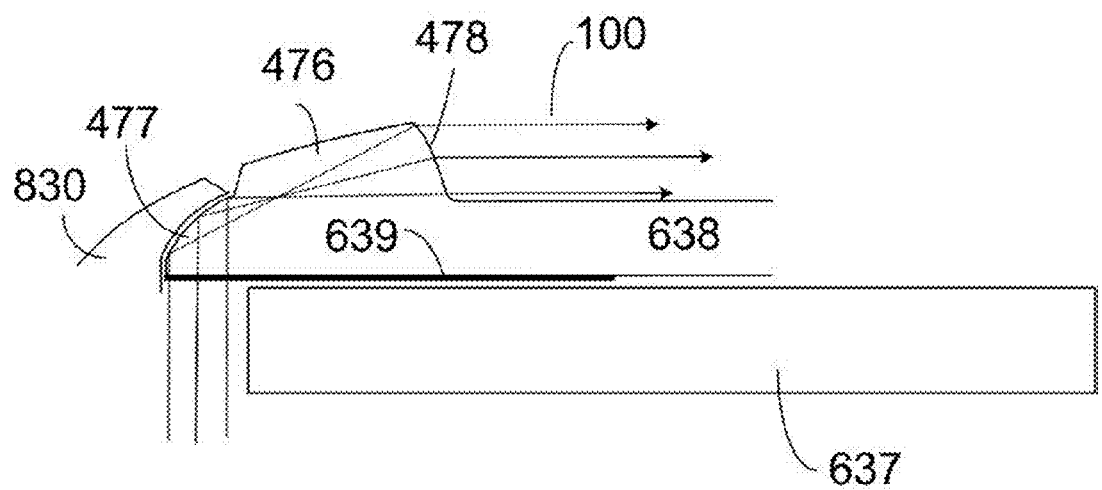
FIG. 45 is a simplified drawing of a section of a transparent optical touch light guide, formed as an integral part of a protective glass covering a display, in accordance with an embodiment of the present invention.

In one such embodiment, the upper unit of the light guide is merged with the screen glass. In this regard, reference is made to FIG. 45, which is a simplified drawing of a section of a transparent optical touch light guide 476, formed as an integral part of a protective glass 638 covering a display 637, in accordance with an embodiment of the present invention. A daylight filter sheet 639 on the underside of protective glass 638 serves, instead of black paint, to hide the edge of display 637, without blocking light beams 100. Light guide 476 has an outer elliptical surface 478 and an inner parabolic surface 477, and merges smoothly with an outer casing 830. Light beams 100 pass through light guide 476 as in FIG. 44.

Figure 46:
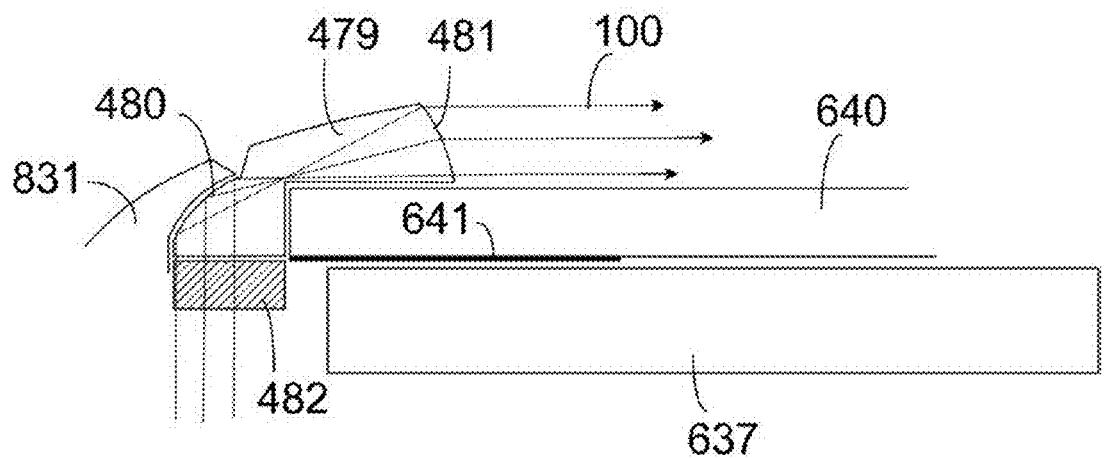
FIG. 46 is a simplified illustration of the electronic device and light guide of FIG. 44, adapted to conceal the edge of the screen, in accordance with an embodiment of the present invention.

In some cases, the cost of manufacturing a protective glass cover with an integrated reflective lens may be expensive. As such, in an alternative embodiment of the present invention, a black object is placed between the upper and lower units of the light guide. The height of the black object is aligned, within the electronic device, with the height of the black paint on the underside of the protective glass. In this regard, reference is made to FIG. 46, which is a simplified illustration of the electronic device and light guide of FIG. 44, adapted to conceal the edge of the screen, in accordance with an embodiment of the present invention. Shown in FIG. 46 is black paint, or alternatively a daylight filter sheet 641, on the underside of protective glass 640, covering display 637. A black plastic element 482 is aligned with black paint/daylight filter sheet 641, so that the edge of protective glass 640 is not discernable by a user. Black plastic element 482 transmits infra-red light to allow light beams 100 to pass through.

Figure 47:
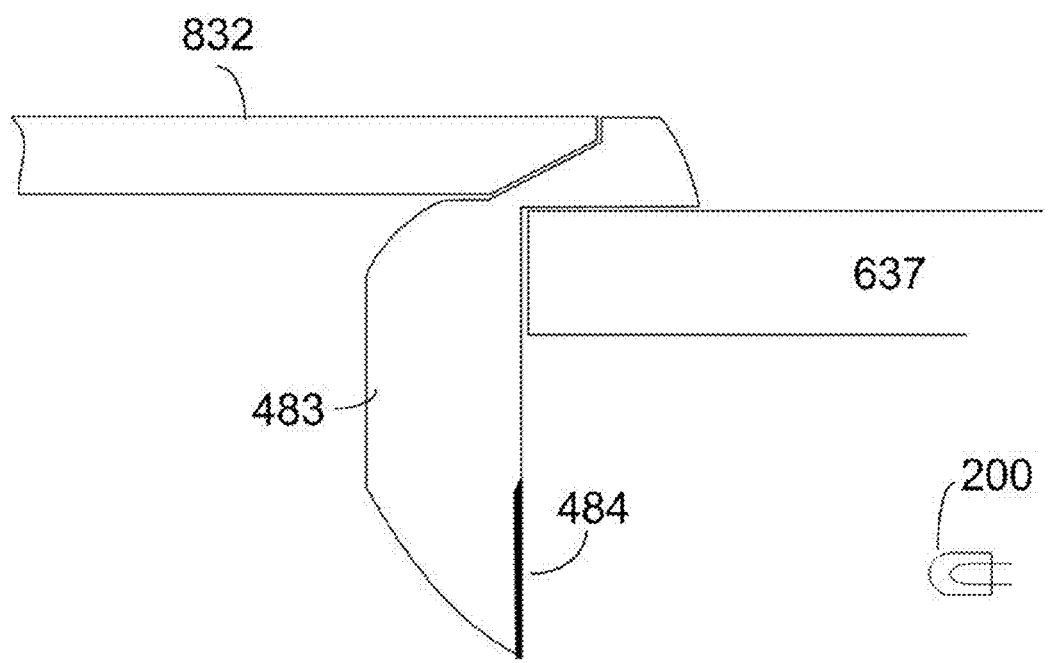
FIG. 47 is a simplified diagram of a light guide that is a single unit extending from opposite an emitter to above a display, in accordance with an embodiment of the present invention.

Reference is made to FIG. 47, which is a simplified diagram of a light guide 483 that is a single unit extending from opposite an emitter 200 to above a display 637, in accordance with an embodiment of the present invention. A portion of an outer casing 832 is shown flush with the top of light guide 483. The lower portion of light guide 483 has a feather pattern of micro-lenses 484 to scatter the light beams arriving from emitter 200. At the receiving side, the light beams exit through the bottom of a light guide similar to light guide 483, towards a receiver. The same feather pattern 484 breaks up the light beams en route to the receiver.

Figure 48:
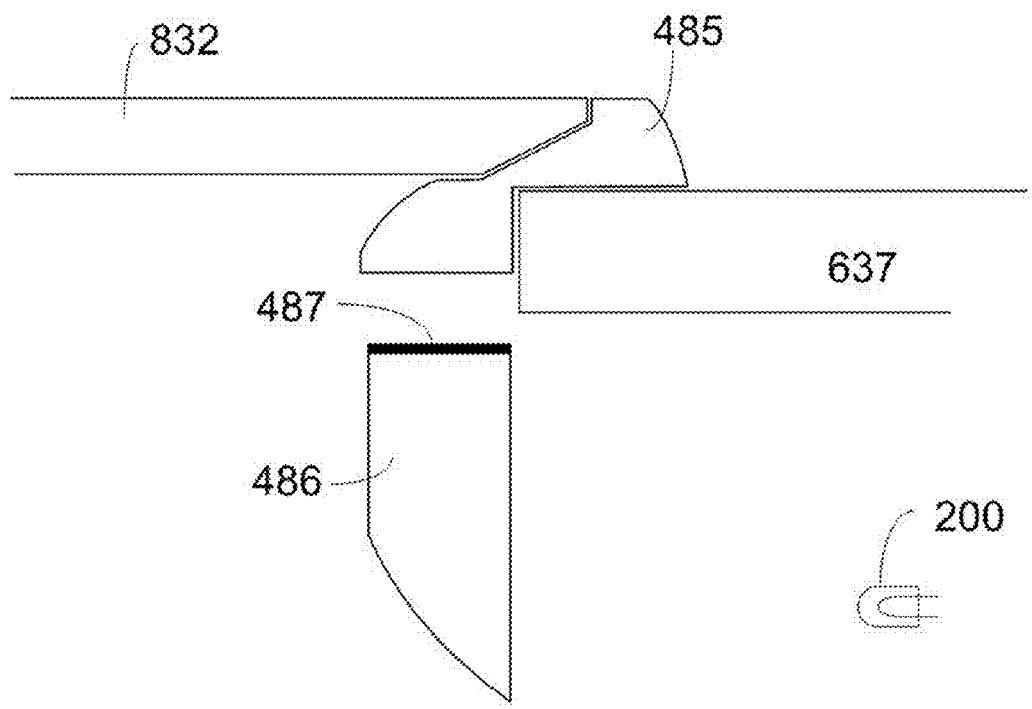
FIG. 48 is a simplified diagram of a dual-unit light guide, in accordance with an embodiment of the present invention.

Reference is made to FIG. 48, which is a simplified diagram of a dual-unit light guide, in accordance with an embodiment of the present invention. Shown in FIG. 48 is a light guide with an upper unit 485 and a lower unit 486. A portion of an outer casing 832 is flush with the top of light guide unit 485. A display 637 is shown to the right of light guide unit 485. The top surface of light guide unit 486 has a tubular pattern of micro-lenses 487 to break up light beams arriving from an emitter 200. At the receiving side, the light beams exit through the bottom of a light guide similar to the light guide shown in FIG. 48, towards a receiver. The same tubular pattern 487 breaks up the light beams en route to the receiver.

As explained hereinabove with reference to FIGS. 36 and 40, the positioning of light guide unit 486 with tubular pattern 487 requires high precision, whereas the positioning of light guide unit 485 does not require such precision. The effect of tubular pattern 487 on the light beams depends on its precise placement relative to its respective emitter or receiver. The active surfaces in light guide unit 485 are more tolerant, since they are largely self-contained; namely, they are both focused on an internal focal line, such as focal line 475 of FIG. 44.

Touch Screen System Configuration No. 5

Configuration no. 5 relates to increasing the resolution of an optical touch screen, to yield high resolution touch sensitivity throughout an active screen area, including the edges of the screen. Configuration 5 is useful for simplifying the process of integrating touch screen components, and minimizing the tolerance chain, for a manufacturer, by preparing modular blocks containing a lens and an emitter or a receiver. These modular blocks are formed so as to be easily positioned together in a row along an edge of a display, for fast assembly of a touch screen. The high tolerance requirements of placing an emitter or receiver in exactly the correct position vis-à-vis a lens, are handled during manufacture of the modular blocks, thus removing the burden of high tolerance assembly from a device manufacturer.

High resolution touch sensitivity is achieved by combining two or more emitter-receiver pair signals that span a common area, as described hereinabove with reference to configurations nos. 2 and 3. A technique for calculating a precise touch location is described hereinbelow.

Simplified manufacturing is achieved by integrating optical elements and electronic components into a single unit. As such, complex surfaces may be gathered into one component, thereby reducing the need for high assembly tolerances.

Figure 49:
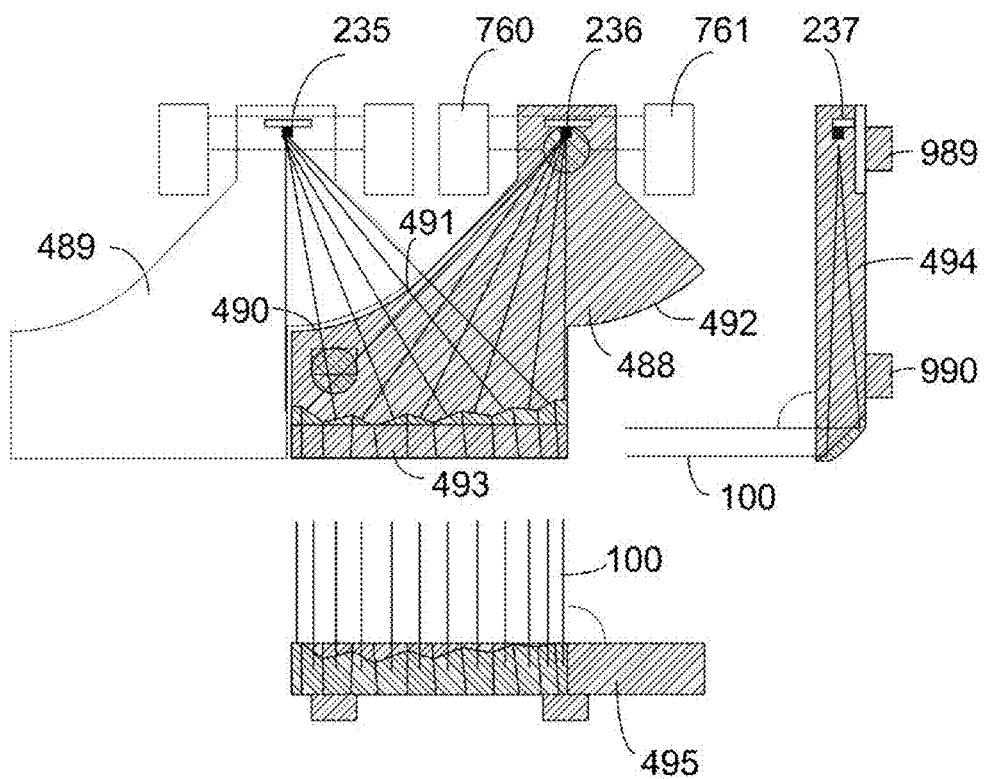
FIG. 49 is an illustration of optical components made of plastic material that is transparent to infrared light, in accordance with an embodiment of the present invention.

Reference is made to FIG. 49, which is an illustration of optical components made of plastic material that is transparent to infrared light, in accordance with an embodiment of the present invention. Shown in FIG. 49 is an optical component 488 that includes a forward-facing LED 236, and electronics to handle the LED signal. Optical component 488 is connected to electrical pads 760 and 761. Optical component 488 is used to transmit collimated light beams combined from two emitters; namely, emitter 235 and emitter 236. Emitter 235 is included in a neighboring optical component 489.

Light beams from emitter 235 exit optical component 489 through a tight-fitting surface 491, and enter optical component 488 through a tight-fitting surface 490. FIG. 49 shows non-parallel light beams from emitters 235 and 236 entering a lens 493. Components 488 and 489 are substantially identical, and fit together. A device manufacturer can thus use these components as building blocks to create a touch screen, by arranging a series of these building blocks in a row along each edge of the display. Typically, two adjacent display edges are lined with emitter components, and the other two edges are lined with receiver components. However, the emitter and receiver components, being of substantially identical shape, can be positioned together in the same row.

Lens 493 has several surfaces designed to mix and reflect the light from the two sources. In one embodiment of the present invention, lens 493 has micro-lenses that spread incoming light in the manner described hereinabove with reference to the feather and tubular patterns of configuration nos. 2 and 3.

An optical component 494 is similar to optical component 488, except that an LED 237 is side-facing instead of forward-facing. FIG. 49 shows collimated light beams 100 exiting optical component 494. Pins 989 and 990 guide optical component 494 on a printed circuit board.

Optical component 495 is optical component 488 as viewed from the front. FIG. 49 shows collimated light beams 100 exiting optical component 495.

Similar optical components (not shown) are also provided for receiving light beams that traverse the screen surface. For these components, the emitters are replaced by receivers, and the electrical components handle the receiver signals. Such optical components receive parallel light beams that enter a lens, and direct the beams onto two different receivers.

Figure 50:
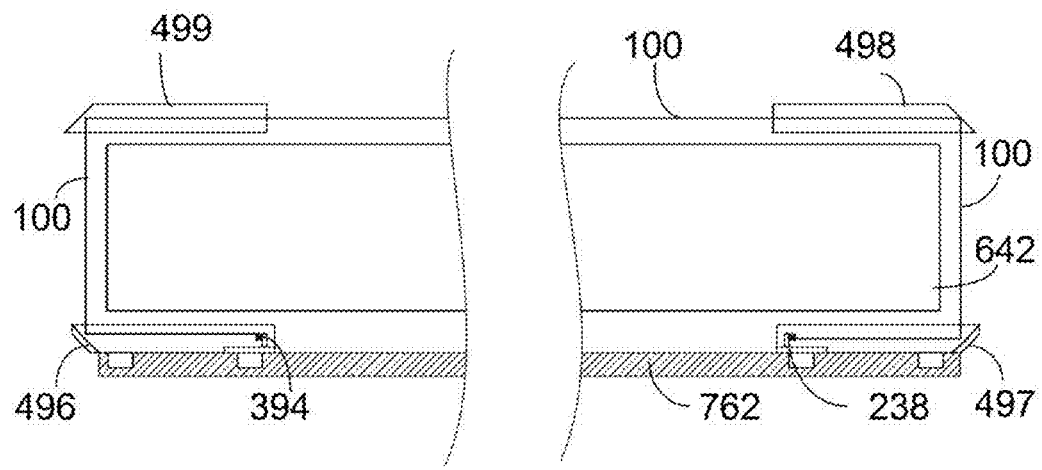
FIG. 50 is a simplified diagram of a side view of a touch screen with light guides, in accordance with an embodiment of the present invention.

Reference is made to FIG. 50, which is a simplified diagram of a side view of a touch screen with light guides, in accordance with an embodiment of the present invention. Shown in FIG. 50 are a display 642, an optical element 496, a photo diode 394 within optical element 496, an optical element 497, and an emitter 238 within optical element 497. Optical elements 496 and 497 are connected to a printed circuit board 762. Emitter 238 emits non-parallel light beams and, as described hereinabove with reference to FIG. 49, the non-parallel beams are converted into collimated beams, or substantially collimated beams, before exiting optical element 497. In an embodiment of the present invention, micro-lenses etched, or otherwise formed, on the upper surface of optical element 497 spread the light beams in the manner described hereinabove with reference to the tubular pattern of configuration no. 3. The beams 100 that exit optical element 497 are directed upwards and are reflected over display 642 by a light guide 498. The light beams 100 enter a light guide 499 on the opposite side of screen 642, and are reflected below display 642 into optical element 496. As described hereinabove, optical element 496 converts the parallel light beams into non-parallel light beams that converge on photo diode 394. In one embodiment of the present invention, micro-lenses etched, or otherwise formed, on the upper surface of optical element 496 spread the light beams in the manner described hereinabove with reference to the tubular pattern of configuration no. 3. In one embodiment of the present invention, the light guides 498 and 499 are constructed as a frame that surrounds display 642.

In the touch screen of FIG. 50, two types of light beam redirection occur. A first redirection redirects light beams differently, either by collimating beams emitted by an emitter, or by concentrating input light beams onto a photo diode sensor. In the systems of FIGS. 36-45 a lens near the emitter or receiver performs this redirection. A second redirection uniformly redirects incoming beams at a 90° angle, or folds incoming light beams into a narrow waist or focus, as described hereinabove with reference to configuration no. 4.

The first type of redirection requires that the emitter or receiver be positioned at a specific location relative to the focal point of the lens. As such, the positioning of the emitter and lens, or receiver and lens, is sensitive to variations in placement. Thus the assembly of the emitter or receiver together with its corresponding lens, has a low tolerance of error. The second type of redirection, involving reflection, is robust to variations in position of the reflector or the light guide. Thus assembly of this portion of the light guide has a high tolerance for error.

In accordance with an embodiment of the present invention, the feather or tubular pattern of micro-lenses is included within an optical element that contains the emitter or the receiver, such as optical elements 496 and 497 of FIG. 50, and optical elements 488 and 489 of FIG. 49. Manufacture of such optical elements supports accurate placement of the emitter or receiver relative to the embedded pattern of micro-lenses at a low cost of manufacturing. By contrast, if the emitter and the lens, or if the receiver and the lens, are separate elements, the manufacturing cost of aligning the emitter or the receiver with the patterned lenses on a printed circuit board is high.

The light guides that reflect light above the screen surface may be manufactured separately and assembled with other touch screen components. Thus in FIG. 50 light guides 498 and 499 are shown separate from optical elements 496 and 497.

Figure 51:
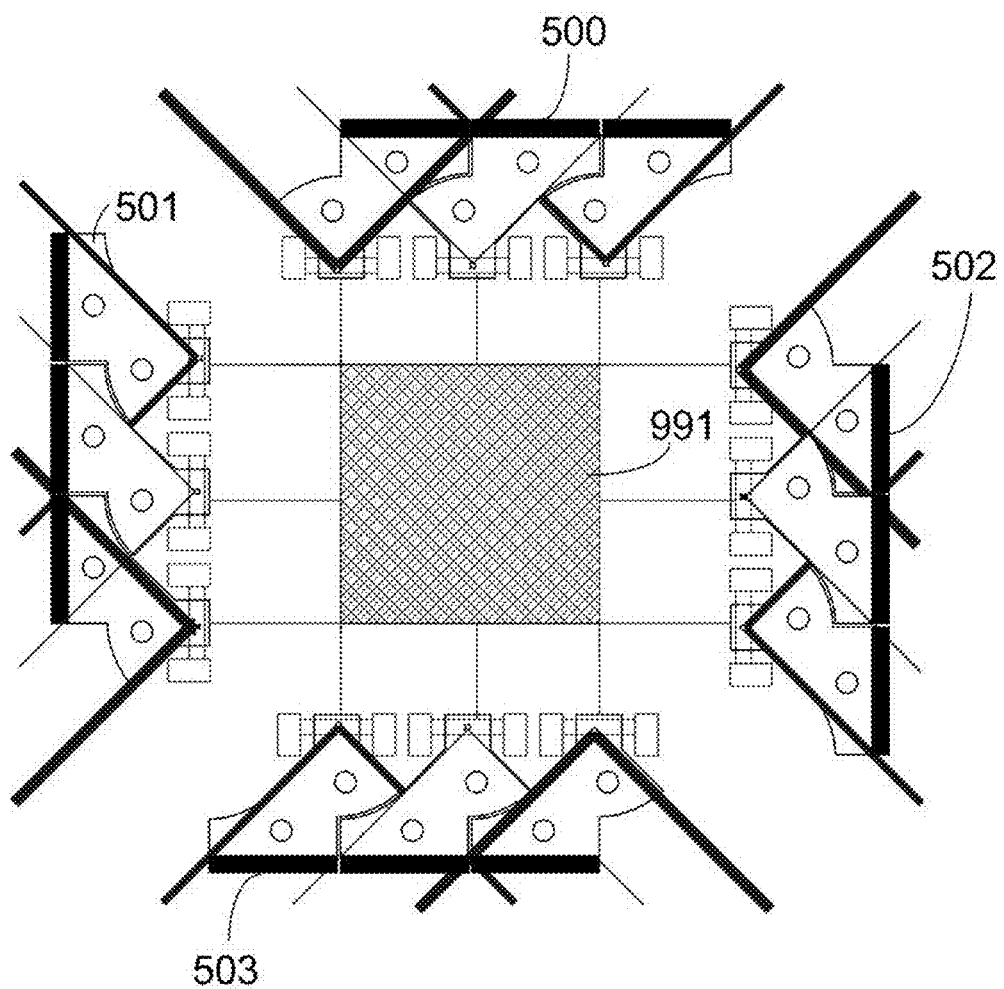
FIG. 51 is an illustration of a touch screen with a block of three optical components on each side, in accordance with an embodiment of the present invention.

Reference is made to FIG. 51, which is an illustration of a touch screen with a block of three optical components on each side, in accordance with an embodiment of the present invention. Blocks 500 and 501 are emitters, and blocks 502 and 503 are receivers. The blocks create an active area 991, where an x-y touch position of a stylus or finger may be calculated based on detected blocked light. Adding more optical components of the same type to each block serves to enlarge the active area that is created.

Figure 52:
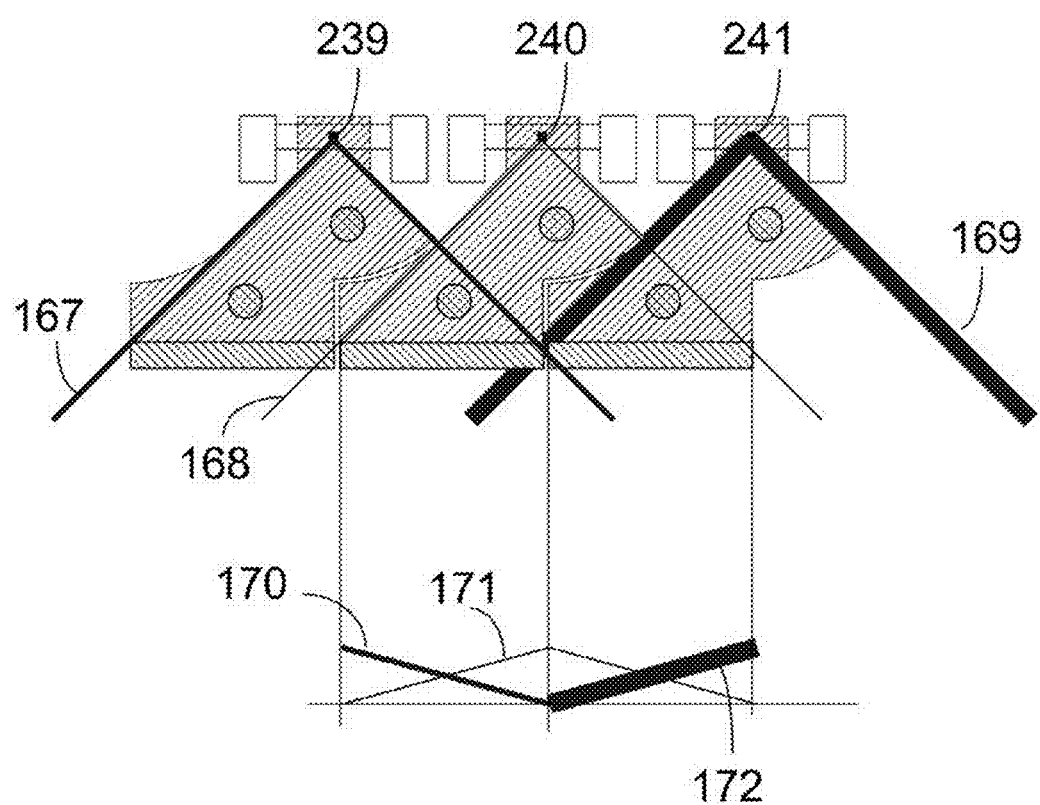
FIG. 52 is a magnified illustration of one of the emitter blocks of FIG. 51, in accordance with an embodiment of the present invention.

Reference is made to FIG. 52, which is a magnified illustration of one of the emitter blocks of FIG. 51, in accordance with an embodiment of the present invention. Shown in FIG. 52 are three emitters 239, 240 and 241, that emit respective wide beams 167, 168 and 169 from one edge of a screen, which are read as respective signals 170, 171 and 172. At the opposite edge of the screen, signals 170, 171 and 172 are each redirected onto at least two adjacent receivers by respective optical components. An accurate position of an object, such as a finger or stylus, touching the screen, is then determined based on values of blocked light at the receivers, as described below with respect to FIG. 81.

Touch Screen System Configuration No. 6

Configuration no. 6 uses a reduced number of components by coupling an emitter or a receiver to one end of a long thin light guide situated along an edge of the screen. Such a light guide is described in U.S. Pat. No. 7,333,095 entitled ILLUMINATION FOR OPTICAL TOUCH PANEL.

Figure 53:
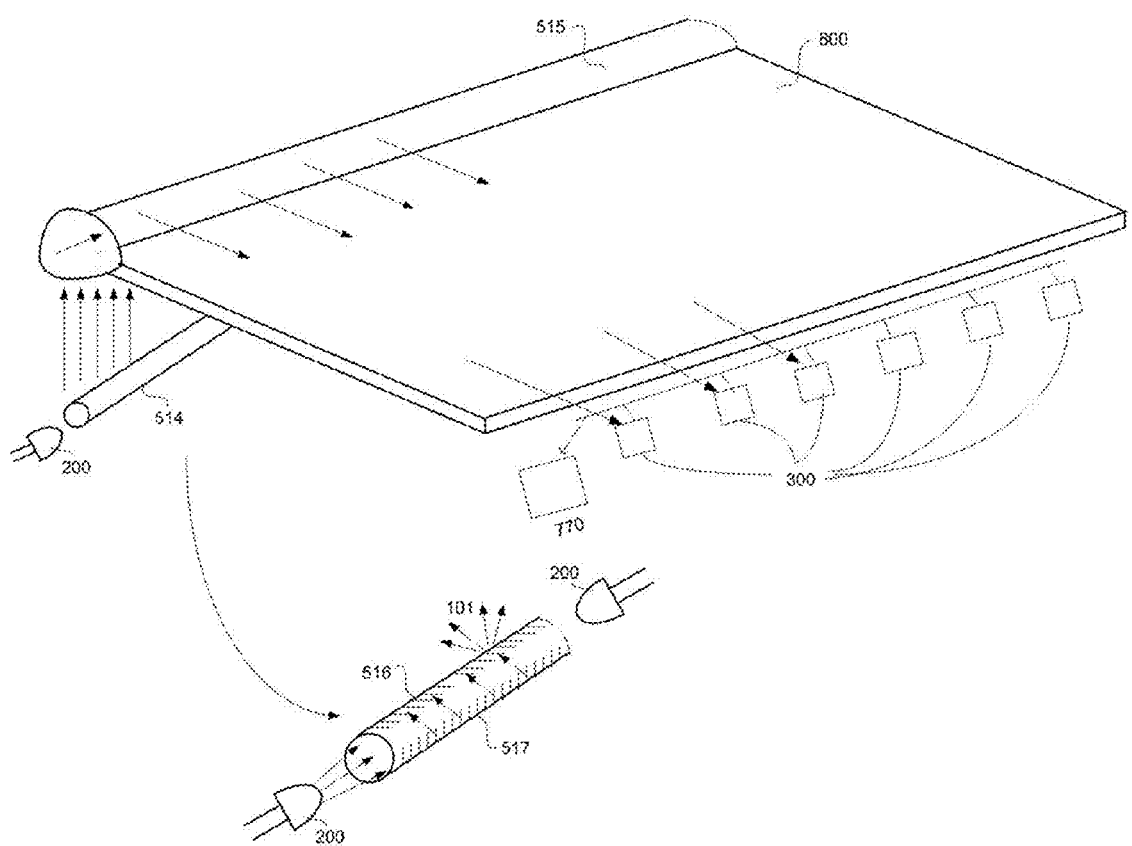
FIG. 53 is an illustration of a touch screen having a long thin light guide along a first edge of the screen, for directing light over the screen, and having an array of light receivers arranged along an opposite edge of the screen for detecting the directed light, and for communicating detected light values to a calculating unit, in accordance with an embodiment of the present invention.

Reference is made to FIG. 53, which is an illustration of a touch screen having a long thin light guide 514 along a first edge of the screen, for directing light over the screen, and having an array of light receivers 300 arranged along an opposite edge of the screen for detecting the directed light, and for communicating detected light values to a calculating unit 770, in accordance with an embodiment of the present invention. Light emitters 200 are coupled to both ends of light guide 514. Light guide 514 is positioned along one edge of a touch screen 800. Light is emitted into light guide 514 along a screen edge, and is re-directed across the screen surface by a reflector 515. A plurality of receivers 300 is situated along the opposite edge of touch screen 800, to enable multiple receivers to detect a touch, as described hereinabove with reference to configuration nos. 2 and 3.

Figure 54:
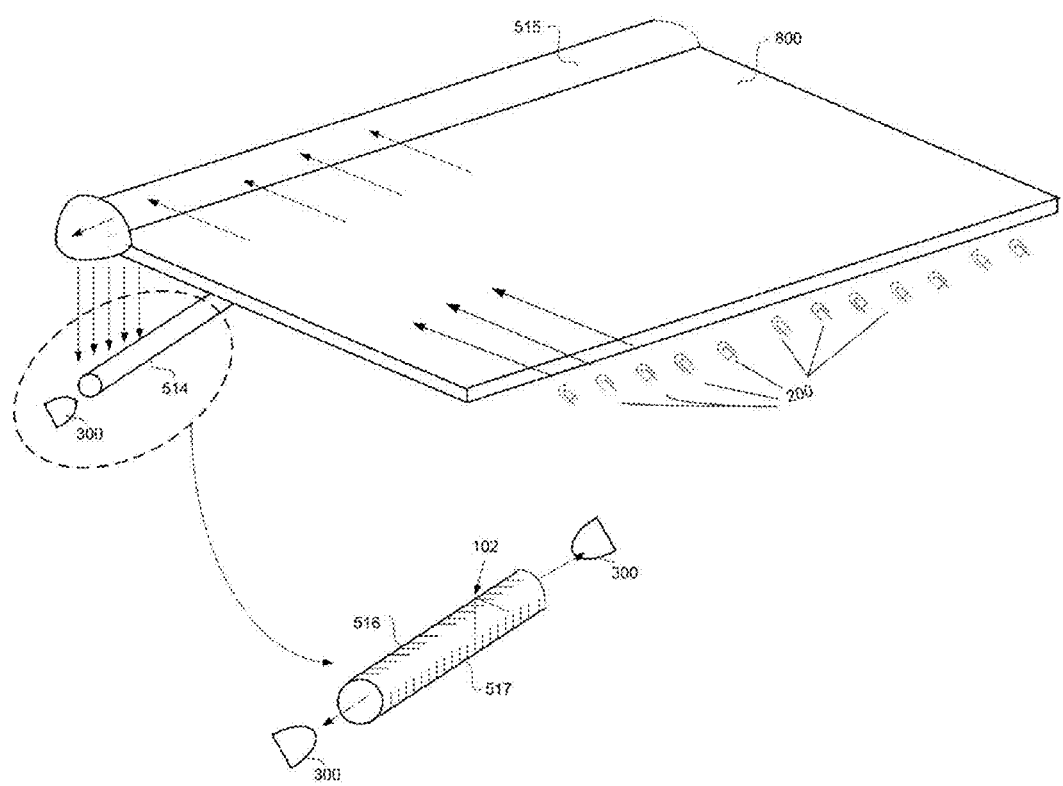
FIG. 54 is an illustration of a touch screen having an array of light emitters along a first edge of the screen for directing light beams over the screen, and having a long thin light guide for receiving the directed light beams and for further directing them to light receivers situated at both ends of the light guide, in accordance with an embodiment of the present invention.

Reference is made to FIG. 54, which is an illustration of a touch screen having an array of light emitters 200 along a first edge of the screen for directing light beams over the screen, and having a long thin light guide 514 for receiving the directed light beams and for further directing them to light receivers 300 situated at both ends of light guide 514, in accordance with an embodiment of the present invention. Detected light values at receiver 300 are communicated to a calculating unit (not shown). According to another embodiment of the present invention, only one light receiver 300 is coupled to one end of light guide 514. Light guide 514 is positioned along one edge of a touch screen 800. A plurality of emitters is situated along the opposite edge of the touch screen, to enable receiver(s) 300 to detect a touch based on serial activation of multiple emitters, as described hereinabove with reference to configuration nos. 2 and 3. Light emitted across the screen surface is re-directed by a reflector 515. Light is received into light guide 514 along the screen edge and is directed through the length of light guide 514 onto a receiver 300.

Figure 55:
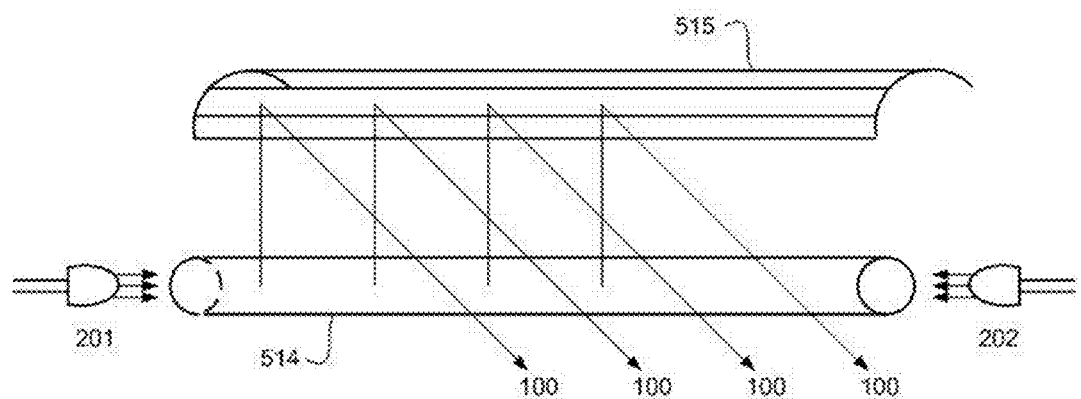
FIG. 55 is an illustration of two light emitters, each emitter coupled to each end of a long thin light guide, in accordance with an embodiment of the present invention.

Reference is made to FIG. 55, which is an illustration of two light emitters, 201 and 202, each emitter coupled to an end of a long thin light guide 514, in accordance with an embodiment of the present invention. Light guide 514 is positioned along one edge of a touch screen. Light 100 is emitted into light guide 514 along a screen edge, and is re-directed across the screen surface by a reflector 515. A plurality of receivers is situated along the opposite edge of the touch screen, to enable multiple receivers to detect a touch, as described hereinabove with reference to configuration nos. 2 and 3. Each emitter 201 and 202 is activated separately, and the receivers thus detect a touch based on blocked light from each of the two emitters. The amount of light 100 emitted at any given location along the length of the light guide decreases as a function of the distance between the location and the emitter. As such, different amounts of detected light from each emitter 201 and 202 are used to calculate the precise location of a touch, as described hereinabove with reference to configuration nos. 2 and 3.

Embodiments of the present invention improve upon the light guide of U.S. Pat. No. 7,333,095, by etching or otherwise forming micro patterns 516 on the outer surface of the light guide, in order to widely refract outgoing light beams 101 of FIG. 53, or incoming light beams 102 of FIG. 54, as described hereinabove with reference to configuration nos. 2 and 3. Micro patterns 516 are a uniform substantially parallel pattern of grooves along light guide 514, and are simpler to form than the fan pattern described hereinabove with reference to configuration no. 2. Light guide 514 also includes a light scatterer strip 517 inside of light guide 514. Micro patterns 516 and light scatterer strip 517 appear in FIGS. 53 and 54.

Touch Screen System Configuration No. 7

Configuration no. 7 enables detecting pressure on a touch screen, as applied during a touch operation. Detecting pressure enables discrimination between a light touch and a hard press, and is useful for user interfaces that associate separate actions to a touch and a press. E.g., a user may select a button or icon by touching it, and activate the function associated with the button or icon by pressing on it. Such a user interface is described in applicants' co-pending U.S. application Ser. No. 12/486,033, entitled USER INTERFACE FOR MOBILE COMPUTER UNIT.

In some embodiments of the present invention, a touch enabled device includes a base plane, such as a PCB, a light guide frame rigidly mounted on the base plane, and a resilient member attached to the base plane to suspend or "float" a non-rigidly mounted touch screen inside the light guide frame. A press on the touch screen deflects the floating touch screen along a z-axis, exposing more of the light guide frame. A light guide frame reflector, which directs light over the screen as described hereinabove, is formed so that the exposure allows more light to traverse the screen. In this way, when a hard press on the screen occurs, many of the receivers detect a sudden increase in detected light. Moreover, detection of a hard press may be conditioned upon a touch being detected at the same time, thus preventing false detection of a hard press due to a sudden increase in ambient light. When the downward pressure is released, the resilient member returns the screen to its original position within the light guide frame.

Figure 56:
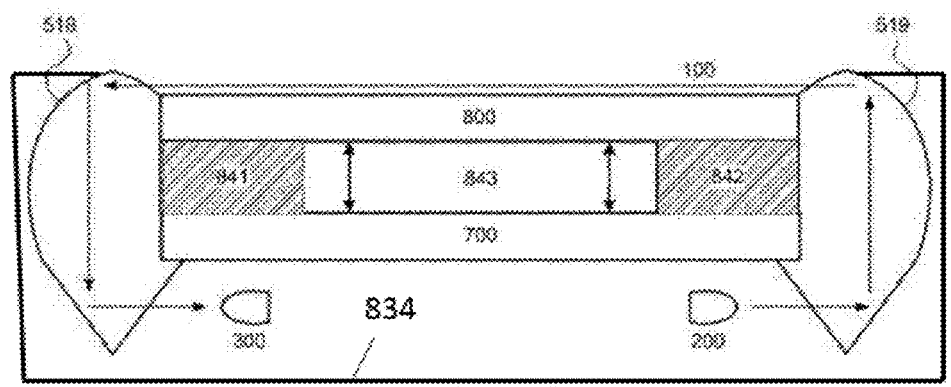
FIGS. 56-59 are illustrations of a touch screen that detects occurrence of a hard press, in accordance with an embodiment of the present invention.

Reference is made to FIGS. 56-59, which are illustrations of a touch screen 800 that detects occurrence of a hard press, in accordance with an embodiment of the present invention. FIG. 56 shows device housing 834 containing touch screen 800 in rest position, screen 800 being supported by resilient supporting members 841 and 842 that create a flex air gap 843, which are mounted on a printed circuit board 700. FIG. 56 shows two light guides, 518 and 519, one on either side of screen 800, for directing light 100 from an emitter 200 over screen 800 to a receiver 300. Only a small upper portion of each light guide 518 and 519 extends above screen 800. Receiver 300 communicates detected light intensities to a calculating unit 770.

Figure 57:
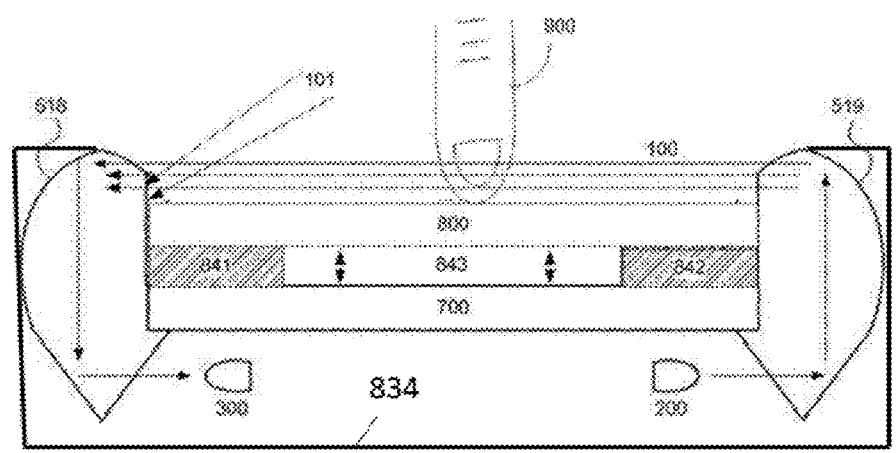

FIG. 57 shows a finger 900 pressing down on the screen contained in housing 834, causing members 841 and 842 to compress and to narrow flex air gap 843. As a result, a larger portion of light guides 518 and 519 are exposed above screen 800, thus allowing (a) more light 100 from emitter 200 to traverse screen 800 and be detected by receiver 300, and (b) more ambient light 101 to reach receiver 300. In various embodiments, either or both of these increases in detected light are used to indicate a hard press. In other embodiments, the amount of downward pressure applied is determined based on the amount of additional detected light, thus enabling discrimination between more hard and less hard touches.

Figure 58:
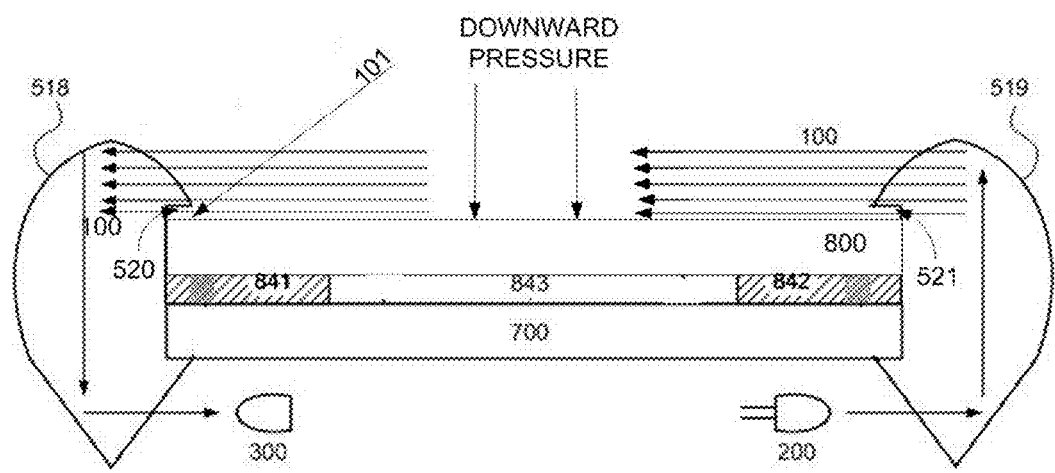
Figure 59:
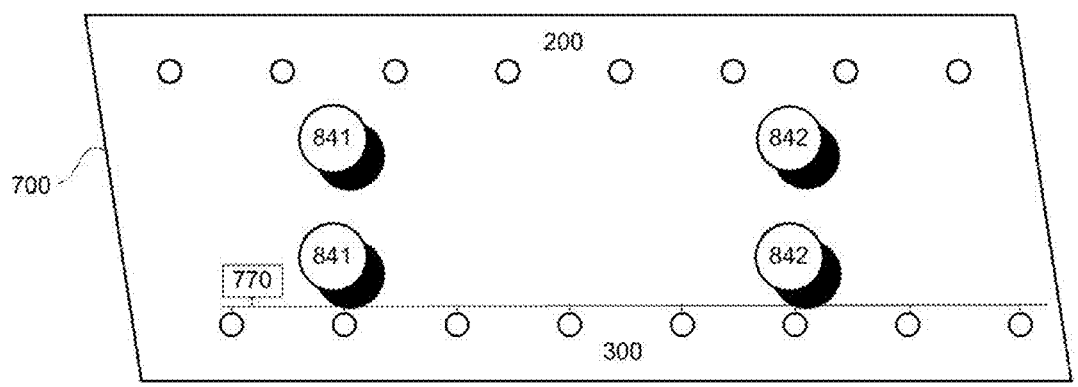

In some embodiments, the light guide frame includes protruding lips 520 and 521, shown in FIG. 58, that extend over the edges of screen 800, to counter balance the upward force of resilient members 841 and 842 when no downward pressure is applied to screen 800. Resilient members 841 and 842 may comprise inter alia a flexible mounting material, a torsion spring, an elastic polymer body, or a hydraulic suspension system. FIG. 59 shows emitters 200, receivers 300 coupled with calculating unit 770, and resilient members 841 and 842 arranged on a single PCB 700.

In other embodiments, the touch screen is not displaceable relative to the frame. However, the screen flexes or bends somewhat in response to a hard press. The bending of the screen causes a sudden increase in detected light in many of the receivers, indicating a hard press on the screen. As indicated hereinabove, detection of a hard press may be conditioned upon a touch also being detected at the same time, thus preventing false detection of a hard press in response to trauma to the device.

Figure 60:
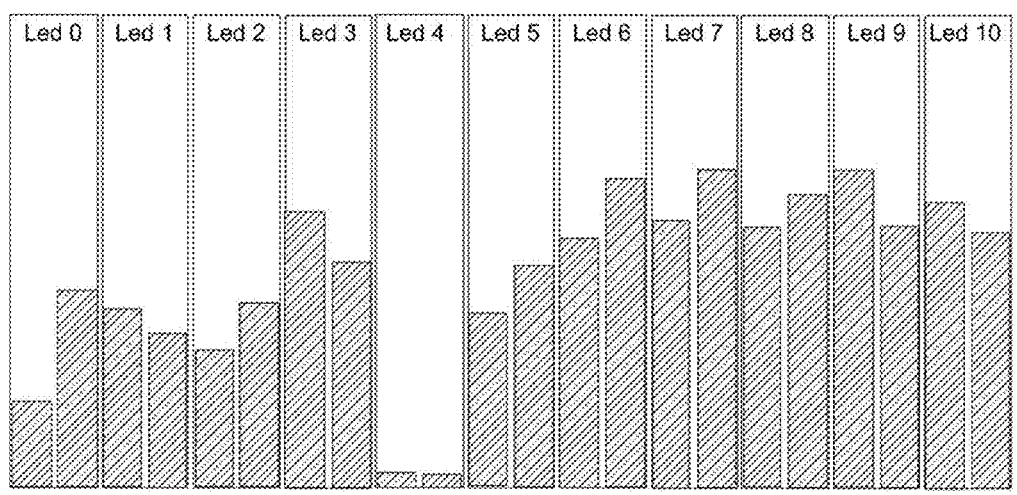
FIGS. 60 and 61 are bar charts showing increase in light detected, when pressure is applied to a rigidly mounted 7-inch LCD screen, in accordance with an embodiment of the present invention.
Figure 61:
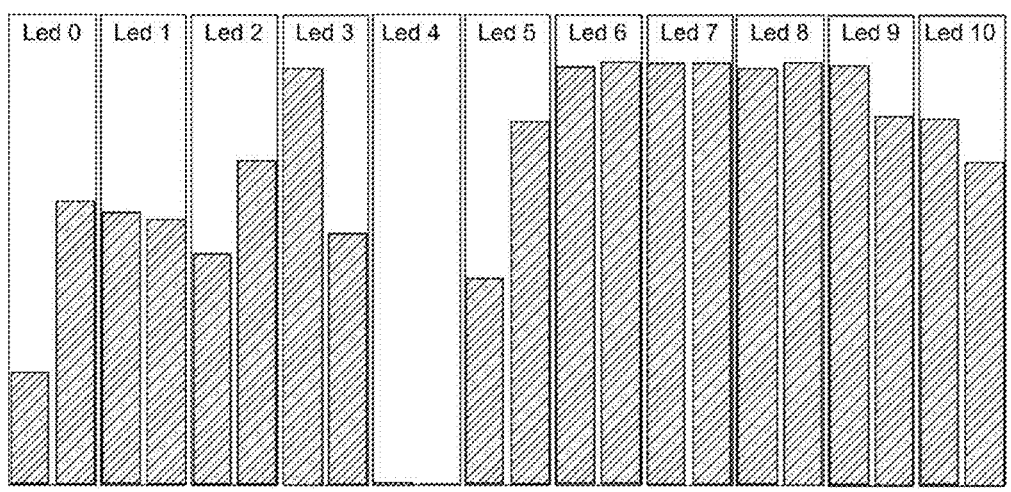

Reference is made to FIGS. 60 and 61, which are bar charts showing increase in light detected, when pressure is applied to a rigidly mounted 7-inch LCD screen, in accordance with an embodiment of the present invention. The bar charts show the amount of light detected from each emitter along one edge of the screen when a soft touch occurs (FIG. 60), and when a hard touch occurs (FIG. 61). The light emitters and light receivers are shift-aligned, so that light from each emitter is detected by two receivers. As such, two bars are shown for each emitter, indicating the light detected by each of the two receivers. Both bars indicate that a touch is detected at receivers opposite LED 4, where no light is detected. The bar charts show that more light is detected from neighboring emitters in the case of a hard touch, than in the case of a soft touch.

Touch Screen System Configuration No. 8

Configuration no. 8 provides a touch screen with at least one camera positioned under the screen surface, to capture an image of the screen surface and of a pointer, or a plurality of pointers, touching the screen surface. In some embodiments of the present invention, the screen pixels include light sensors, each of which generates a pixel of an image of the underside of the screen glass, the image being referred to herein as the "screen glass image".

As described hereinbelow, methods according to embodiments of the present invention determine precise touch coordinates using spatial and temporal filters. Application of these methods to configuration no. 8 yields sub-pixel precision for touch coordinates.

Pixels in the screen glass image at the center of a touch location are generally completely blocked; i.e., the level of light detected at each such pixel is below a designated threshold, indicating that the pixel is occluded by a touch object. Pixels in the screen glass image along the edges of a touch location are generally only partially blocked; i.e., the level of light detected at each such pixel is above the designated threshold, indicating that the pixel is only partially occluded by the touch object.

A calculating unit that receives the screen glass image data assigns a relative weight to each pixel coordinate, based on a touch detection intensity associated with that pixel, as indicated by the pixel's value. The calculating unit further interpolates the pixel coordinates, based on their associated weights, to determine a touch coordinate. In some embodiments, the calculating unit calculates a touch area having a perimeter, wherein the edges of the touch area are calculated on a sub-pixel level based on the above interpolations. The temporal filters described hereinbelow are applied inter alia when a series of connected touches are concatenated into a glide movement over a time duration.

Figure 62:
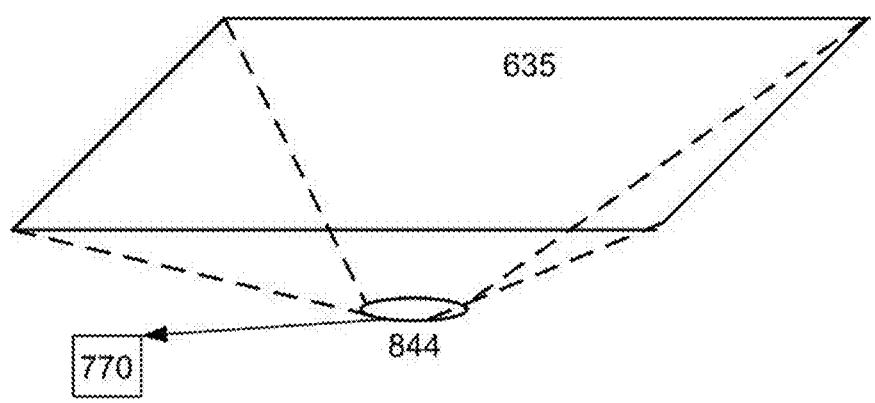
FIG. 62 is a simplified diagram of an image sensor positioned beneath a screen glass display, to capture an image of the underside of the screen glass and touches made thereon, in accordance with an embodiment of the present invention.

Reference is made to FIG. 62, which is a simplified diagram of an image sensor 844 positioned beneath a screen glass display 635, to capture an image of the underside of the screen glass and of touches made thereon, in accordance with an embodiment of the present invention. The captured image data is transmitted to a calculating unit 770 for analysis.

Figure 63:
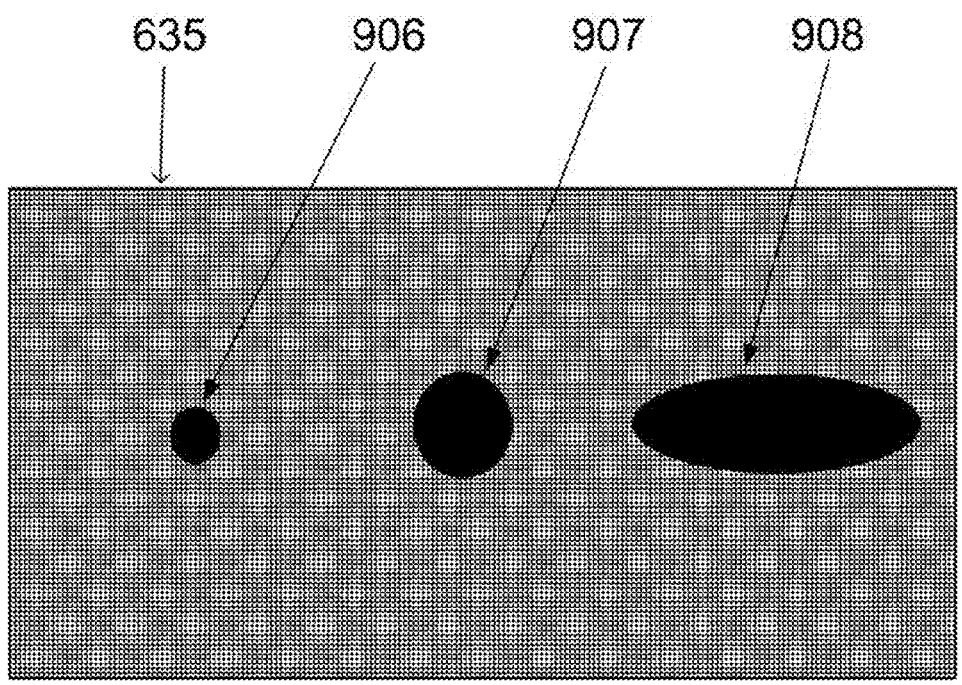
FIG. 63, which is a simplified diagram of a display divided into pixels, and three touch detections, in accordance with an embodiment of the present invention.

Reference is made to FIG. 63, which is a simplified diagram of a display 635 divided into pixels, and three touch detections 906-908, in accordance with an embodiment of the present invention. It is noted that edges of each of the touch detections cover respective portions of pixels. The weighted pixel coordinate interpolations described hereinabove are used to identify touch coordinates, such as coordinates for touches 906 and 907, and the contours of touch areas, such as the contours of areas 907 and 908. In some embodiments of the present invention, the interpolations include fully occluded pixels. In other embodiments of the present invention, the interpolations include only partially occluded pixels.

Touch Screen System Configuration No. 9

Configuration no. 9 provides a touch screen with means to determine a three-dimensional position of a pointer relative to the touch screen. In this configuration, a low cost touch screen uses cameras to determine depth information. One or more cameras are mounted on a side of the touch screen, so as to capture a mirrored image of an active touch area, and the mirrored image is processed to determine a height of the pointer above the touch screen. The present invention may be embodied on an arbitrary size touch screen having a glossy surface.

Figure 64:
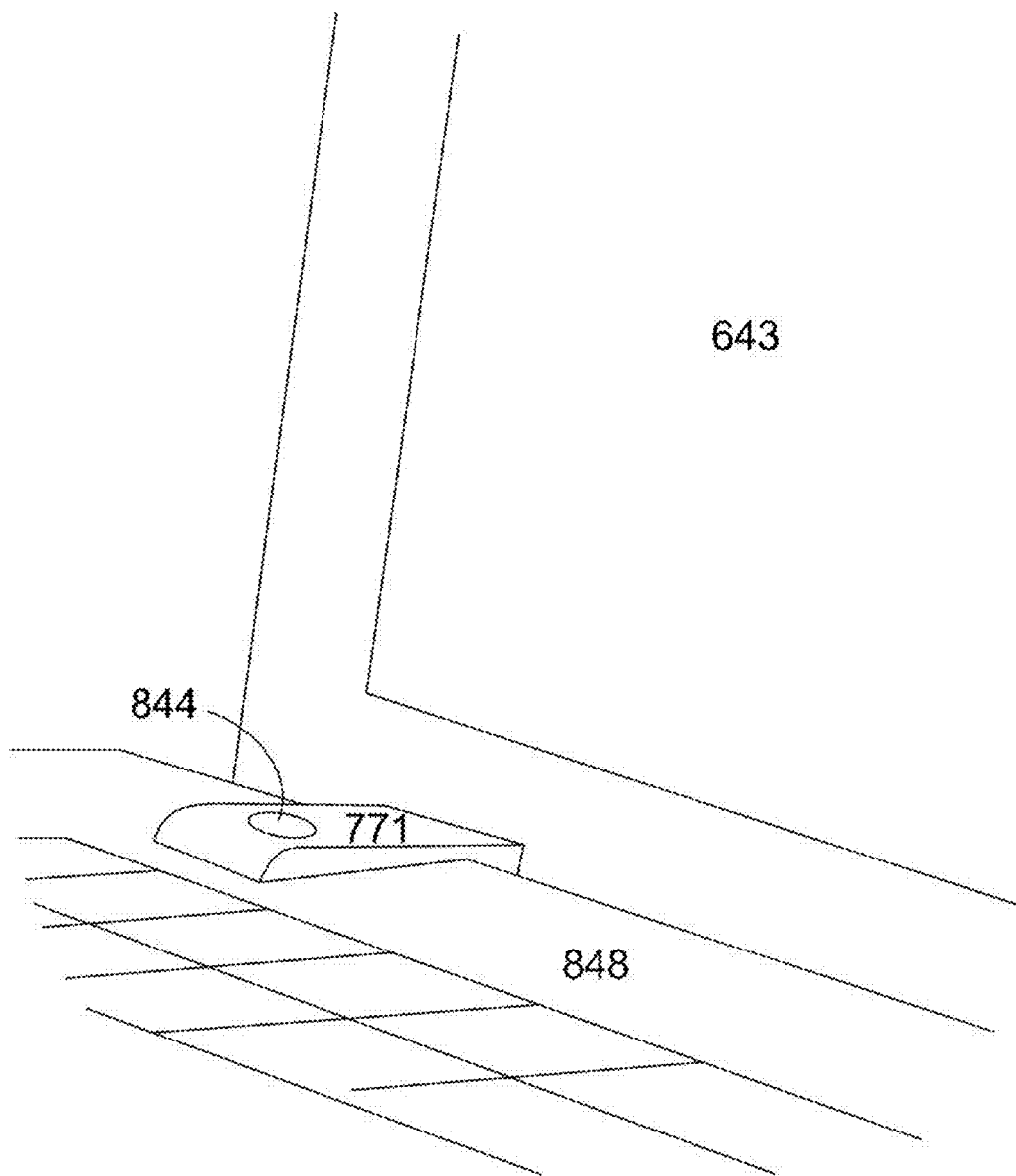
FIG. 64 is a simplified diagram of a camera sensor positioned on a hinge of a laptop computer and pointing at a screen, in accordance with an embodiment of the present invention.

Reference is made to FIG. 64, which is a simplified diagram of a camera sensor 844 positioned on a hinge 771 of a laptop computer 848, and pointing at a screen 643, in accordance with an embodiment of the present invention.

Figure 65:
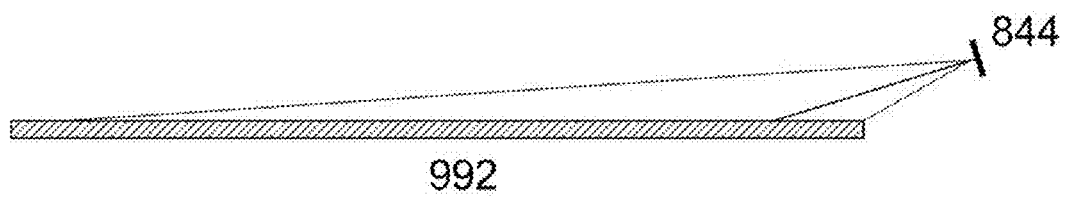
FIG. 65 is a simplified side view diagram showing a camera viewing a touch area, in accordance with an embodiment of the present invention.

Reference is made to FIG. 65, which is a simplified side view diagram showing a camera 844 viewing a touch area 992, in accordance with an embodiment of the present invention.

Figure 66:
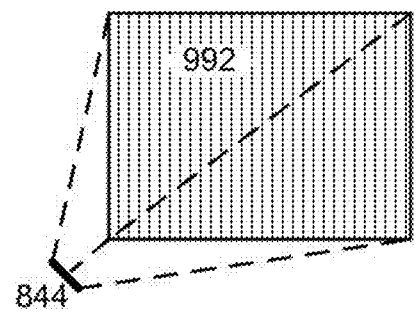
FIG. 66 is a simplified top view diagram showing a camera viewing a touch area, in accordance with an embodiment of the present invention.

Reference is made to FIG. 66, which is a simplified top view diagram showing a camera 844 viewing a touch area 992, in accordance with an embodiment of the present invention. The broken lines in FIG. 66 indicate the volume of space captured by camera 844.

Figure 67:
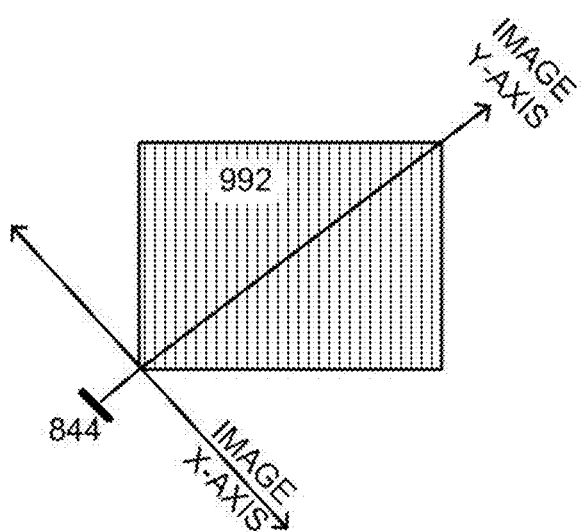
FIG. 67 is a simplified diagram of a camera viewing a touch area, and two image axes, an image x-axis and an image y-axis, for locating a touch pointer based on an image captured by the camera, in accordance with an embodiment of the present invention.
Figure 68:
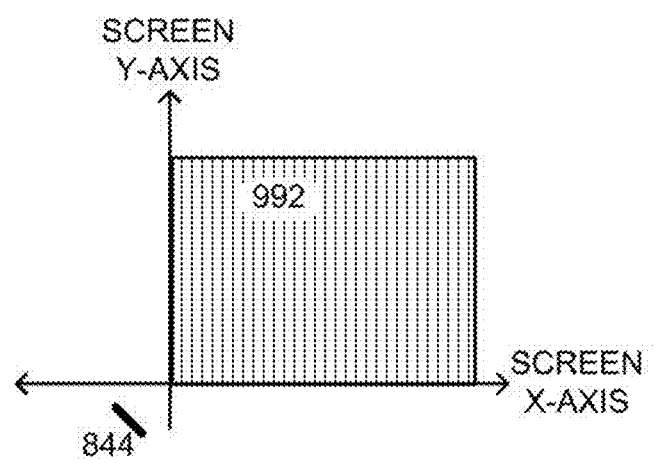
FIG. 68 is a simplified diagram of a camera viewing a touch area, and two screen axes, a screen x-axis and a screen y-axis, for locating a touch pointed based on an image captured by the camera, in accordance with an embodiment of the present invention.

Reference is made to FIG. 67, which is a simplified diagram of a camera 844 viewing a touch area 992, and two image axes, an image x-axis and an image y-axis, for locating a touch pointer based on an image captured by camera 844, in accordance with an embodiment of the present invention. Reference is also made to FIG. 68, which is a simplified diagram of a camera 844 viewing a touch area 992, and two screen axes, a screen x-axis and a screen y-axis, for locating a touch pointer based on an image captured by camera 844, in accordance with an embodiment of the present invention. The screen surface along the line of vision captured by camera 844 is oriented along the image y-axis. The image x-axis is perpendicular to the image y-axis along the plane of the touch screen surface. In order to distinguish these axes from the screen axes that run parallel to the screen edges, the former axes are referred to herein as "image axes", and the latter axes are referred to herein as "screen axes". Touch coordinates relative to the image axes may be transformed to screen axis coordinates.

Figure 73:
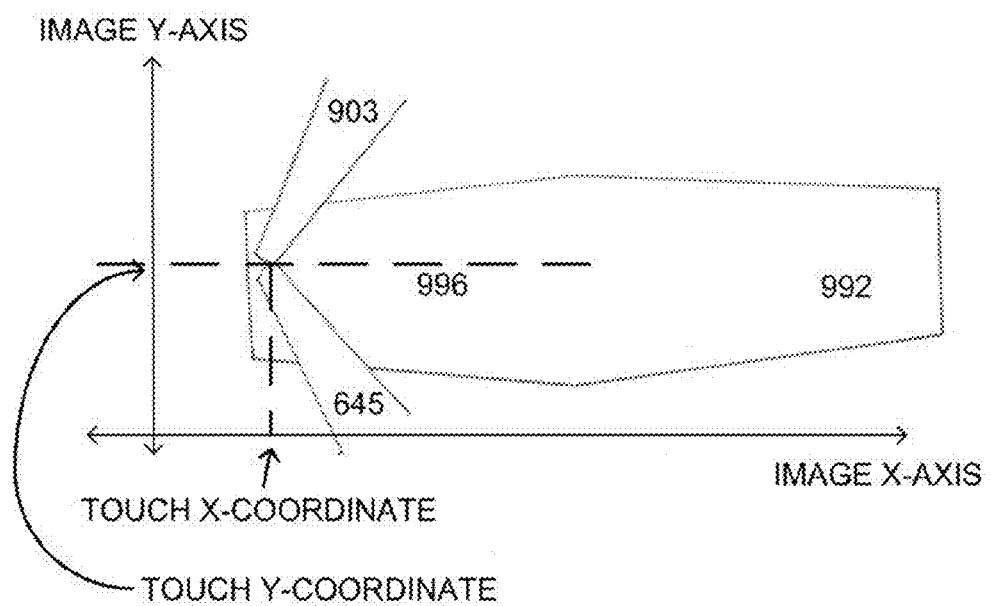
FIG. 73 is a simplified diagram of a portion of a touch area showing a stylus and a mirror image of the stylus, which are tangent to one another, in accordance with an embodiment of the present invention.
Figure 74:
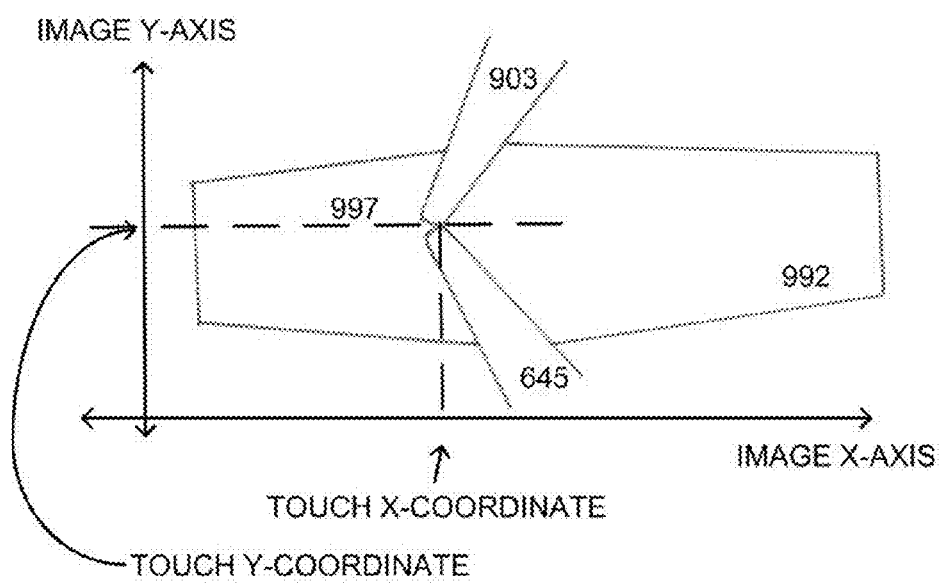
FIG. 74 is a simplified diagram showing a stylus and a mirror image of the stylus, moved closer to the center of a touch area vis-à-vis FIG. 73, in accordance with an embodiment of the present invention.
Figure 75:
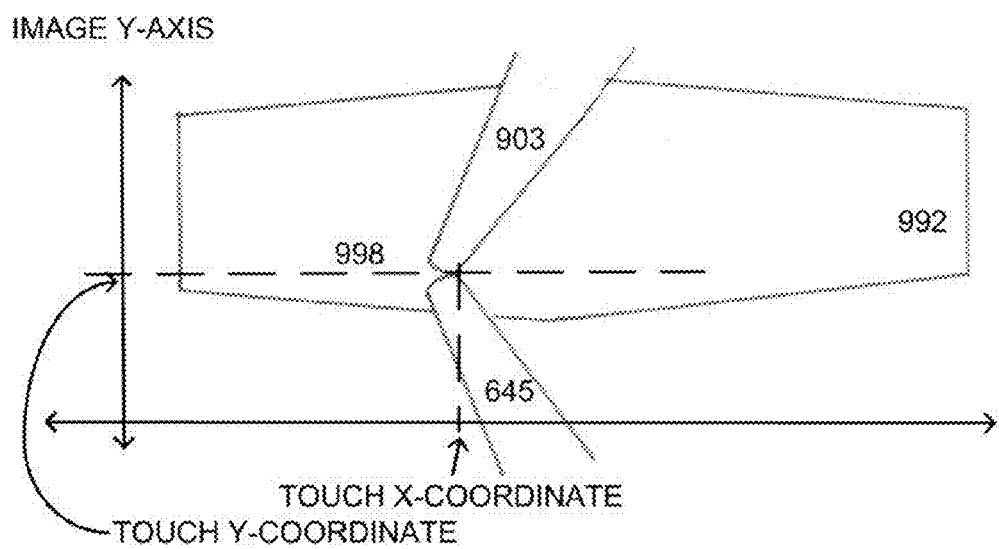
FIG. 75 is a simplified diagram showing a stylus and a mirror image of the stylus, moved closer to the bottom of a touch area vis-à-vis FIG. 73, in accordance with an embodiment of the present invention.
Figure 76:
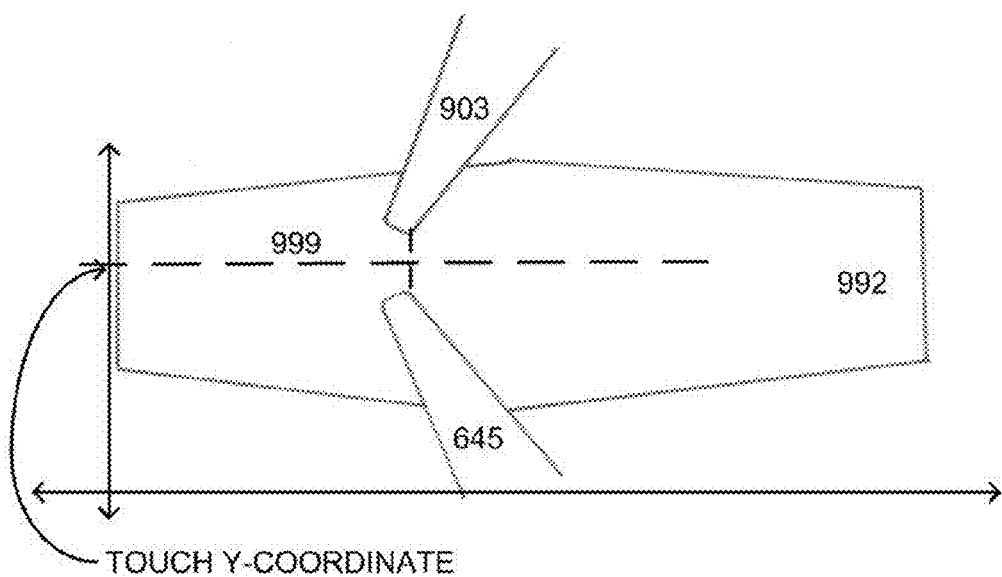
FIG. 76 is a simplified diagram showing a stylus and a mirror image of the stylus, separated apart from one another, in accordance with an embodiment of the present invention.

The image captured by camera 844 generally includes both a pointer, and a reflection of the pointer on the surface of the touch screen. Based on the locations of the pointer and its reflection within the captured image, the pointer position may be determined when the pointer is positioned on the screen, or even above the screen. When the pointer touches the screen, the pointer and its reflection in the captured image are tangent to one another, as illustrated in FIGS. 73-75. When the pointer is above the screen, the pointer and its reflection in the captured image are separated apart from one another, as illustrated in FIG. 76.

It will be appreciated by those skilled in the art that the captured image may be analyzed relative to an x-axis along the bottom edge of the image, and a y-axis in the screen surface along the camera's line of vision. When the pointer is touching the screen, the pointer's x- and y-coordinates may be determined by projecting the position of a pointer in the captured image along the x- and y-axes.

When the pointer is positioned above the screen, not touching the screen, the pointer's x-coordinate may be determined as above; namely, by projecting the position of the pointer in the captured image along the x-axis. To determine, the pointer's y-coordinate an appropriate location is selected along the line joining the positions of the pointer and the reflected pointer in the captured image, and the position of the location is projected along the y-axis. In some instances, the appropriate location is the mid-point of the line joining the positions of the pointer and the reflected pointer. In other instances, the appropriate location is based upon the azimuthal angle at which the camera is orientated relative to the screen surface.

It will be appreciated by those skilled in the art that the height of the pointer above the screen surface may be determined based upon the distance between the pointer and the pointer's reflection in the captured image.

Figure 69:
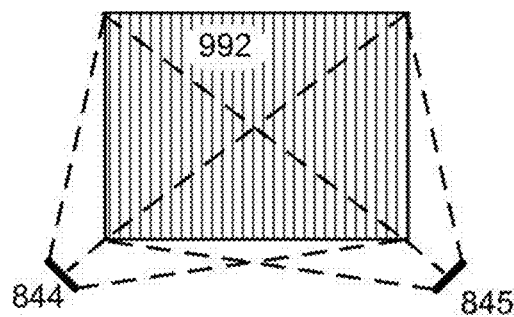
FIGS. 69 and 70 are simplified diagrams of two cameras, each capturing a touch area from different angles, in accordance with an embodiment of the present invention.
Figure 70:
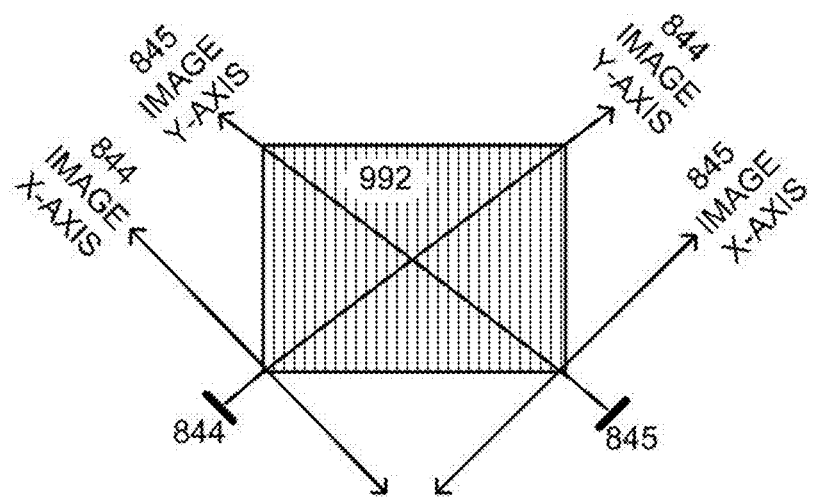
Figure 71:
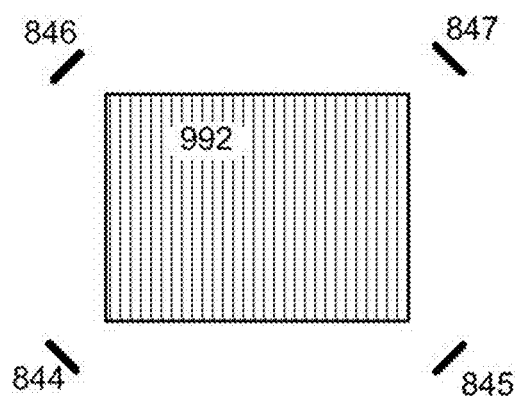
FIG. 71 is a simplified diagram of four cameras, each capturing a touch area from different angles, in accordance with an embodiment of the present invention.

Use of multiple cameras provides additional information, such as mufti-touch information and stylus information that may be obscured by a hand. Reference is made to FIGS. 69 and 70, which are simplified diagrams of two cameras, 844 and 845, each capturing a touch area 992 from different angles, in accordance with an embodiment of the present invention. Each camera has a respective set of image axes, as shown in FIG. 70. Reference is made to FIG. 71, which is a simplified diagram of four cameras, 844-847, each capturing a touch area 992 from different angles, in accordance with an embodiment of the present invention.

Figure 72:
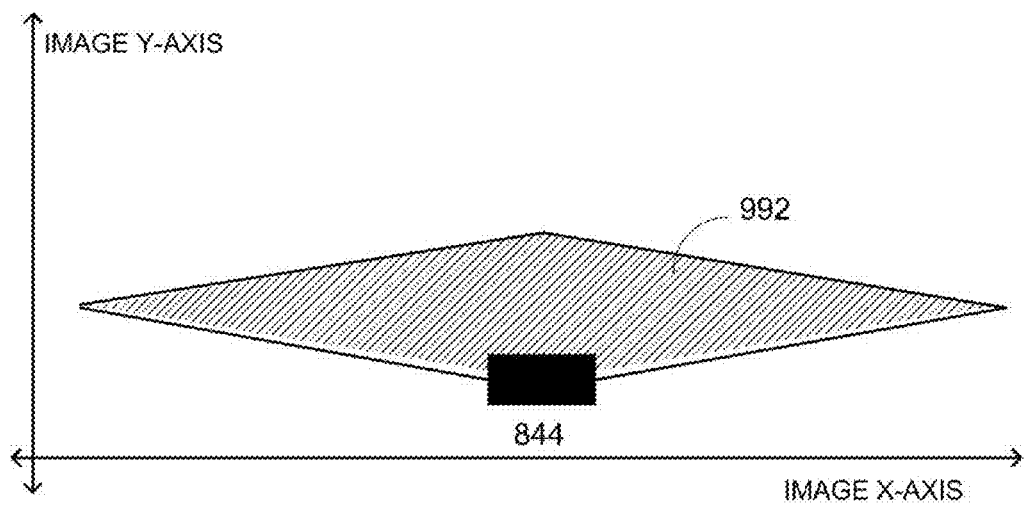
FIG. 72 is a simplified diagram, from a camera viewpoint, of a camera viewing a complete touch area, in accordance with an embodiment of the present invention.

Reference is made to FIG. 72, which is a simplified diagram, from a camera viewpoint, of a camera 844 viewing a complete touch area 992, in accordance with an embodiment of the present invention. Shown in FIG. 72 are the image x- and y-axes, for images captured by camera 844.

Reference is made to FIG. 73, which is a simplified diagram of a portion of a touch area 992 showing a stylus 903 and a mirror image 645 of the stylus, which are tangent to one another, in accordance with an embodiment of the present invention. The image x- and y-coordinates of stylus 903 are determined by projecting the position of stylus 903 onto the image x- and y-axes. To assist with the projection, a centerline 996 between stylus 903 and its mirror image 645 is used.

Reference is made to FIG. 74, which is a simplified diagram showing a stylus 903 and a mirror image 645 of the stylus, moved closer to the center of a touch area 992 vis-à-vis FIG. 73, in accordance with an embodiment of the present invention. Again, the image x- and y-coordinates of stylus 903 are determined by projecting the position of stylus 903 onto the image x- and y-axes. To assist with the projection, a centerline 997 between stylus 903 and its mirror image 645 is used.

Reference is made to FIG. 75, which is a simplified diagram showing a stylus 903 and a mirror image 645 of the stylus, moved closer to the bottom of a touch area 992 vis-à-vis FIG. 73, in accordance with an embodiment of the present invention. Again, the image x- and y-coordinates of stylus 903 are determined by projecting the position of stylus 903 onto the image x- and y-axes. To assist with the projection, a centerline 998 between stylus 903 and its mirror image 645 is used.

Reference is made to FIG. 76, which is a simplified diagram showing a stylus 903 and a mirror image 645 of the stylus, separated apart from one another, in accordance with an embodiment of the present invention. The distance between stylus 903 and mirror image 645 may be used to determine the height of stylus 903 above touch area 992. A centerline 999 between stylus 903 and mirror image 645 is used as an assist to determine the image y-coordinate of stylus 903.

In accordance with an embodiment of the present invention, stylus 903 in FIGS. 73-76 is a blunt-edged stylus. A blunt-edged stylus is of advantage, as its relatively large head is easy to detect by image processing. A blunt-edged stylus is also of advantage in configurations nos. 2-6, as its relatively large head blocks more light than does a sharp-pointed stylus.

Figure 77:
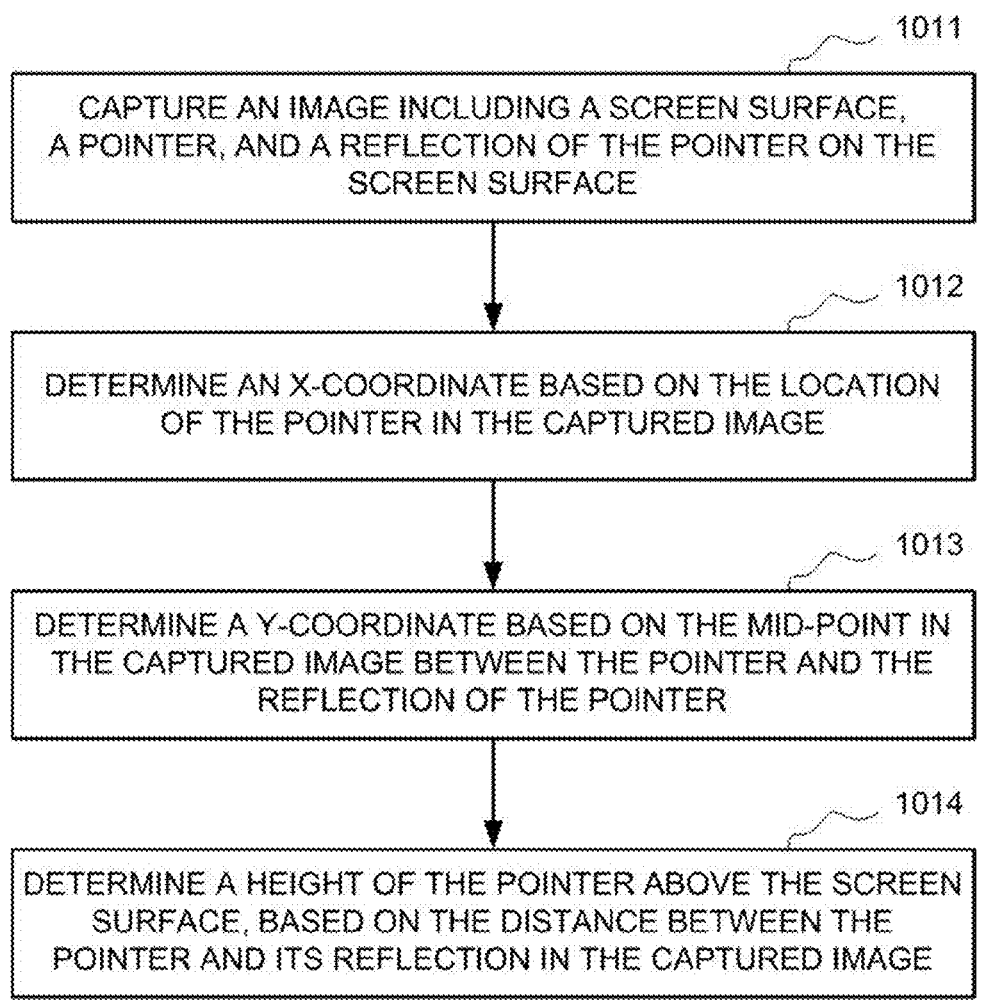
FIG. 77 is a simplified flowchart of a method for determining a three-dimensional pointed location, in accordance with an embodiment of the present invention.

Reference is made to FIG. 77, which is a simplified flowchart of a method for determining a three-dimensional pointer location, in accordance with an embodiment of the present invention. At operation 1011, an image of a screen surface is captured. The image includes a pointer, and a reflection of the pointer on the screen surface, as described hereinabove with reference to FIGS. 73-76. At operation 1012, the pointer location along a first screen axis is determined, corresponding to the location of the pointer in the image along that axis, as illustrated by the x-coordinates shown in FIGS. 73-75 that correspond to the locations of the stylus in the respective images. At operation 1013 the pointer location along a second screen axis is determined, corresponding to a line running through the mid-point between the locations of the pointer and its reflection, as illustrated by centerlines 996-999 in FIGS. 73-76. At operation 1014, the height of the pointer above the screen is determined, based on the distance between the pointer and its reflection in the captured image.

Figure 78:
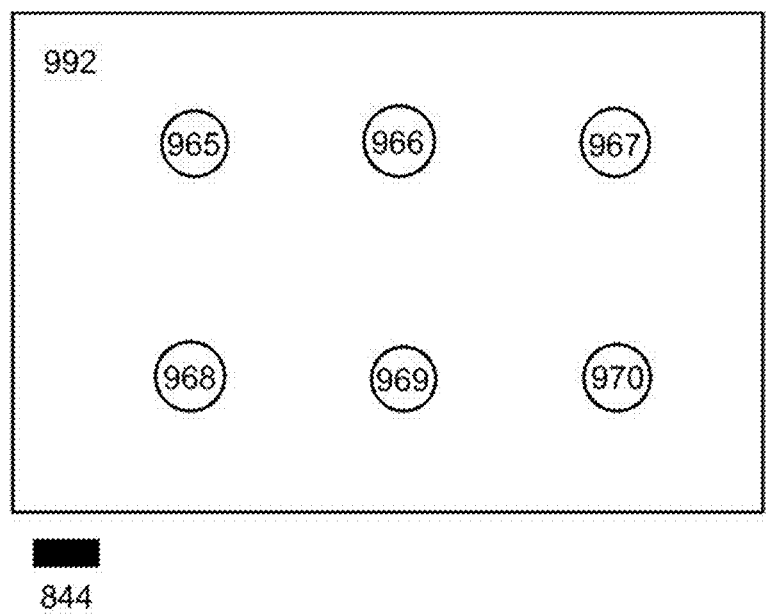
FIG. 78 is a simplified diagram of a touch area that displays six touch icons, used for determining a camera orientation, in accordance with an embodiment of the present invention.

When the camera position is known or fixed, relative to the screen, as is the case inter alia when the screen is manufactured with the camera rigidly mounted, the image-to-screen transformation, from image coordinates to screen coordinates, may be determined. When the position of the camera relative to the screen is unknown, such as is the case inter alia if the camera is mounted manually by a user, then in order to determine the image-to-screen transformation a procedure to determine camera orientation is required. One such procedure is to display a series of touch icons on the screen at known screen coordinates. Reference is made to FIG. 78, which is a simplified diagram of a touch area 992 that displays six touch icons 965-970, used for determining a camera orientation, in accordance with an embodiment of the present invention. Camera 844 is aimed at the touch area to capture touch events. A user is instructed to touch the various icons. In some embodiments, each icon is displayed individually one at a time. When the user touches an icon, the image coordinates of the touch are determined, and matched with the known screen coordinates of the icon. Successive matched pairs of image coordinates and screen coordinates are used to determine the image-to-screen transformation. In an embodiment of the present invention, the event that a user touches an icon is recognized from a captured image when the pointer is tangent to its reflection, as described hereinabove.

Operation of Configurations Nos. 2-8

The following discussion relates to methods of operation for arrangements of the optical elements shown in configurations nos. 2-8, around a touch screen, to achieve accurate touch detection. These methods are of advantage for pen and stylus support, which have fine touch points. In particular, these methods are not required for single touch finger support. As such, for systems designed with only finger support, these methods may be applied without micro-lenses being etched onto primary lenses. In some cases, such as multi-touch detection, these methods apply to finger touch as well.

Figure 79:
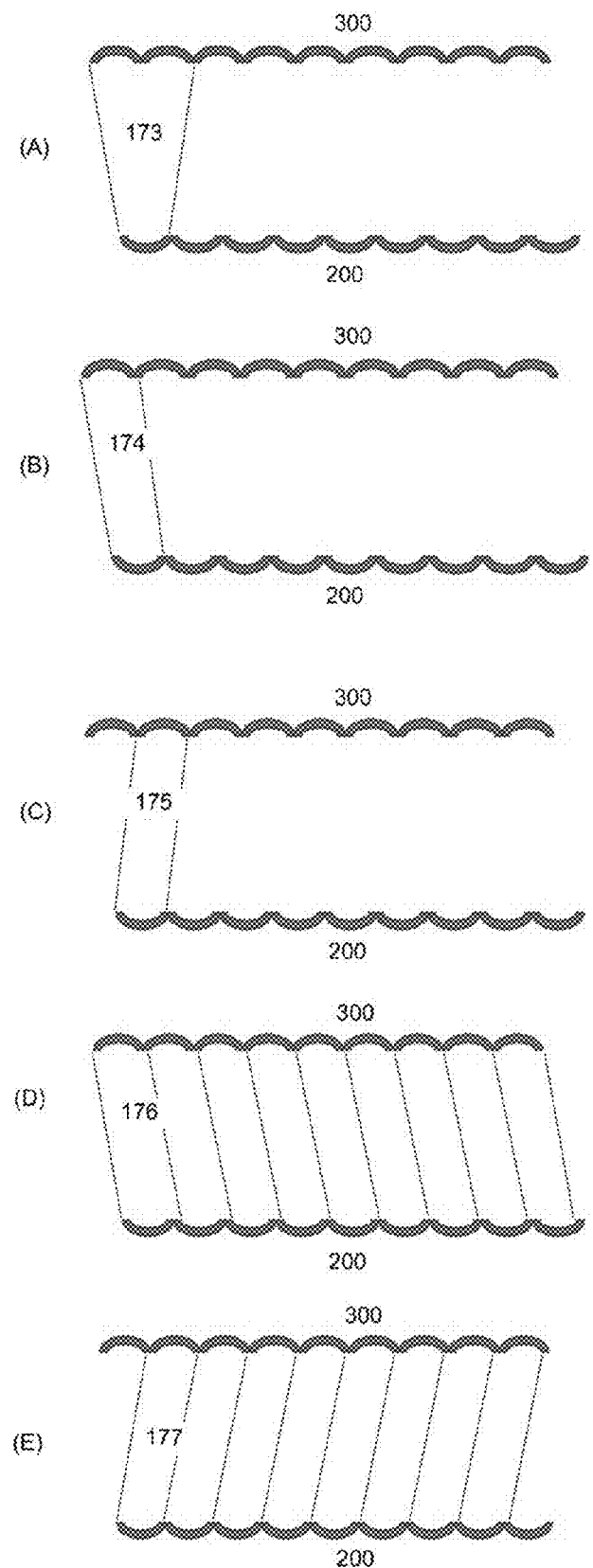
FIGS. 79 and 80 are illustrations of opposing rows of emitter and receiver lenses in a touch screen system, in accordance with an embodiment of the present invention.
Figure 80:
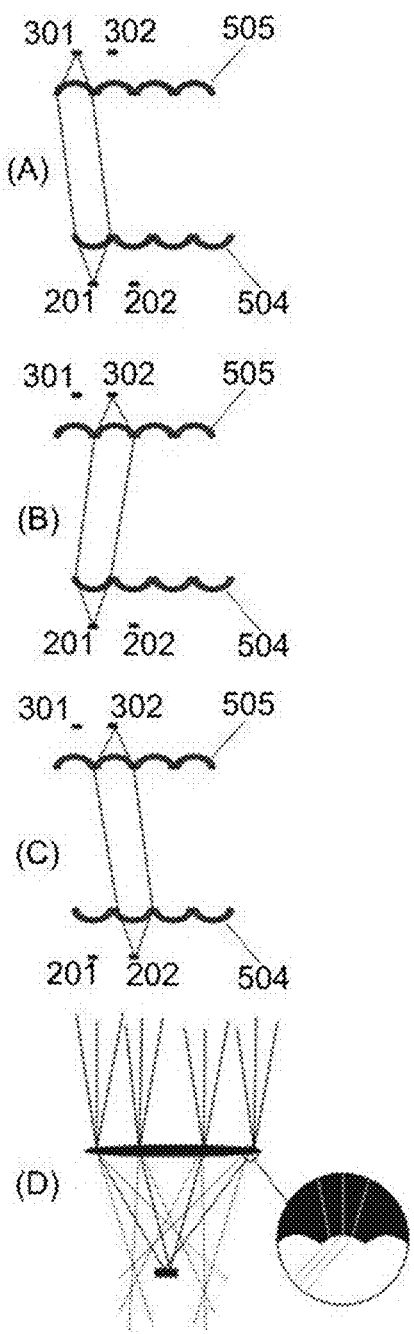

Reference is made to FIGS. 79 and 80, which are illustrations of opposing rows of emitter lenses and receiver lenses in a touch screen system, in accordance with an embodiment of the present invention. Positioned behind each emitter and receiver lens is a corresponding respective light emitter 200 or light receiver 300. As shown in FIG. 79, each emitter 200 is positioned opposite two receivers 300 that detect light beams emitted by the emitter. Similarly, each receiver 300 is positioned opposite two emitters 200, and receives light beams emitted from both emitters.

FIG. 79 shows (A) a single, full beam 173 from an emitter 200 that spans two receivers 300; (B) the portion of the full beam, designated 174, detected by the left one of the two receivers 300; (C) the portion of the full beam, designated 175, detected by the right one of the two receivers 300; (D) multiple beams 176, for multiple emitters 200, covering the touch screen, and (E) multiple beams 177, for multiple emitters 200, covering the touch screen. Generally, each emitter 200 is activated alone. Precision touch detection is described hereinbelow, wherein a touch point is detected by multiple beams. It will be appreciated from (D) and (E) that points on the screen are detected by at least one beam 176 and one beam 177.

To conserve power, when the touch screen is idle only one set of beams, namely, beams 176 or beams 177, are scanned in a scanning sweep, and only for the axis with the smallest number of emitters 200. The scanning toggles between beams 176 and beams 177, and thus two scanning sweeps along the axis activate every emitter-receiver pair along the axis. The other axis, with the larger number of emitters, is only scanned when either a touch is present, or when a signal differs from its reference value by more than an expected noise level, or when an update of reference values for either axis is being performed. Reference values are described in detail hereinbelow.

FIG. 80 shows (A) an emitter 201 sending light to a receiver 301 at an angle of 15° to the left; (B) emitter 201 sending light to a receiver 302 at an angle of 15° to the right; (C) emitter 202 sending light to receiver 302 at an angle of 15° to the left; and (D) a microstructure refracting incoming light. The emitter lenses and receiver lenses shown in FIG. 80 are equipped with the microstructure shown in (D), in order (i) to emit light in both left and right directions from multiple locations along the emitter lens surface, and (ii) to ensure that light received at any angle of incidence at any location along the receiver lens surface is detected by the receiver.

Figure 81:
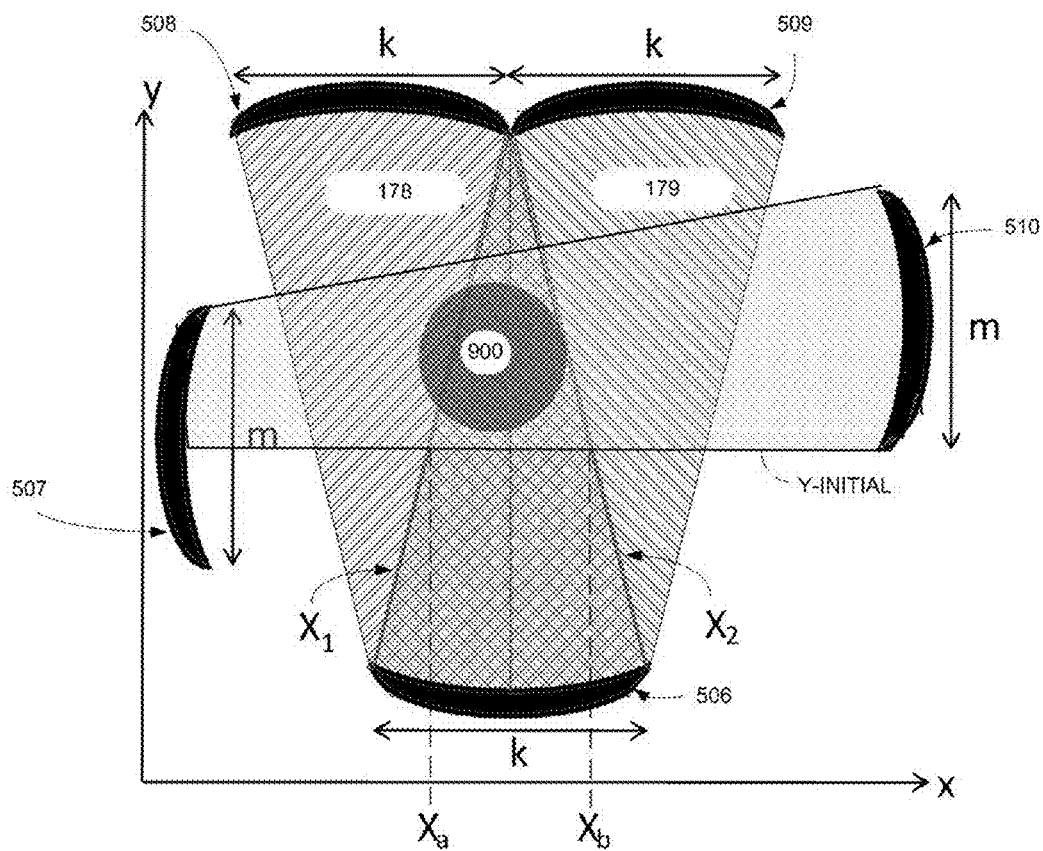
FIG. 81 is a simplified illustration of a technique for determining a touch location, by a plurality of emitter-receiver pairs in a touch screen system, in accordance with an embodiment of the present invention.

Reference is made to FIG. 81, which is a simplified illustration of a technique for detecting a touch location, by a plurality of emitter-receiver pairs in a touch screen system, in accordance with an embodiment of the present invention. Shown in FIG. 81 is an optical emitter lens 506 of width k, positioned opposite two optical receiver lenses 508 and 509, each of width k, on a touch screen. A pointer, 900, touching the screen blocks a portion of the light beam emitted from optical emitter lens 506. Optical emitter lens 506 emits overlapping beams that cover both optical receiver lenses 508 and 509. The spread angle of the wide beam depends on the screen dimensions, and on the lens width, k, along the x-axis. Another optical emitter lens 507 is also shown, shifted by half an element width, m, below an optical receiver lens 510.

Similarly, in a system such as the system shown in FIG. 51 having blocks 500 and 501 of optical emitter elements positioned opposite blocks 502 and 503 of optical receiver elements, the position of each block of optical receiver elements may be shifted by half an element distance, in order that the center of an optical emitter element be aligned with the border between two optical receiver elements.

In accordance with an embodiment of the present invention, at least one surface of optical emitter lens 506 is textured with a plurality of ridges. Each ridge spreads a beam of light that spans the two opposing receiver lenses 508 and 509. As such, light from each of many points along the surface of optical emitter lens 506 reaches both opposing receiver lenses 508 and 509, and the light beams detected by adjacent receivers overlap. In configuration no. 2 these ridges form a feather pattern, and in configuration no. 3 these ridges form a tubular pattern.

In accordance with an embodiment of the present invention, the ridges form micro-lenses, each having a pitch of roughly 0.2-0.5 mm, depending on the touch screen configuration. In the case of a feather pattern, the ridges form a fan, and their pitch narrows as the ridges progress inward and become closer together. In the case of a tubular pattern, the pitch of each micro-lens remains constant along the length of the micro-lens.

At least one surface of each receiver lens 508 and 509 is similarly textured, in order that at least a portion of light arriving at each of many points along the receiver lens surface, arrive at the receiver photo diode.

In accordance with an embodiment of the present invention, the output x and y coordinates are filtered temporally and spatially. The following discussion relates to determination of the x-coordinate, and it will be appreciated by those skilled in the art that the same method applies to determination of the y-coordinate.

Configurations nos. 2 and 3 show that a touch location is detected by at least two emitter-receiver pairs. FIG. 81 shows two such emitter-receiver pairs, 506-508 and 506-509, detecting a touch location of object 900 along the x-axis. In FIG. 81, beams 506-508 are denoted by beam 178, and beams 506-509 are denoted by beam 179. FIG. 81 shows three detection areas; namely, (i) the screen area detected by emitter-receiver pair 506-508, drawn as a wedge filled with right-sloping lines, (ii) the screen area detected by emitter-receiver 506-509, drawn as a wedge with left-sloping lines, and (iii) the screen area detected by both emitter-receiver pairs 506-508 and 506-509, drawn as a wedge with a crosshatch pattern. The left and right borders of this third screen area are shown as lines $X_1$ and $X_2$, respectively.

In order to determine the x-coordinate $X_p$ of object 900's touch location ($X_p$, $Y_p$), an initial y-coordinate, $Y_{initial}$, is corresponding to the location along the y-axis of the emitter-receiver pair having the maximum touch detection signal among all emitter-receiver pairs along the y-axis. In FIG. 81, this emitter-receive pair is 507-510. The lines designated $X_1$ and $X_2$ in FIG. 81 are then traversed until they intersect the line $y=Y_{initial}$ at locations ($X_a$, $Y_{initial}$) and ($X_b$, $Y_{initial}$). Coordinates $X_a$ and $X_b$ are shown in FIG. 81. The x-coordinate of object 900 is then determined using the weighted average $$X_p = (W_a X_a + W_b X_b)/(W_a + W_b), \quad (1)$$

where the weights $W_a$ and $W_b$ are normalized signal differences for beam 178 and beam 179, respectively. The signal difference used is the difference between a baseline, or expected, light value and the actual detected light value. Such difference indicates that an object is touching the screen, blocking a portion of the expected light. Calibration and normalization of the weights is described hereinbelow. A similar weighted average is used to determine the y-coordinate $Y_p$.

If the pointer 900 is detected by more than two emitter-receiver pairs, then the above weighted average is generalized to $$X_p = \Sigma(W_n X_n)/(\Sigma W_n), \quad (2)$$

where the weights $W_n$ are normalized signal differences, and the $X_n$ are weight positions.

In one embodiment of the present invention, where the pointer 900 is a small object, the largest signal difference is used in conjunction with the two closest signals to calculate the position. This compensates for the fact that the signal differences for small objects are small, and noise thus becomes a dominant error factor. Use of the two closest signals reduces error due to noise. In another embodiment of the present invention, only the two largest signal differences are used.

Figure 82:
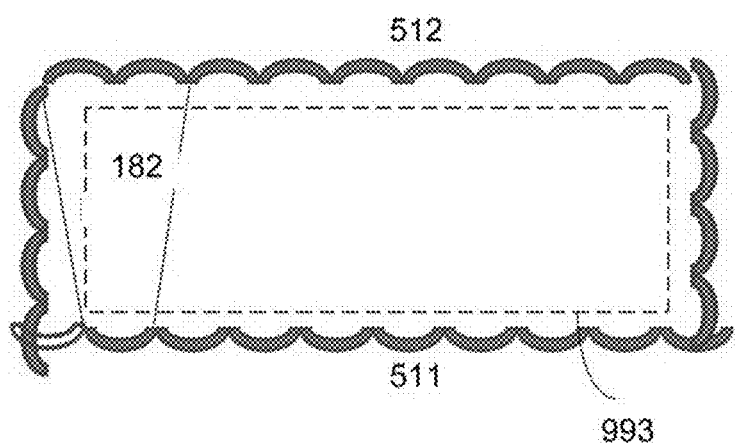
FIG. 82 is an illustration of a light guide frame for the configuration of FIGS. 79 and 80, in accordance with an embodiment of the present invention.

Reference is made to FIG. 82, which is an illustration of a light guide frame for the configuration of FIGS. 79 and 80, in accordance with an embodiment of the present invention. Shown in FIG. 82 are four edges of a light guide frame, with optical emitter lenses 511 and optical receiver lenses 512. It is noted that the inner edges of the frame are not completely covered by beams 182. As such, in some embodiments of the present invention only an inner touch area 993, indicated by the dashed rectangle, is used.

To reduce error due to signal noise, the final coordinate is determined as the output of a temporal filter, using the spatially filtered current coordinate value, determined as above, and a previous coordinate value. The higher the filter weight given to the current x-coordinate, the closer the output will be to that value, and the less will be the impact of the filter. Generally, use of substantially equal weights for both coordinate values results in a strong filter. In one embodiment of the present invention, the temporal filter is a low-pass filter, but other filters are also contemplated by the present invention. In accordance with an embodiment of the present invention, different pre-designated filter weight coefficients may be used in different cases. In an alternative embodiment, the filter weight coefficients are calculated as needed.

Choice of appropriate filter coefficients is based on scanning frequency, the speed at which a touch object is moving across the screen, whether the object motion is along a straight line or not, and the size of the touch object.

Generally, the higher the scanning frequency, the nearer the current coordinate value is to the previous coordinate value, and a stronger filter is used. Scanning frequency is used to estimate the speed and direction of movement of an object. Based on the scanning frequency, a threshold distance is assigned to two input values, the threshold indicating fast movement. If the difference between the current and previous coordinate values is greater than the threshold distance, a weaker filter is used so that the output coordinate not lag considerably behind the actual touch location. It has been found by experiment that the filter $$\text{output\_val} = \frac{1}{10} * \text{previous\_val} + \frac{9}{10} * \text{current\_val} \quad (3)$$

provides good results in this case. In addition, the lag value, described hereinbelow, is reset to equal the output value in this case.

If the difference between the current and previous coordinate values is less than the threshold distance, then a lag value is determined. The lag value indicates speed and direction along an axis. In has been found by experiment that the value $$\text{lag} = \frac{5}{6} * \text{lag} + \frac{1}{6} * \text{current\_val} \quad (4)$$

provides good results in this case. The filter weight coefficients are selected based on the difference between the lag value and the current coordinate value. Generally, the greater this difference, which indicates either fast motion or sudden change in direction, the weaker the filter.

For example, if the touch object is stationary, the lag value eventually is approximately equal to the current coordinate value. In such case, signal noise may cause small differences in the spatially calculated touch position, which in turn may cause a disturbing jitter effect; i.e., the touch screen would show the object jittering. Use of a strong temporal filter substantially dampens such jittering.

If the touch object is moving fast or makes a sudden change in direction, a strong temporal filter may create a perceptible lag between the actual touch location and the displayed touch location. In the case of a person writing with a stylus, the written line may lag behind the stylus. In such cases, use of a weak temporal filter reduces such lagging.

When the touch object covers a relatively large screen area, such as a finger or other blunt object touching the screen, the lag between the actual finger motion and the displayed trace of the motion is less perceptible, because the finger covers the area of the lag. In such case, a different temporal filter is used.

The type of object, finger vs. stylus, being used may be inferred by knowing expected user behavior; e.g., a user interface intended for finger touch assumes a finger being used. The type of object may also be inferred by the shadowed area created by the object. The size of the touch area as determined based on shadowed emitter signals, is therefore also a factor used in selecting temporal filter weight coefficients.

Figure 83:
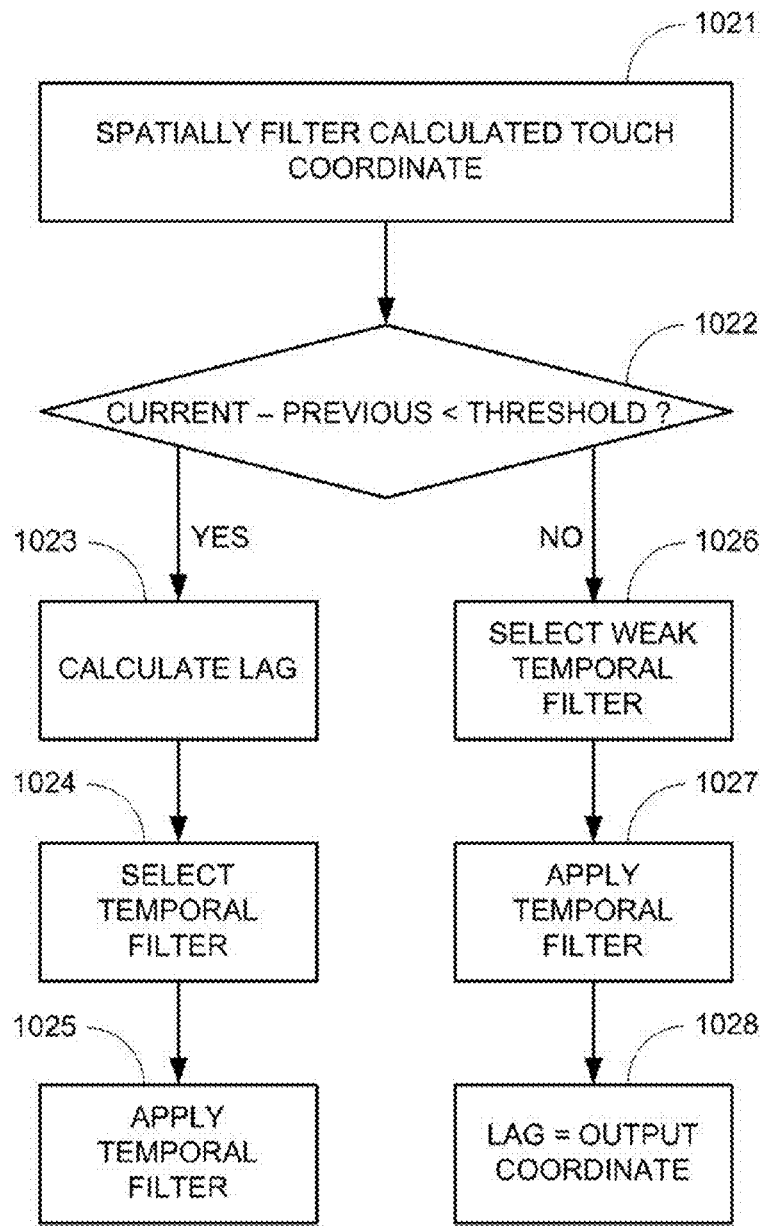
FIG. 83 is a simplified flowchart of a method for touch detection for an optical touch screen, in accordance with an embodiment of the present invention.

Reference is made to FIG. 83, which is a simplified flowchart of a method for touch detection for an optical touch screen, in accordance with an embodiment of the present invention. At operation 1021, a current coordinate value is received, based on a spatial filter that processes signals from multiple emitter-receiver pairs. A threshold distance is provided, based on a scan frequency. At operation 1022, the difference between the current coordinate value and a previous coordinate value is compared to the threshold distance. If the difference is less than or equal to the threshold distance, then at operation 1023 a new lag value is calculated, as in Eq. (4). At operation 1024 temporal filter weight coefficients are determined based on the difference between the current coordinate value and the lag value. At operation 1025, the temporal filter is applied to calculate an output coordinate value, as in Eq. (3).

If, at operation 1022, the difference between the current coordinate value and previous coordinate value is greater than the threshold distance, then weak filter weight coefficients are selected at operation 1026. At operation 1027, the temporal filter is applied to calculate an output coordinate value, as in Eq. (3). At operation 1028 the lag value is set to the output coordinate value.

Figure 84:
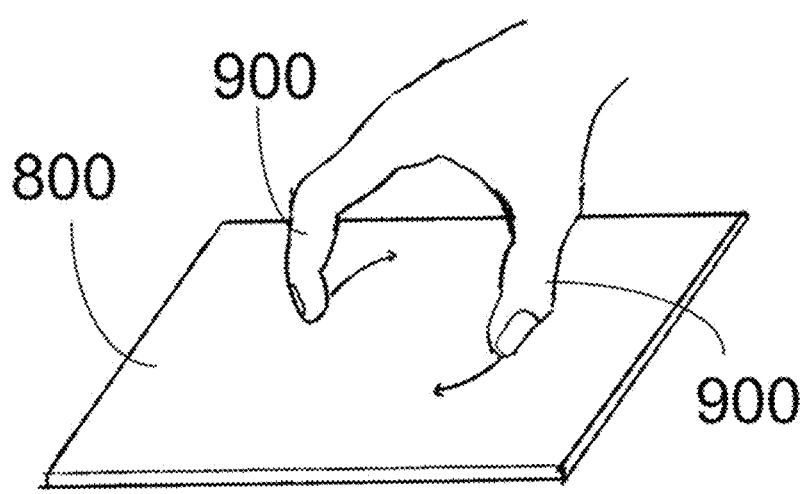
FIGS. 84-86 are illustrations of a rotation gesture, whereby a user places two fingers on the screen and rotates them around an axis.
Figure 85:
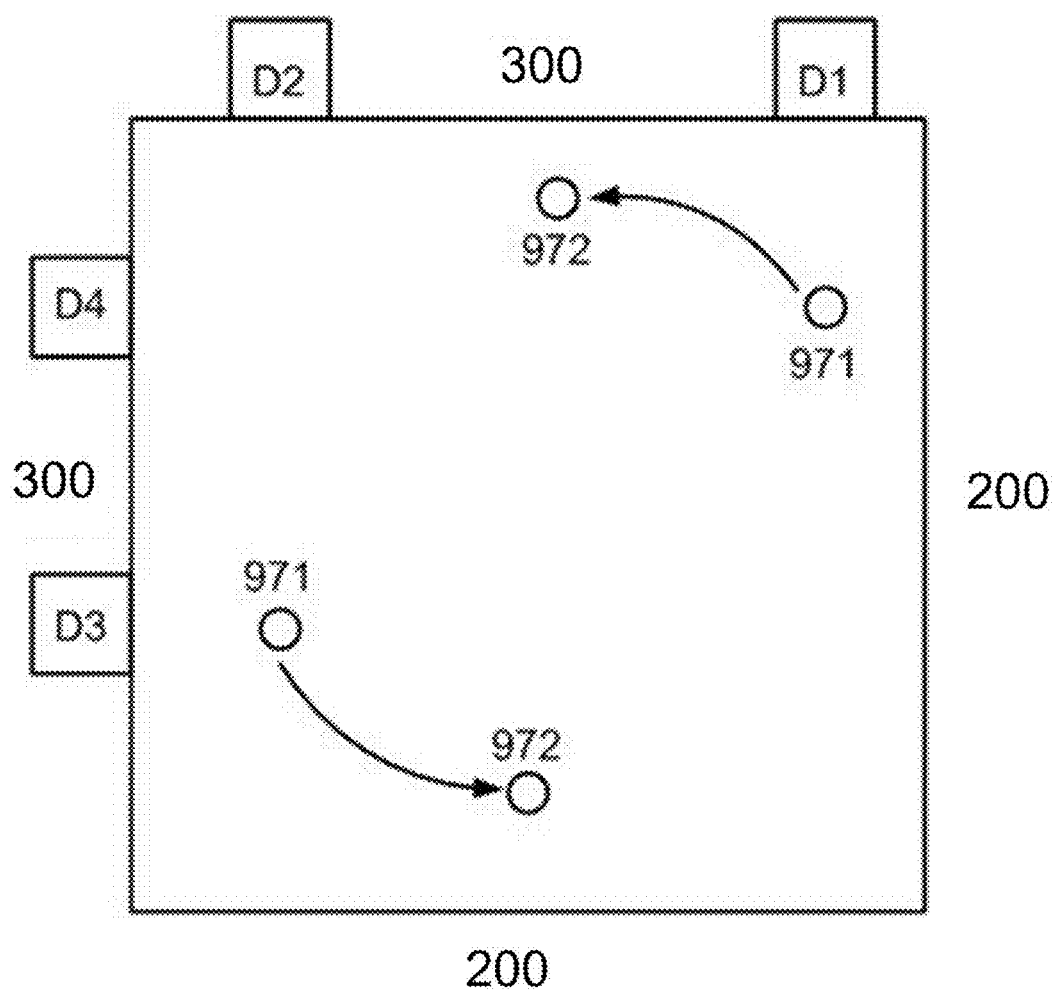
Figure 86:
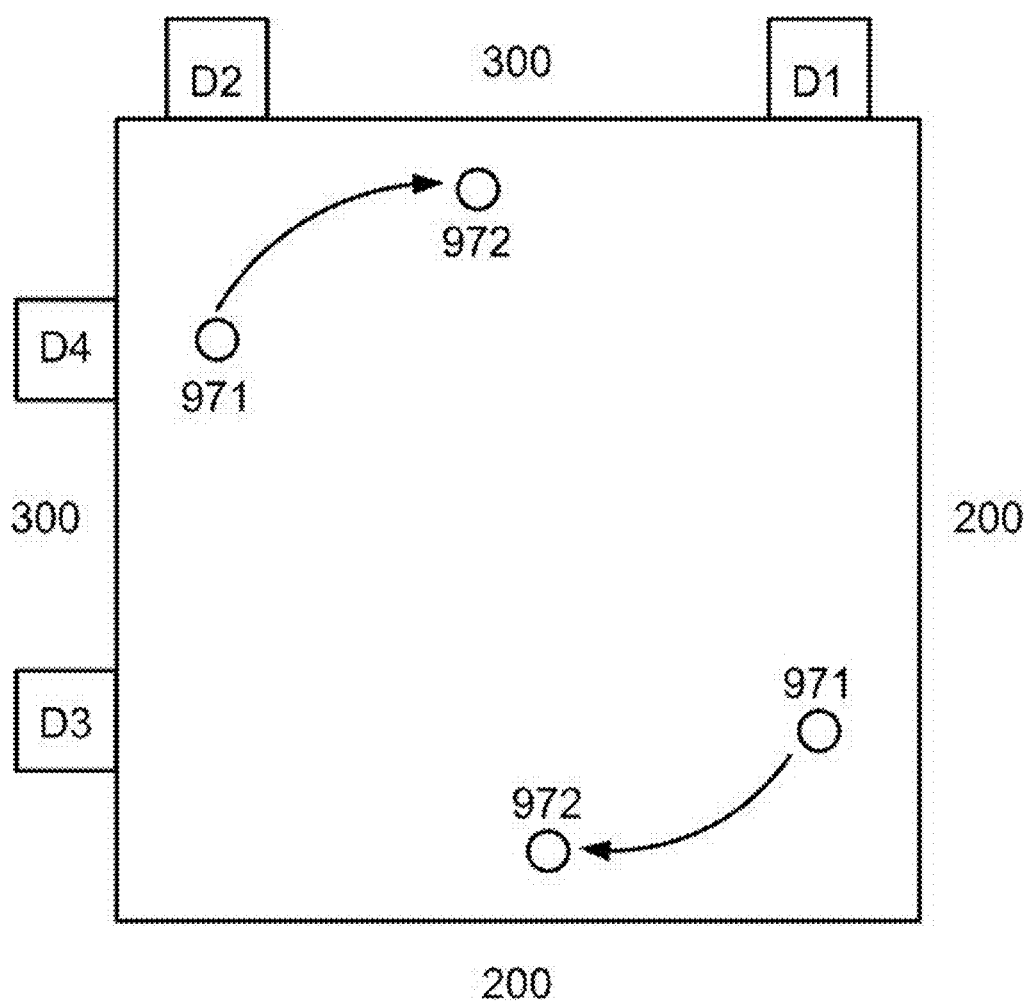

Embodiments of the present invention provide a method and apparatus for detecting a mufti-touch operation whereby two touches occur simultaneously at two corners of a touch screen. An example of such a mufti-touch is a rotation gesture, shown in FIGS. 84-86, whereby a user places two fingers 900 on a screen 800 and turns them around an axis. As pointed out hereinabove with reference to FIGS. 8 and 9, it is difficult for a light-based system to discriminate between a top-left & bottom-right touch vs. a bottom-left & top-right touch. Use of shift-aligned emitters and receivers enables such discrimination, as described hereinbelow.

Figure 87:
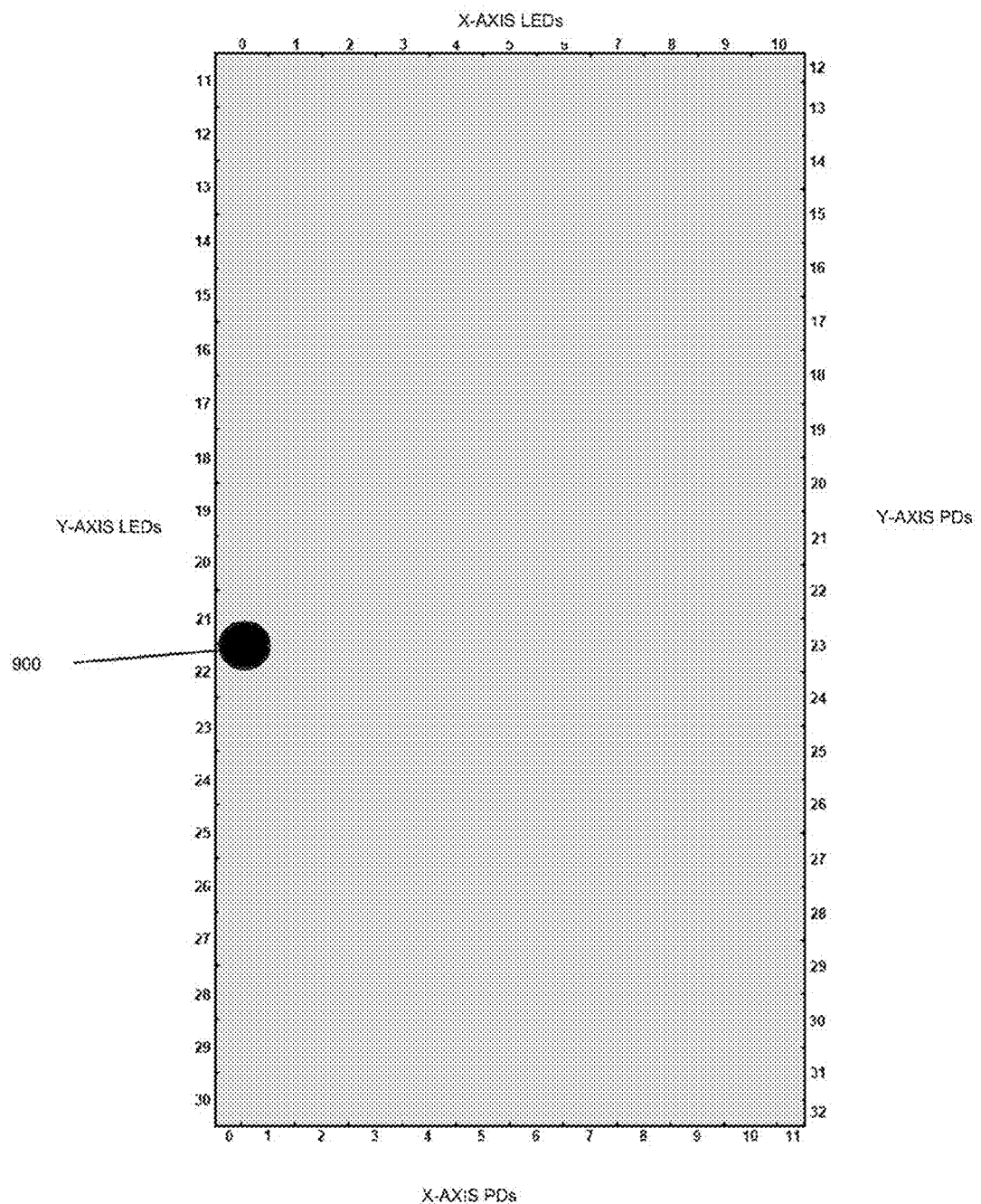
FIGS. 87-90 are illustrations of touch events at various locations on a touch screen, in accordance with an embodiment of the present invention.
Figure 88:
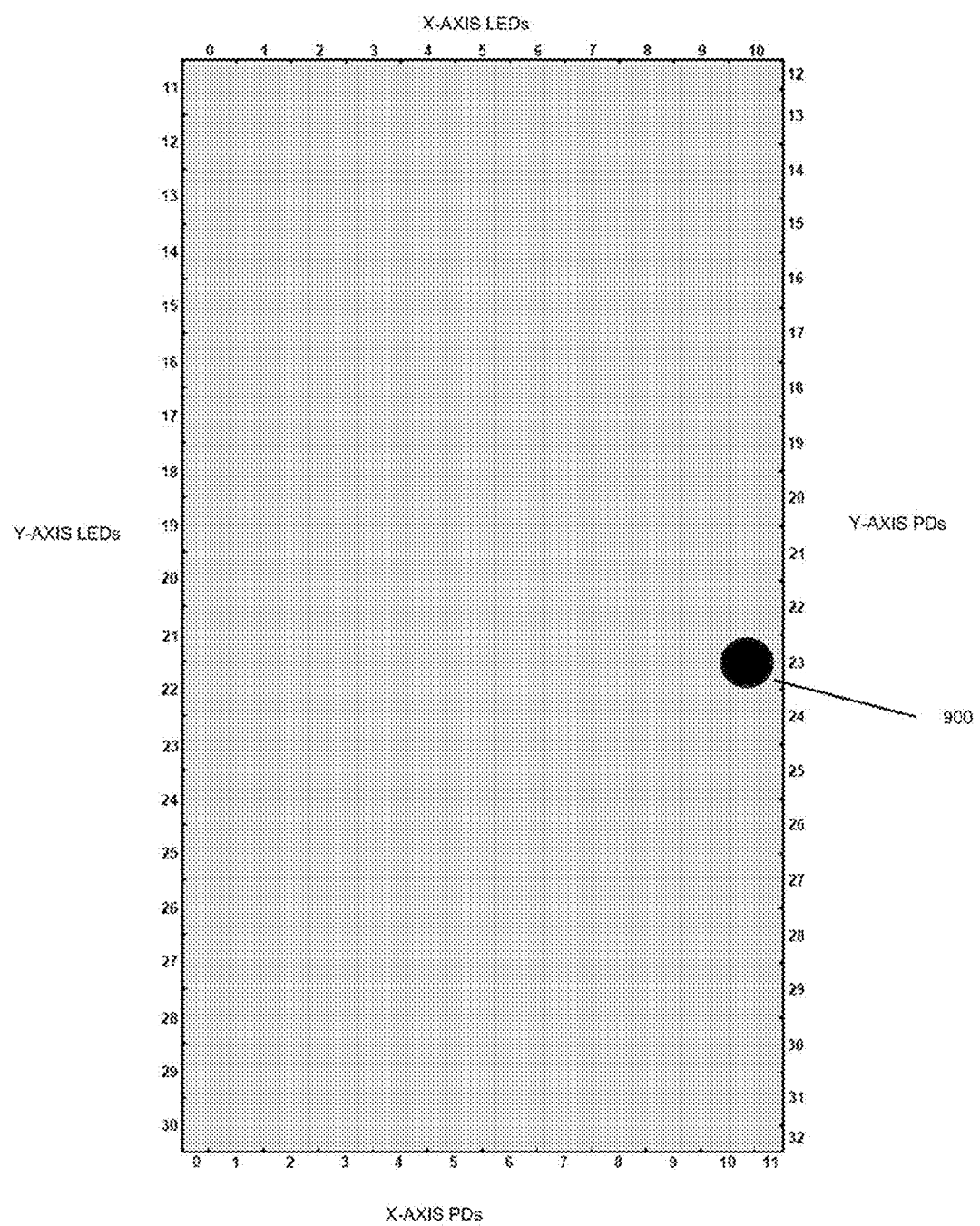
Figure 89:
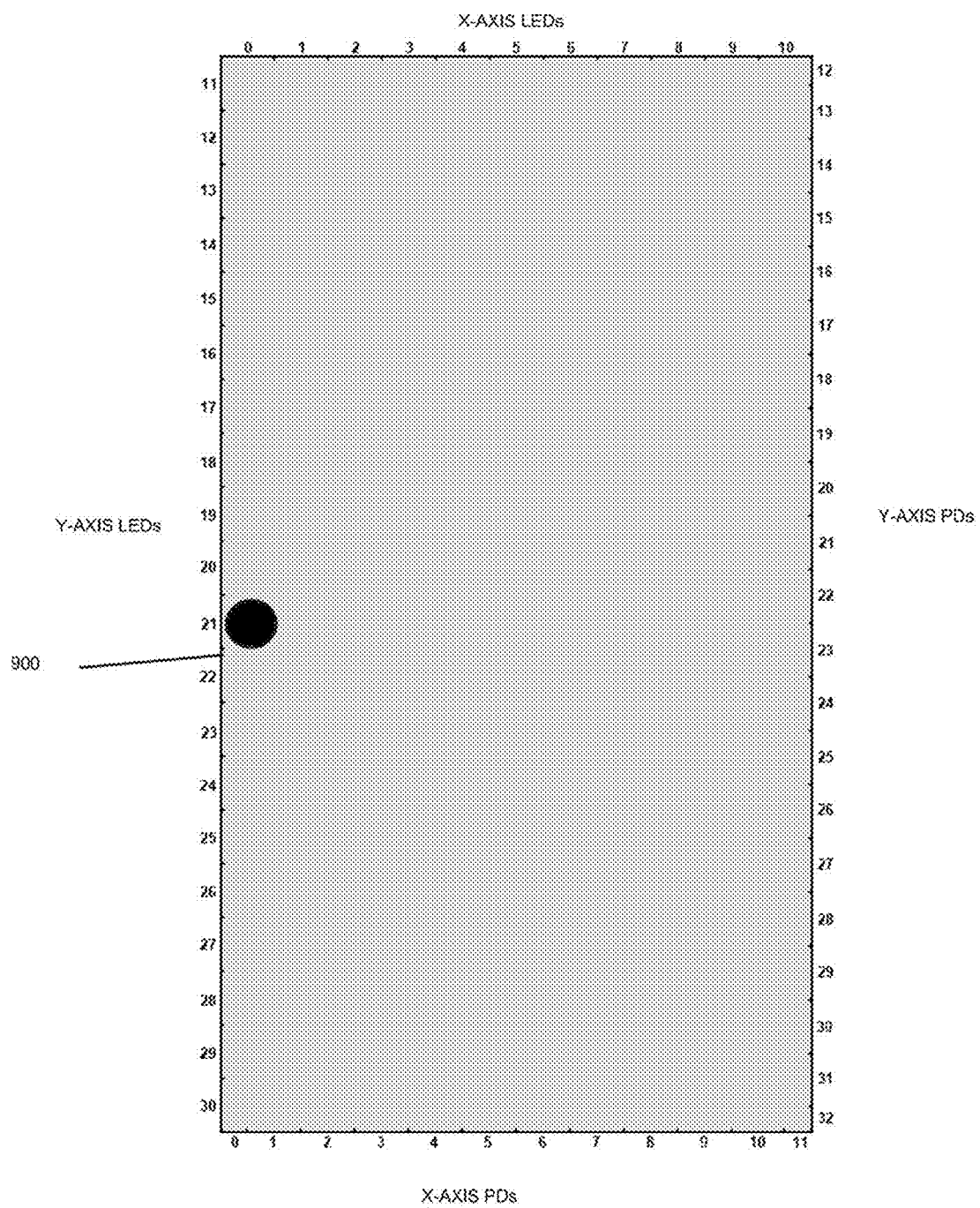
Figure 90:
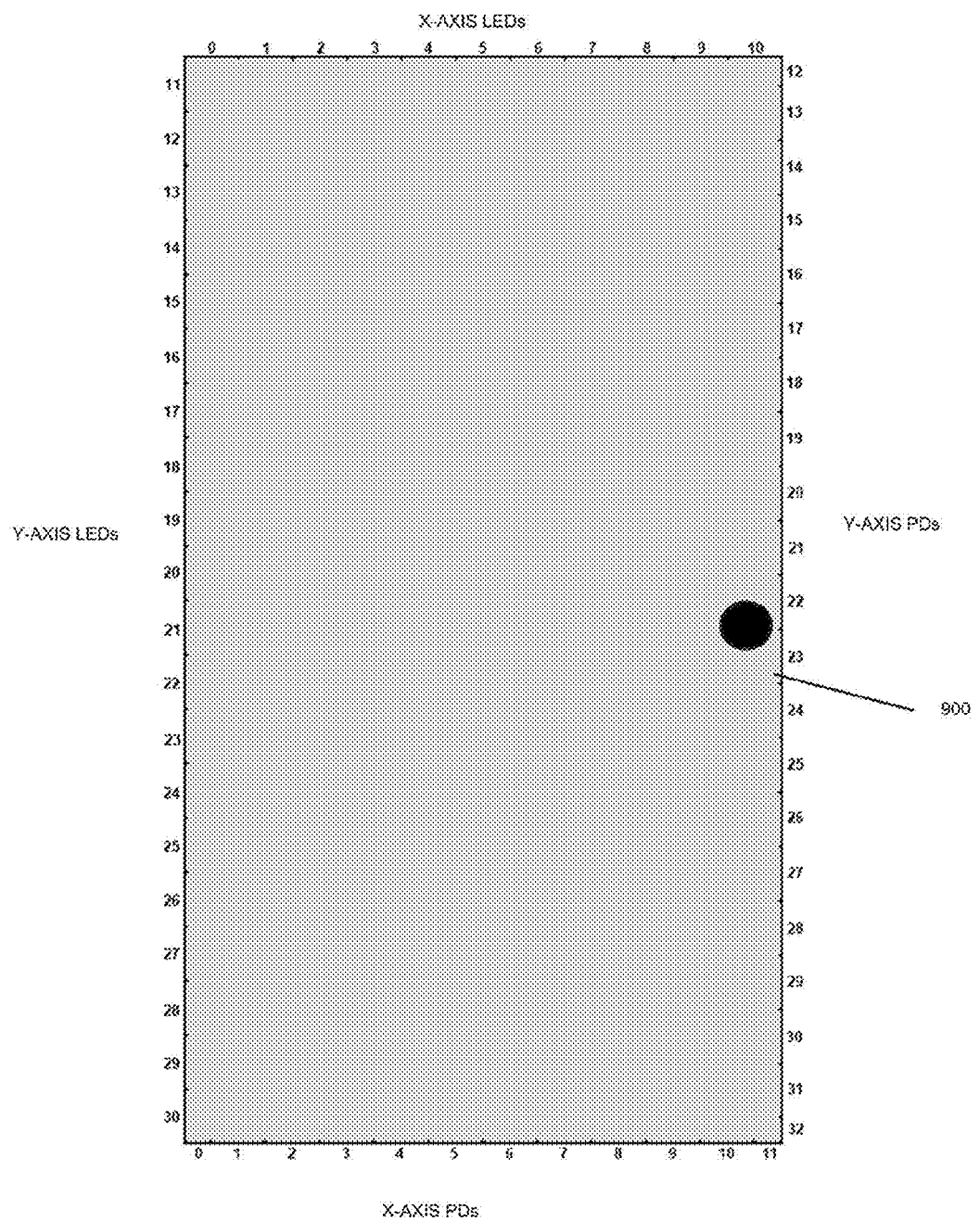

In accordance with an embodiment of the present invention, data from receivers along a first axis is used to determine a touch location along two axes. Reference is made to FIGS. 87-90, which are illustrations of a finger 900 touch event at various locations on a touch screen, and corresponding FIGS. 91-94, which are respective bar charts of light saturation during the touch events, in accordance with an embodiment of the present invention. FIG. 87 shows a touch located near a row of emitters, between two emitters. FIG. 88 shows a touch located near a row of receivers, blocking a receiver. FIG. 89 shows a touch located near a row of emitters, blocking an emitter. FIG. 90 shows a touch located near a row of receivers, between two receivers.

FIGS. 91-94 each include two bar charts; namely, an upper chart showing light saturation at receivers along an x-axis, and a lower chart showing light saturation at receivers along a y-axis. Each row of receivers is shift-aligned with an opposite row of emitters. As such, each emitter is detected by two receivers. Correspondingly, FIGS. 91-94 show two bars for each emitter, one bar per receiver.

Figure 91:
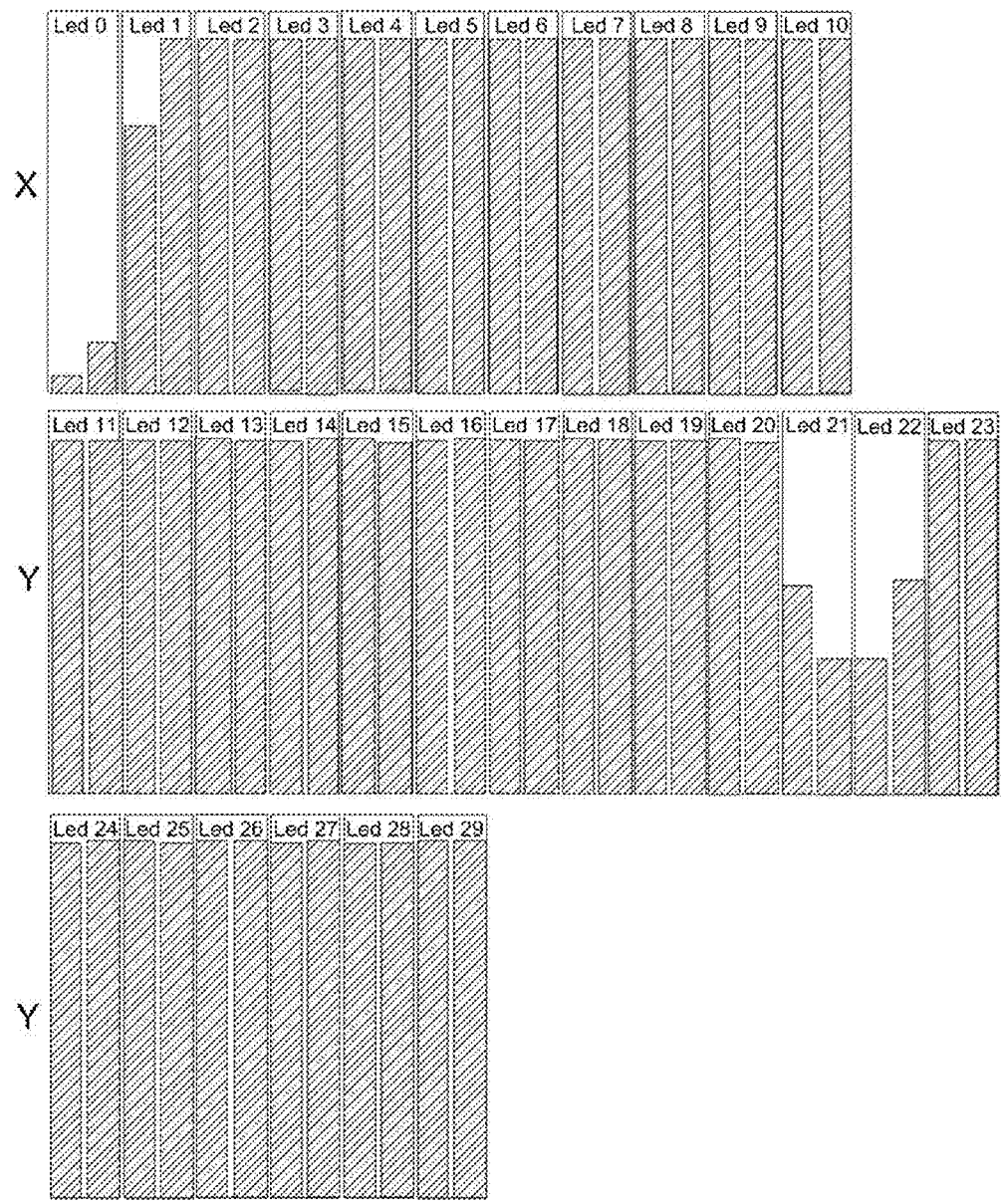
FIGS. 91-94 are respective bar charts of light saturation during the touch events illustrated in FIGS. 87-90, in accordance with an embodiment of the present invention.
Figure 92:
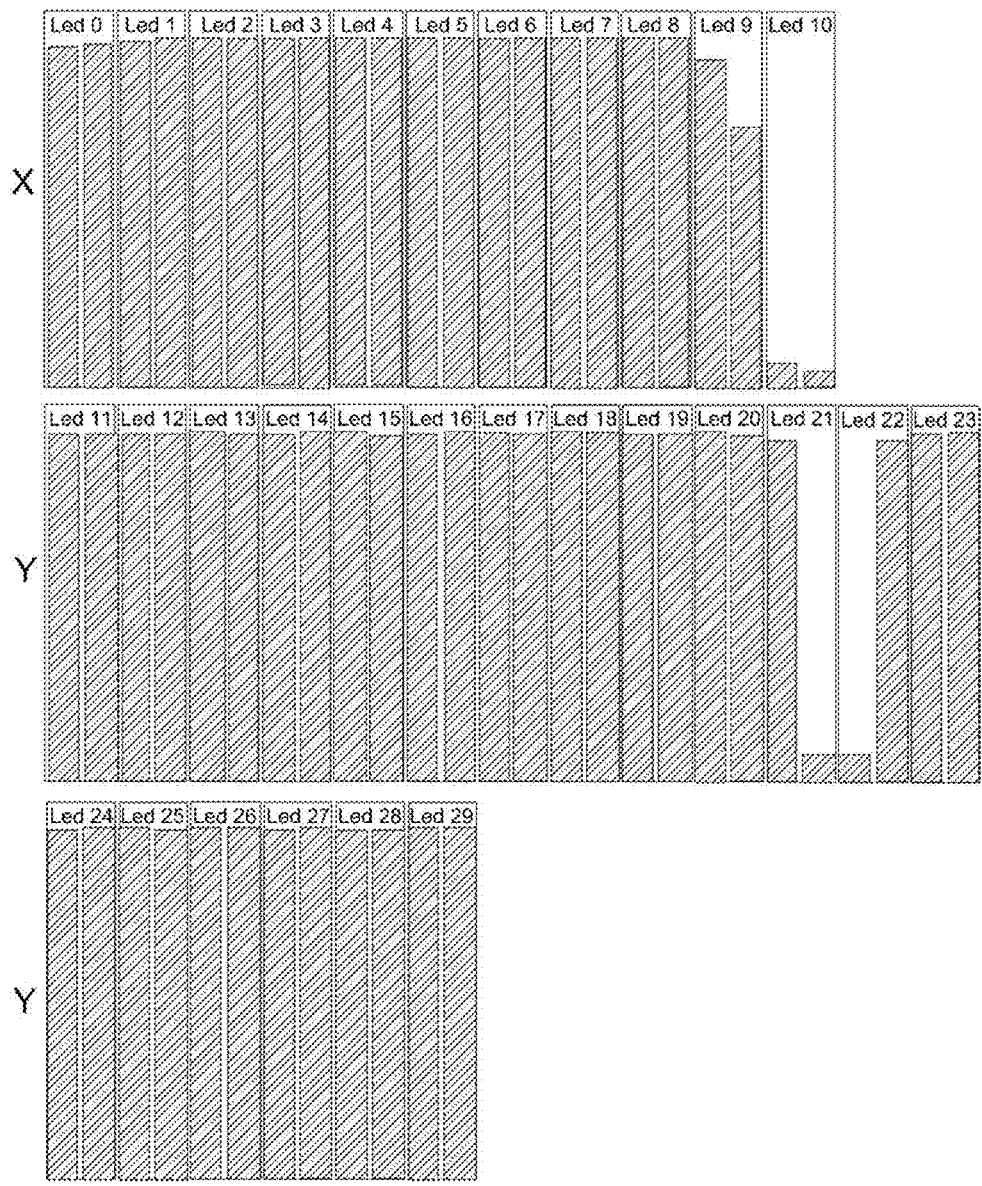
Figure 93:
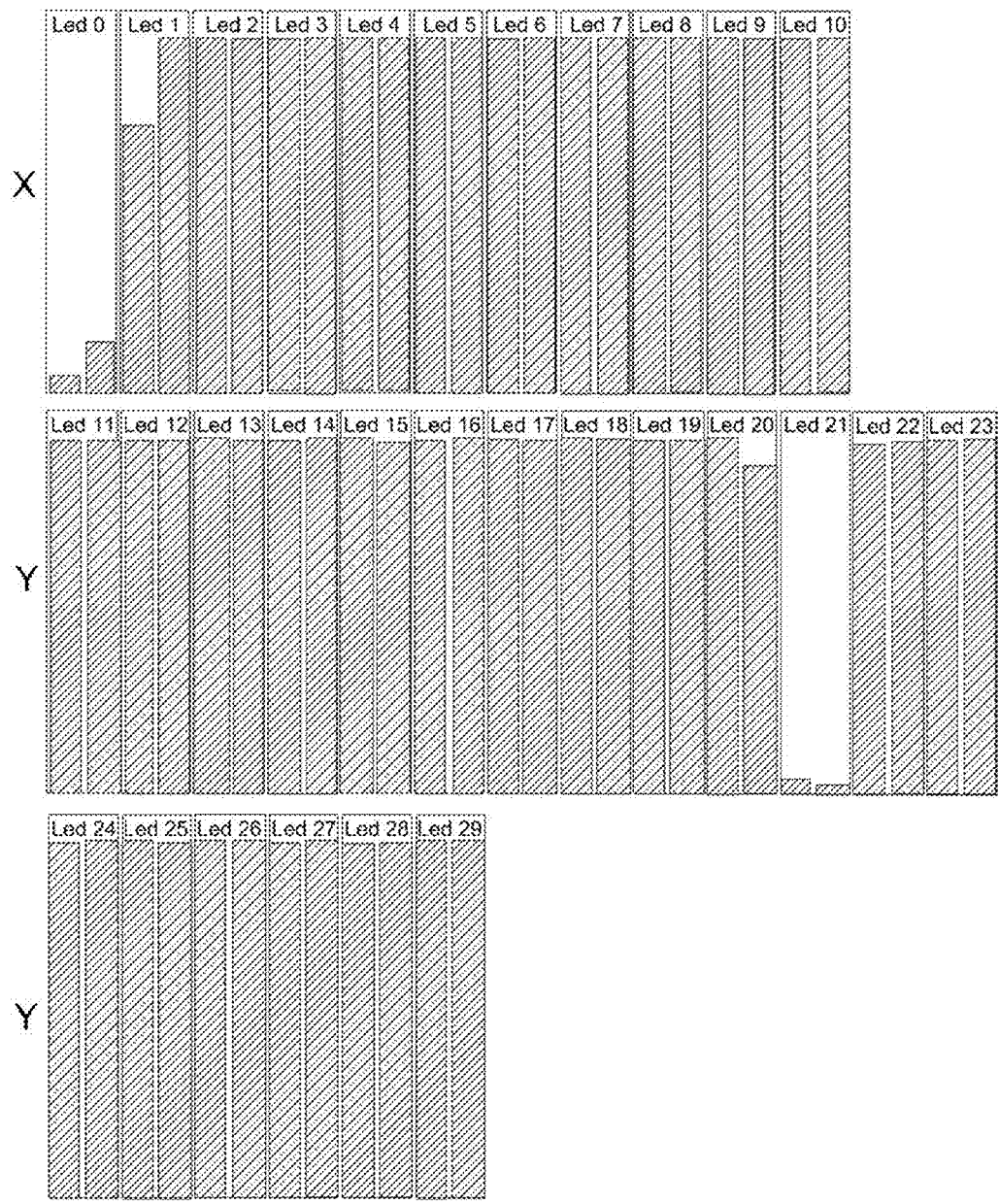
Figure 94:
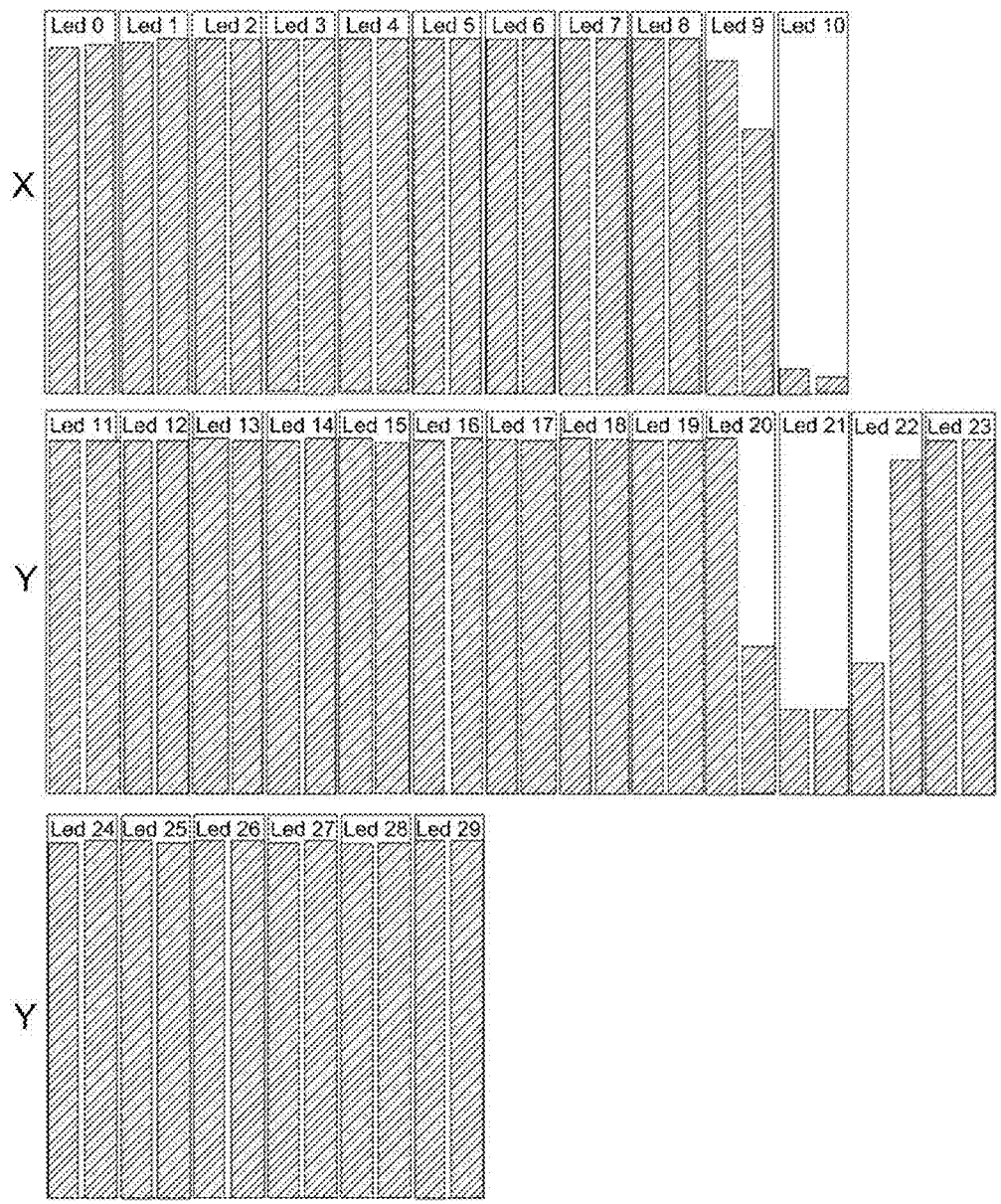

FIGS. 91-94 exhibit four distinct detection patterns. FIG. 91 shows an absence of light detected primarily by one receiver from its two respective emitters. The absence of light is moderate. FIG. 92 shows an absence of light detected primarily by one receiver from its two respective emitters. The absence of light is large. FIG. 93 shows two adjacent receivers detecting a large absence of expected light from the blocked emitter. Both receivers detect some light from neighboring elements. FIG. 94 shows two adjacent receivers detecting a moderate absence of expected light from the blocked emitter. Both receivers detect some light from neighboring emitters. TABLE I summarizes these different patterns.

TABLE I

Patterns of touch detection based on proximity to and alignment with emitters and receivers

| Pattern No. FIGS. | Touch Location | No. of Receivers Detecting the Touch | Amount of Expected Light that is Blocked |
|---|---|---|---|
| 1 FIG. 87 FIG. 91 | Near a row of emitters, between two emitters | 1 | Moderate |
| 2 FIG. 88 FIG. 92 | Near a row of receivers, blocking a receiver | 1 | Large |
| 3 FIG. 89 FIG. 93 | Near a row of emitters, blocking an emitter | 2 | Large |
| 4 FIG. 90 FIG. 94 | Near a row of receivers, between two receivers | 2 | Moderate |

According to an embodiment of the present invention, determination of location of a multi-touch is based on the patterns indicated in TABLE I. Thus, referring back to FIG. 85, four detection points are shown along two rows of receivers. Detections D1-D4 detect touch points 971 in upper-right & lower-left corners of the screen. Based on whether the detection pattern of each point is of type 1 or 3, or of type 2 or 4, the detection patterns determine whether the corresponding touch is closer to the emitters, or closer to the receivers. Each touch has two independent indicators; namely, the X-axis detectors, and the Y-axis detectors. Thus, for detection points 971 in FIG. 85, detections D1 and D3 are of types 2 or 4, and detections D2 and D4 are of types 1 or 3. In distinction, for detection points 971 in FIG. 86, detections D2 and D4 are of types 2 or 4, and detections D1 and D3 are of types 1 or 3.

In addition to evaluation of detection points independently, the various detection patterns may be ranked, to determine which touch point is closer to the emitters or to the receivers.

Moreover, when a rotate gesture is performed, from touch points 971 to touch points 972, movement of detections discriminates whether the gesture glides away from the emitters and toward the receivers, or vice versa. In particular, subsequent detections are compared, and discrimination is based on whether each detection pattern is becoming more like type 1 or 3, or more like type 2 or 4.

Figure 95:
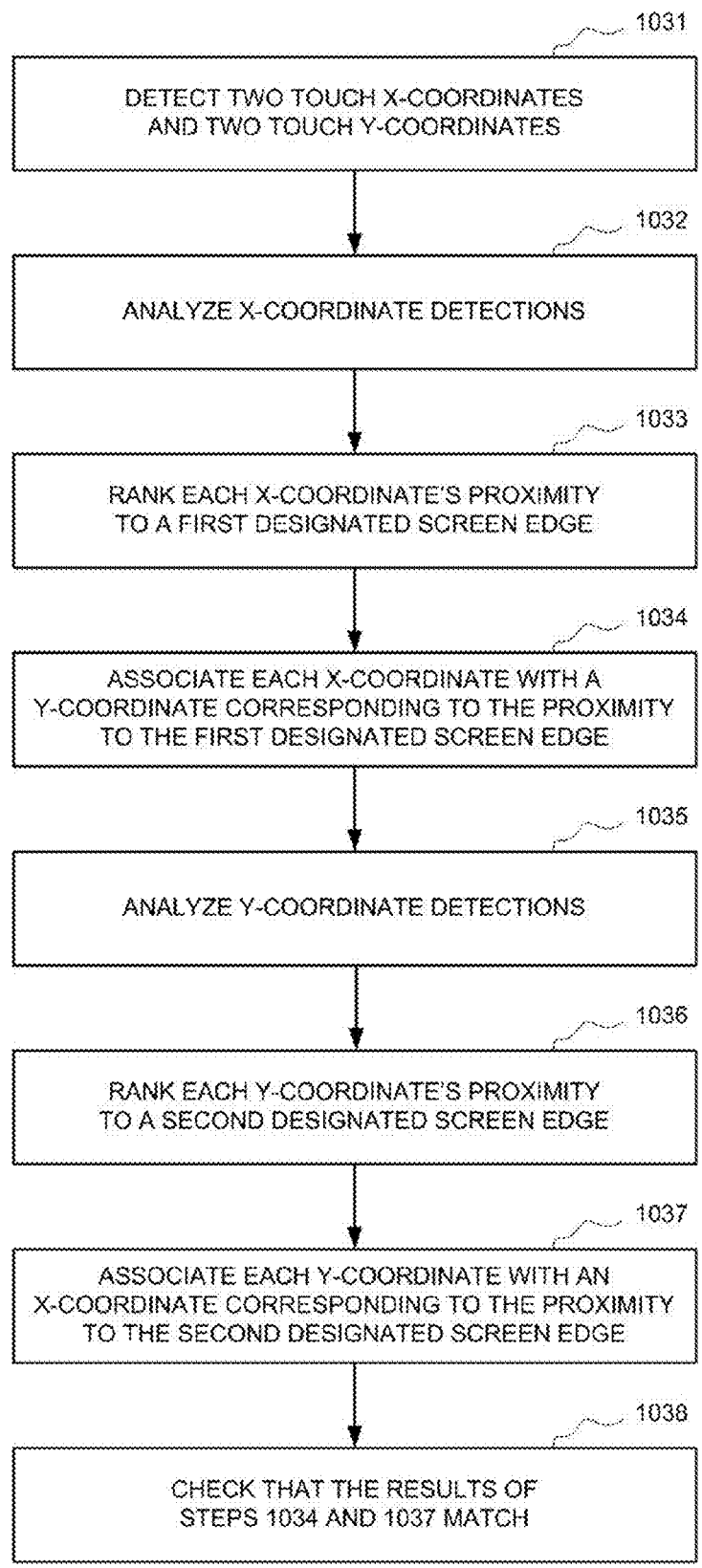
FIG. 95 is a simplified flowchart of a method for determining the locations of simultaneous, diagonally opposed touches, in accordance with an embodiment of the present invention.

Reference is made to FIG. 95, which is a simplified flowchart of a method for determining the locations of simultaneous, diagonally opposed touches, in accordance with an embodiment of the present invention. At operation 1031, two x-coordinates and two y-coordinates are detected, such as x-coordinates D1 and D2, and y-coordinates D3 and D4, shown in FIGS. 85 and 86. At operation 1032 the detected x-coordinates are analyzed to identify a pattern of detection from among those listed in TABLE I. At operation 1033 the detected x-coordinates are ranked according to touches that occurred closer to or farther from a designated screen edge, based on the pattern detected at operation 1032 and based on the "Touch Location" column of TABLE I. The y-coordinates represent distances from the designated edge. At operation 1034, each ranked x-coordinate is paired with a corresponding y-coordinate. Operations 1035-1037 are performed for the y-coordinates, similar to operations 1032-1034 performed for the x-coordinates. At operation 1038, the two sets of results are compared.

Figure 96:
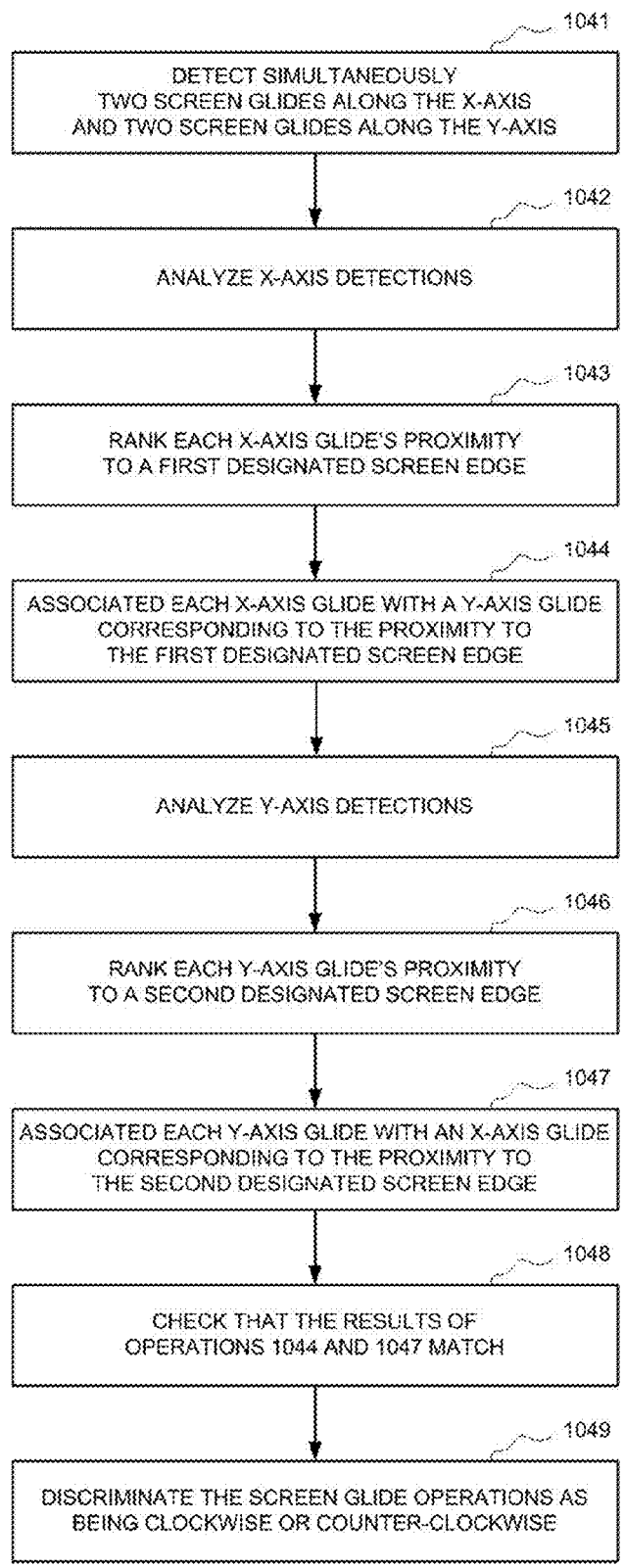
FIG. 96 is a simplified flowchart of a method for discriminating between clockwise and counter-clockwise gestures, in accordance with an embodiment of the present invention.

Reference is made to FIG. 96, which is a simplified flowchart of a method for discriminating between clockwise and counter-clockwise gestures, in accordance with an embodiment of the present invention. At operation 1041, two glide gestures are detected along an x-axis. Each glide gesture is detected as a series of connected touch locations. Thus, with reference to FIGS. 85 and 86, a first glide gesture is detected as a connected series of touch locations beginning at x-coordinate D1, and a second concurrent glide gesture is detected as a connected series of touch locations beginning at x-coordinate D2. At operation 1042, the x-glide detections are analyzed to determine the types of detections that occurred in each series, from among the patterns listed in TABLE I.

At operation 1043, the x-glide detections are ranked according to touches that occurred closer to or farther from a designated screen edge, based on the patterns of detections determined at operation 1042, and based on the "Touch Location" column of TABLE I. Operation 1043 relates to series of connected touch detections over a time interval. Each series generally includes touch detections of patterns 1 and 3, or of patterns 2 and 4, listed in TABLE I, depending on whether the glide was closer to or further away from the designated edge. In addition to analyzing the individual detections that comprise a glide, the series of touch detections is also analyzed to determine if the glide is moving closer to or farther from the designated edge, based on comparison of intensities of detections over time. E.g., in one series of detections having multiple pattern 1 detections, if the amount of blocked light increases over time, then it is inferred that the glide is moving toward the receivers, otherwise the glide is moving toward the emitters.

The y-coordinates represent distances from a designated edge, such as the edge of emitters. At operation 1044 each ranked x-axis glide is paired with a corresponding y-axis glide. Operations 1045-1047 are performed for the y-axis glide, similar to operations 1042-1044 performed for the x-axis glide. At operation 1048 the two sets of results are compared. At step 1049 a discrimination is made as to whether the rotation gesture is clockwise or counter-clockwise.

Calibration of Touch Screen Components

Figure 97:
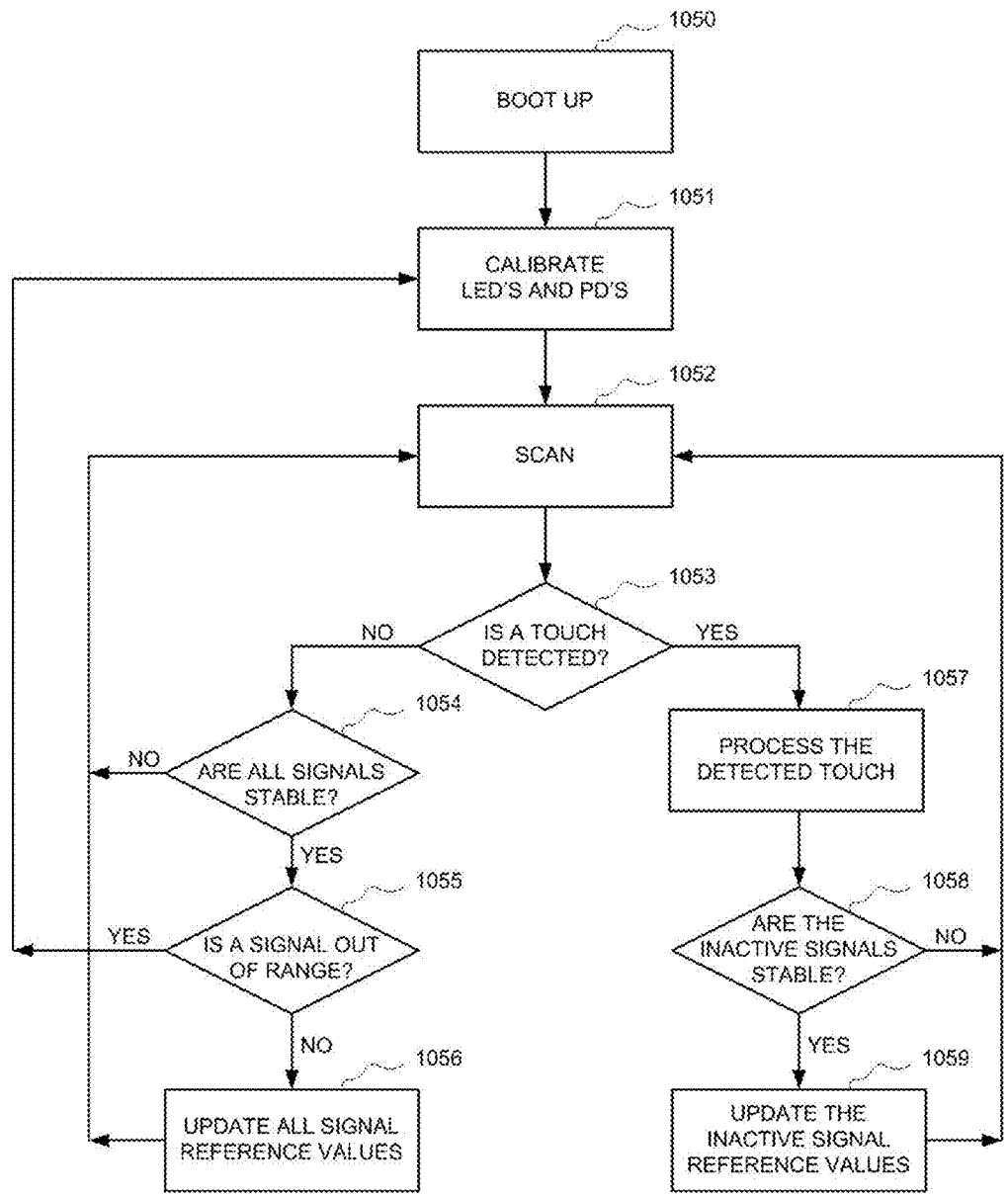
FIG. 97 is a simplified flowchart of a method of calibration and touch detection for an optical touch screen, in accordance with an embodiment of the present invention.

Reference is made to FIG. 97, which is a simplified flowchart of a method of calibration and touch detection for an optical touch screen, in accordance with an embodiment of the present invention. In general, each emitter/receiver pair signal differs significantly from signals of other pairs, due to mechanical and component tolerances. Calibration of individual emitters and receivers is performed to ensure that all signal levels are within a pre-designated range that has an acceptable signal-to-noise ratio.

In accordance with an embodiment of the present invention, calibration is performed by individually setting (i) pulse durations, and (ii) pulse strengths, namely, emitter currents. For reasons of power consumption, a large current and a short pulse duration is preferred. When a signal is below the pre-designated range, pulse duration and/or pulse strength is increased. When a signal is above the pre-designated range, pulse duration and/or pulse strength is decreased.

As shown in FIG. 97, calibration (operation 1051) is performed at boot up (operation 1050), and is performed when a signal is detected outside the pre-designated range (operation 1055). Calibration is only performed when no touch is detected (operation 1053), and when all signals on the same axis are stable (operation 1054); i.e., signal differences are within a noise level over a time duration.

Reference signal values for each emitter/receiver pair are used as a basis of comparison to recognize a touch, and to compute a weighted average of touch coordinates over a neighborhood. The reference signal value for an emitter/receiver pair is a normal signal level. Reference signal values are collected at boot up, and updated when a change, such as a change in ambient light or a mechanical change, is detected. In general, as shown in FIG. 97, reference signal values are updated (operation 1056) when signals are stable (operation 1054); i.e., when signals are within their expected range for some number, N, of samples over time.

A touch inside the touch area of a screen may slightly bend the screen surface, causing reflections that influence detected signal values at photo diodes outside of the touch area. Such bending is more pronounced when the touch object is fine or pointed, such as a stylus. In order to account for such bending, when a touch is detected (operation 1053), all stable signals (operation 1058) outside the touch area undergo a reference update (operation 1059). When no touch is present and all signals are stable (operation 1054), but a signal along an axis differs from the reference value by more than the expected noise level (operation 1055), the emitters are calibrated (operation 1051). Recalibration and updating of reference values require stable signals in order to avoid influence of temporary signal values, such as signal values due to mechanical stress by bending or twisting of the screen frame.

To further avoid error due to noise, if the result of an emitter/receiver pair differs from a previous result by more than an expected noise level, a new measurement is performed, and both results are compared to the previous result, to get a best match. If the final value is within the expected noise level, a counter is incremented. Otherwise, the counter is cleared. The counter is subsequently used to determine if a signal is stable or unstable, when updating reference values and when recalibrating.

After each complete scan, signals are normalized with their respective reference values. If the normalized signals are not below a touch threshold, then a check is made if a recalibration or an update of reference values is necessary. If a normalized signal is below the touch threshold, then a touch is detected (operation 1053).

To reduce risk of a false alarm touch detection, due to a sudden disturbance, the threshold for detecting an initial point of contact with the screen, such as when a finger first touches the screen, is stricter than the threshold for detecting movement of a point of contact, such as gliding of a finger along the screen while touching the screen. I.e., a higher signal difference is required to detect an initial touch, vis-à-vis the difference required to detect movement of an object along the screen surface. Furthermore, an initial contact is processed as pending until a rescan verifies that the touch is valid and that the location of the touch remains at approximately the same position.

To determine the size of a touch object (operation 1057), the range of blocked signals and their amplitudes are measured. For large objects, there is a wait for detecting an initial point of contact with the screen, until the touch has settled, since the touch of a large object is generally detected when the object is near the screen before it has actually touched the screen. Additionally, when a large object approaches the screen in a direction not perpendicular to the touch area, the subsequent location moves slightly from a first contact location.

However, objects with small contact areas, such as a pen or a stylus, are typically placed directly at the intended screen location. As such, in some embodiments of the present invention, the wait for detecting an initial contact of a fine object is shortened or skipped entirely.

It has been found advantageous to limit the size of objects that generate a touch, in order to prevent detection of a constant touch when a device with a touch screen is stored in a pouch or in a pocket.

Figure 98:
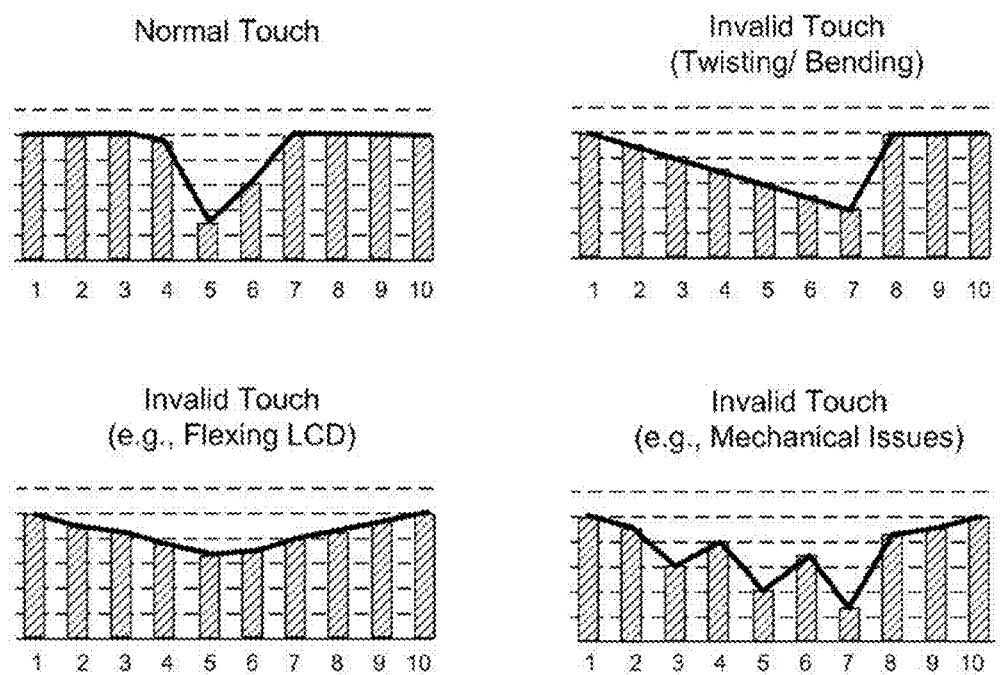
FIG. 98 is a picture showing the difference between signals generated by a touch, and signals generated by a mechanical effect, in accordance with an embodiment of the present invention.

At operation 1053, it is also necessary to distinguish between signals representing a valid touch, and signals arising from mechanical effects. In this regard, reference is made to FIG. 98, which is a picture showing the difference between signals generated by a touch, and signals generated by a mechanical effect, in accordance with an embodiment of the present invention. As seen in FIG. 98, signal gradients discriminate between a valid touch and a mechanical effect.

Figure 99:
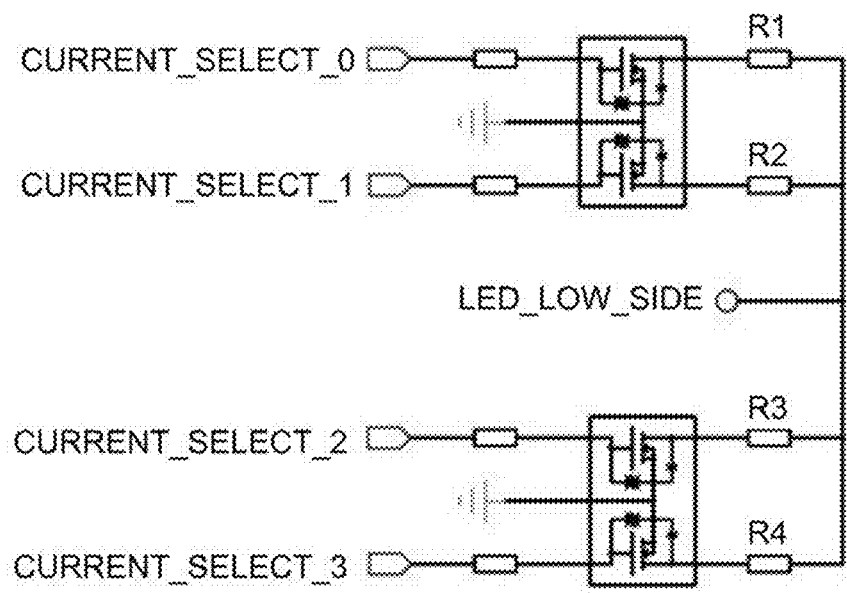
FIG. 99 is a simplified diagram of a control circuit for setting pulse strength when calibrating an optical touch screen, in accordance with an embodiment of the present invention.
Figure 100:
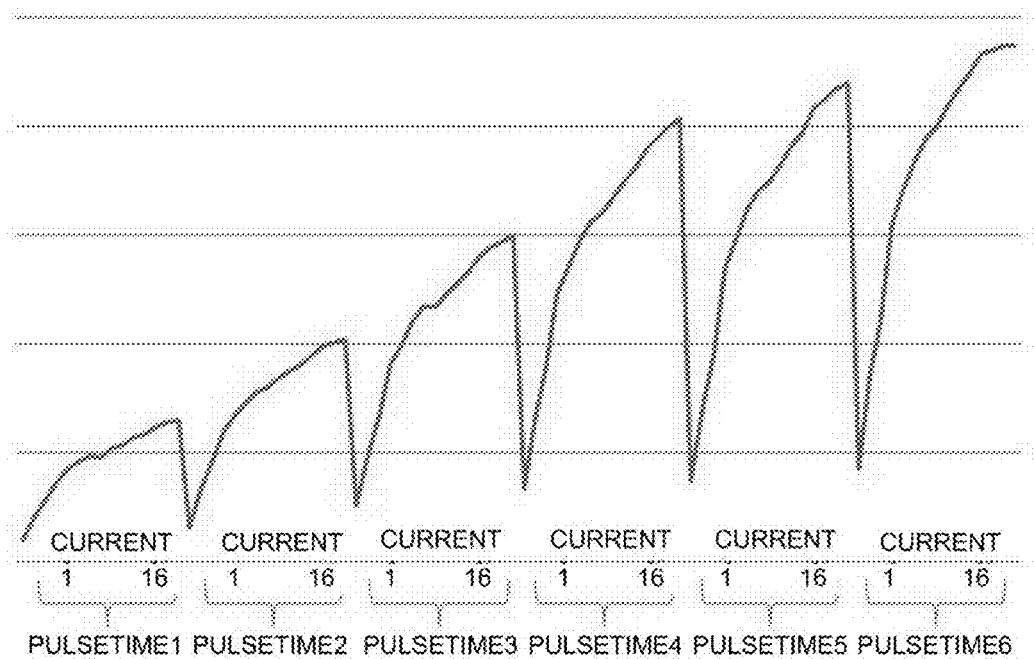
FIG. 100 is a plot of calibration pulses for pulse strengths ranging from a minimum current to a maximum current, for calibrating an optical touch screen in accordance with an embodiment of the present invention.

Reference is made to FIG. 99, which is a simplified diagram of a control circuit for setting pulse strength when calibrating an optical touch screen, in accordance with an embodiment of the present invention. Reference is also made to FIG. 100, which is a plot of calibration pulses for pulse strengths ranging from a minimum current to a maximum current, for calibrating an optical touch screen in accordance with an embodiment of the present invention. FIG. 100 shows plots for six different pulse durations (PULSETIME1-PULSETIME6), and sixteen pulse strength levels (1-16) for each plot.

The control circuit of FIG. 99 includes 4 transistors with respective variable resistors R1, R2, R3 and R4. The values of the resistors control the signal levels and the ratio between their values controls gradients of the pulse curves shown in FIG. 99.

Figure 101:
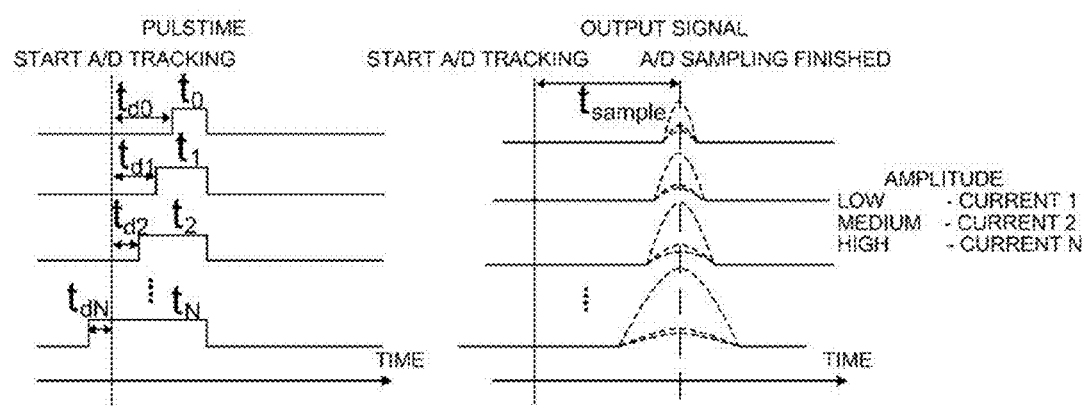
FIG. 101 is a simplified pulse diagram and a corresponding output signal graph, for calibrating an optical touch screen, in accordance with an embodiment of the present invention.

Reference is made to FIG. 101, which is a simplified pulse diagram and a corresponding output signal graph, for calibrating an optical touch screen, in accordance with an embodiment of the present invention. The simplified pulse diagram is at the left in FIG. 101, and shows different pulse duration, $t_0, \ldots, t_N$, that are managed by a control circuit when calibrating the touch screen. As shown in FIG. 101, multiple gradations are used to control duration of a pulse, and multiple gradations are used to control the pulse current. The corresponding output signal graph is at the right in FIG. 101.

As shown in FIG. 101, different pulse durations result in different rise times and different amplitudes. Signal peaks occur close to the time when the analog-to-digital (A/D) sampler closes its sample and hold circuit. In order to obtain a maximum output signal, the emitter pulse duration is controlled so as to end at or near the end of the A/D sampling window. Since the A/D sampling time is fixed, the timing, $t_d$, between the start of A/D sampling and the pulse activation time is an important factor.

Assembly of Touch Screen Components

As described hereinabove, a minimum of tolerances are required when aligning optical guides that after the shape of a wide light beam with respective light emitters and light receivers, in order to achieve accurate precision on an optical touch screen. A small misalignment can severely degrade accuracy of touch detection by altering the light beam. It is difficult to accurately place a surface mounted receiver and transmitter such that they are properly aligned with respective light guides.

Because of this difficulty, in an embodiment of the present invention, a light guide and transmitter or receiver are combined into a single module or optical element, as described above with reference to FIGS. 49-52.

In some instances it may be of advantage not to combine an emitter or a receiver into an optical element, e.g., in order to use standard emitter and receiver components. In such instances precision placement of components is critical.

In some embodiments of the present invention, the optical lens that includes the feather pattern is part of a frame that fits over the screen. FIG. 37 shows a cross-section of such a frame 455, which is separate from LED 200.

Figure 102:
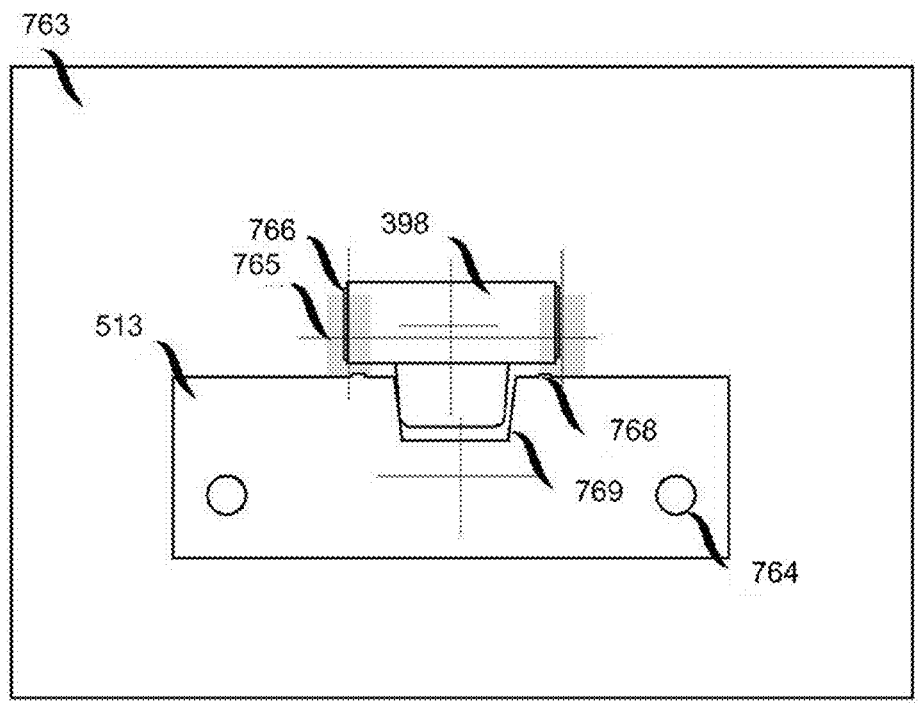
FIG. 102 is an illustration showing how a capillary effect is used to increase accuracy of positioning a component, such as an emitter or a receiver, on a printed circuit board, in accordance with an embodiment of the present invention.

Reference is made to FIG. 102, which is an illustration showing how a capillary effect is used to increase accuracy of positioning a component, such as an emitter or a receiver, on a substrate, inter alia a printed circuit board or an optical component, in accordance with an embodiment of the present invention. Shown in FIG. 102 is an emitter or a receiver 398 that is to be aligned with an optical component or temporary guide 513. Optical component or temporary guide 513 is fixed to a printed circuit board 763 by guide pins 764. Solder pads 765 are placed at an offset from component solder pads 766. Printed circuit board 763 is then inserted into a heat oven for soldering.

Figure 103:
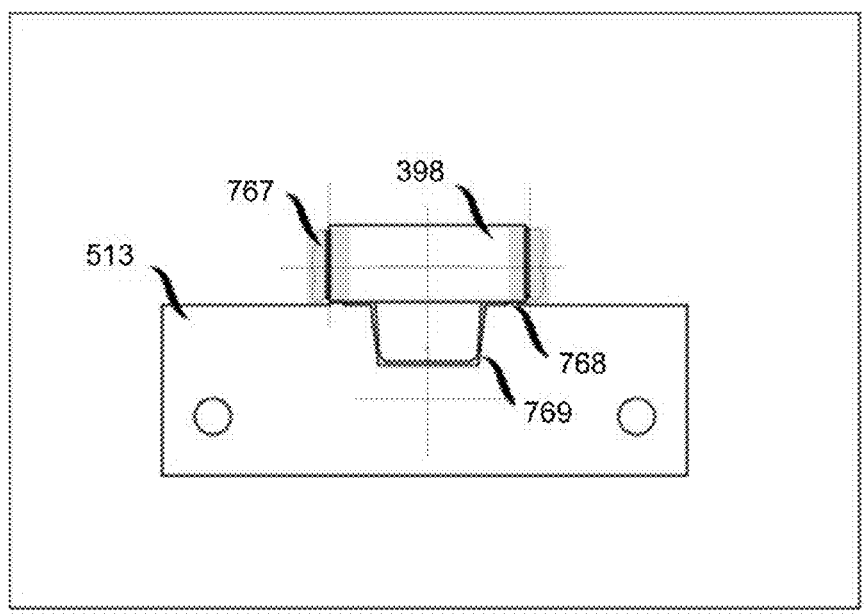
FIG. 103 is an illustration showing the printed circuit board of FIG. 102, after having passed through a heat oven, in accordance with an embodiment of the present invention.

Reference is made to FIG. 103, which is an illustration showing the printed circuit board 763 of FIG. 102, after having passed through a heat oven, in accordance with an embodiment of the present invention. As shown in FIG. 103, component 398 has been sucked into place by the capillary effect of the solder, guided by a notch 768 and a cavity 769 in optical component or temporary guide 513. When a temporary guide is used, it may be reused for subsequent soldering.

The process described with reference to FIGS. 102 and 103 is suitable for use in mass production of electronic devices.

The present invention has broad application to electronic devices with touch sensitive screens, including small-size, mid-size and large-size screens. Such devices include inter alia computers, home entertainment systems, car entertainment systems, security systems, PDAs, cell phones, electronic games and toys, digital photo frames, digital musical instruments, e-book readers, TVs and GPS navigators.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A pressure-sensitive touch screen comprising:
    a housing comprising a cavity for mounting a display therein;
    at least one light emitter rigidly mounted in said housing;
    at least one light receiver rigidly mounted in said housing;
    a display flexibly mounted in said cavity that sinks into said cavity in response to applied pressure;
    a first light guide mounted in said housing comprising:
        an entrance for receiving light emitted by said at least one emitter; and
        an exit above said display, which is enlarged when said display sinks into said cavity, out of which light is directed across said display;
    a second light guide mounted in said housing comprising:
        an entrance above said display, which is enlarged when said display sinks into said cavity, for receiving the light directed across said display by said first light guide; and
        an exit out of which light is directed to said at least one receiver; and
    a calculating unit connected to said at least one light receiver for receiving outputs indicating amounts of received light by said at least one light receiver, and for determining that pressure is being applied to said display based on an increase in an output of said at least one light receiver caused by the enlarged exit and entrance.

2. The pressure-sensitive touch screen of claim 1 further comprising a touch detector connected to said calculating unit, wherein said calculating unit determines that pressure is being applied to said display only when said touch detector detects a touch on said display.

3. The pressure-sensitive touch screen of claim 1 wherein the outputs of a first light receiver indicate the presence of a touch on said display when (i) the outputs are significantly less than an expected output value for such light receiver when said display is not being touched, and wherein the outputs of a second light receiver indicate that pressure is being applied to said display when (ii) the outputs are significantly greater than an expected output value for such light receiver when pressure is not being applied to said display concurrent with (i).

4. The pressure-sensitive touch screen of claim 1 wherein said calculating unit determines an amount of pressure being applied to said display based on amounts of enlargement of said first light guide exit and said second light guide entrance.

* * * * *